(12) United States Patent
Spero

(10) Patent No.: US 12,079,739 B2
(45) Date of Patent: *Sep. 3, 2024

(54) INTELLIGENT DOCKING SYSTEM FOR DEVICES

(71) Applicant: Yechezkal Evan Spero, Tifrah (IL)

(72) Inventor: Yechezkal Evan Spero, Tifrah (IL)

(73) Assignee: Yechezkal Evan Spero, Tifrah (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,343

(22) Filed: May 10, 2023

(65) Prior Publication Data

US 2024/0127090 A1 Apr. 18, 2024

Related U.S. Application Data

(63) Continuation of application No. 14/591,909, filed on Jan. 7, 2015, now Pat. No. 11,651,258.

(60) Provisional application No. 61/924,747, filed on Jan. 8, 2014.

(51) Int. Cl.
| | | |
|---|---|---|
| G05B 15/02 | (2006.01) | |
| G05B 13/04 | (2006.01) | |
| G06N 5/04 | (2023.01) | |
| G06N 5/046 | (2023.01) | |

(52) U.S. Cl.
CPC ........... *G06N 5/046* (2013.01); *G05B 13/041* (2013.01); *G05B 15/02* (2013.01); *G05B 2219/2642* (2013.01)

(58) Field of Classification Search
CPC . G06N 5/046; G05B 15/02; G05B 2219/2642
See application file for complete search history.

(56) References Cited

U.S. PATENT DOCUMENTS

| | | | |
|---|---|---|---|
| 9,351,060 B2 * | 5/2016 | Wilker | H04R 1/08 |
| 11,651,258 B2 * | 5/2023 | Spero | H05B 47/125 |
| | | | 700/90 |
| 2012/0206050 A1* | 8/2012 | Spero | H05B 45/395 |
| | | | 315/152 |

* cited by examiner

*Primary Examiner* — Mark A Connolly

(57) ABSTRACT

An integrating device 200 for supporting one or more devices 207 capable of delivering mass, energy and/or information to occupants localized to a sub-area of a room is combined with sensors 212 capable of detecting occupants within one sub-area or another and processor 206 which correlates the coordinates of the occupants to those of the delivery devices 207 and a controller 206 that drives the specific sub-area device to provide a localized delivery of services such as lighting, heating, cooling, sound and video, intercom, noise cancellation systems, information, entertainment content, connectivity to the internet or social media, and light therapy in an automatic process based on the detected instantaneous needs of the occupant for services.

20 Claims, 11 Drawing Sheets

Device Platform Combining General and Task Light Fixture, Camera Sensor and Numerous Add-On-Devices

INTELLIGENT DOCKING SYSTEM FOR DEVICES

CROSS REFERENCE TO RELATED APPLICATIONS

This application is a continuation of application Ser. No. 14/591,909, filed Jan. 7, 2015, which claims the benefit of U.S. Provisional Application No. 61/924,747, filed Jan. 8, 2014.

FIELD OF THE INVENTION

The invention relates to a field described as home, office and industrial automation. Specifically, cyber-physical systems comprised of collaborating computational elements controlling physical entities. More specifically regarding apparatus used to fixture, power and control multiple devices capable of providing sensual stimuli to occupants, the modification of the environs or the control of processes. In addition it relates to the field of artificial intelligence expert systems for use in living spaces including machine learning based on occupant interactions and domotic, domestic robotic systems.

BACKGROUND

Home, office and industrial automation usually relates to structures equipped with control systems that enable users to remotely control or program an array of automated electronic devices via commands or pre-set rules for time of day operation and utility load leveling. The home network encompasses communications, entertainment, security, convenience, and information systems. For example, a homeowner on vacation can use a Smartphone to arm a security system, switch appliances on or off, control lighting, program an entertainment system, control temperature gauges and perform many other tasks. Wireless WiFi or wired networks such as powerline carrier systems (used to send coded signals along a home's existing electric wiring to programmable switches, or outlets) convey commands that correspond to "addresses" or locations of specific devices and control how and when those devices operate.

These systems have been termed "smart" which may be defined as being able to receive data and act on it and thus their automatic operation is dependent on the information being provided at that instant by users or rules set up in advance based on time of day or an event happening but predicted in advance by users. Within this disclosure a superior solution is proposed which is termed "intelligent"—which may be defined as being able to autonomously adapt to surroundings. The operation of "intelligent" devices is thus inherently automatic with as you go teaching being used seamlessly in a machine learning environment. The automation process flows naturally, where if necessary user intervention is used when necessary thereby growing the expert system's knowledge base in concurrence with the user experience.

In many aspects of human endeavor inside and outside the home it would be beneficial to be able to provide amenities to stimulate and relax people in a non-obtrusive manner. Retailers go to great expense to bring shoppers into their stores. It would be beneficial to retailers if, while in their store, the shoppers could be instilled with a mood conducive to purchasing. Often lighting, music and most recently, fragrances have been utilized to interact with the shopper's senses, effect a change in their mood and thus induce them to higher awareness and increased spending. It would be beneficial to have an innocuous or aesthetic and cost effective delivery system to bring these stimulants to the objective audience.

Recent developments in human behavior have shown that the quality of life can be influenced by exposure to an ambience which subliminally induces relaxation. Therapeutic effects may result from lighting, sound and aromas. Research indicates that both positive and negative affect can be readily generated by environmental conditions. Environmental factors (characteristics) include temperature, humidity, air pressure, wind (air flow) speed, oxygen content, carbon-dioxide content, static electrical ion, sound, odor, light, magnetic field, etc. Stressors such as excessive heat, irritating noise, or unpleasant aromas generate substantial levels of negative affect. Correspondingly, several environmental factors appear to produce positive affective states, including certain kinds of lighting, music, pleasant climatic conditions, and pleasant scents or aromas. Pleasant aromas can be readily introduced into home or work environments; indeed, many commercial products specifically designed to accomplish this goal exist (air fresheners and room deodorizers). To the extent that pleasant scents yield any of the positive effects described above (e.g., enhanced task performance, improved negotiations), they provide a simple and relatively cost-effective type of intervention. [See Baron J. Appl. Social Psych. 20, 368-384 (1990) and references therein. In a graph of performance vs. time for a repetitive task in the presence and absence of a fragrance by Warm et al. J. Soc. Cosmetic Chem. 1991, 1-12, the percentage of correct detection of signals was presented on the vertical axis; four ten-minute trial periods were presented on the horizontal axis. The curve for correct detection was higher at all time periods in the presence of peppermint fragrance.

It is also generally known that the human body is easily affected by various environments and generates various emotions in response to the environments. People can be in high spirits, or absent-minded or relaxed in response. In consequence, those factors can be regulated to a specified status to make people concentrate on study, work or feel relaxed, drowsy, exited, in a mood for buying, in a mood for love etc.

The human skin not only perceives cold/hot feeling and sense of touch, the body hairs can also be made to stand on end. People may shudder with fear (fright) or feel excitement when the hair is affected by a static electric field or attachment of ions. Besides, a magnetic field may affect a human's body or spirit, but the effect has not been fully understood yet. Odor also affects one's mood; for example, an offensive smell may cause nausea. People in an environment, which simulates a garden or forest, will feel pleasant and refreshed.

Methodologies to evoke mood changes and effect therapeutic action include subliminal message systems such as audio music and sound systems, flickering light systems, and electrodermal systems which deliver complex signals to the body.

It is known that lighting affects the human psyche in a number of ways. Both light intensity and spectrum are used to affect mood, create ambiance and influence actions of persons under its spell. Lighting is a proven cure for depression sufferers. So, designing and changing the lighting characteristics, color temperature and intensity in an expanse is one of the ways to have a remote influence on people. The methodologies to create mood such as to stimulate buyers, attract their attention or create a subdued ambiance for luxurious dining and the ability to control the above are well known to lighting practitioners.

Light is perceived to affect people's physiological reaction; such as obscure light makes people feel drowsy; soft light and color make people feel romantic; bright light and color make people feel sober; and abundant light makes people concentrate on work or study. To this end many devices have been invented to effect a change in people's mood some in real time coordinated with other concurrent sensual stimuli.

Lys, et al. in U.S. Pat. No. 6,166,496 titled "Lighting Entertainment System" included herein describes a system to provide for combining an illumination control signal and an entertainment signal. At a decoder, the combined signal may be decoded into an entertainment signal that is delivered to an entertainment device, and an illumination control signal that is delivered to an illumination source. The system may be used to adjust illumination conditions in response to the contents of the entertainment signal.

Numerous lamp types and luminaire styles exist for providing illumination and the variety is mind-boggling. All however are governed by the optical limitations and require electric power to operate. In order to evenly light an area without generating discomforting glare, numerous lighting fixtures or luminaires are employed distributed evenly over the area. This requires the establishment of a power supply infrastructure to provide electricity to the luminaire. As lighting effects diminish as a function of the distance from the illuminant squared, luminaires are positioned above or hung close by the people they are servicing. Often a construction infrastructure is employed for fixturing and servicing purpose as well. Often light control such as dimming is required and this embodies further control infrastructure to be installed in the lit expanse. A control system can also include remote sensors which detect ambient lighting conditions such as available daylight. These devices must be connected to the system. Thus, a modern lighting installation carries with it a comprehensive infrastructural base achieved by a significant outlay of resources.

Another way to remotely affect humans is through the sense of smell. The fields of aromatherapy and fragrance marketing espouse the use of olfactory stimulation to evoke within people therapeutic or psychological responses for the benefit of the client or retailer. Other olfactory directed devices contain odor counteractants to eliminate malodors from living spaces.

Odor producing substances can be dispensed by numerous methods including passive wicks, aerosol "puffers", fine particle sprayers and heated vaporizes. Control of the initiation and cessation of sensory experience resulting from conventional dispensing is very difficult. Except in a gross sense, the quantity of odor producing material dispensed is not controlled. Often fragrances are comprised of materials which are readily oxidized at room temperature, photodecompose or hydrolyze in humid air are all examples of evanescent fragrances for which periodic active dispensing is the only practical way to produce the fragrance. This requires the dispenser to have a constant supply of fragrance or an integral storage container.

Numerous patents have been issued on fragrance dispensers for use with light bulbs. U.S. Pat. No. 6,035,098 to Chipalkatti, et al. titled Scent lamp describes a scent-bearing ring adaptable for at least semi-permanent engagement with the neck of an incandescent bulb that generates both light and heat.

In U.S. Pat. No. 6,254,248 by McAuley, et al. titled Controlled fragrance dispenser for light bulb describes a fragrance dispenser for use with a light bulb and fragrance medium that emits a fragrance when heated. While these patents combine lamps with fragrance generation this is not the preferred method since lamps must be replaced and these artifacts make it difficult; and also the heat is high on a lamp and can produce a fire. Therefore, it would be preferable to get waste heat from other parts of the fixture heat at temperatures incapable of generating a fire.

The most common method of dispensing fragrances or aromas is the wick method in which a wick in contact with a volatile liquid is exposed in a space. It is evident that once the wick is exposed, there is no way to control the amount of material dispensed nor to easily adjust it or quantify it. It can't conveniently be turned on and off. An improvement is to associate the evaporation process with a heater such as a lamp. None of the conventional devices for distributing odor producing chemicals are subject to control or quantitative precision dispensing.

The prior art uses the same dispensing methods for the purpose of odor masking or eliminating vapors. Three approaches to removal of bad orders can be considered: A) perceptual masking, B) specific or nonspecific olfactory receptor blockade and C) odor molecule binding or metabolism. It would be desirable to have a precise active jet dispensing method for all three of these approaches because it allows the best odor removal materials to be dispensed interactively, in response to the presence of any specific bad odor.

Perceptual masking is an approach whereby a competing smell is introduced in a sufficient intensity to "mask" the offending odor whereby the subject is aware of both odors but with reduced attention paid to the offending odor. Olfactory receptor blockade can be an effective odor removal strategy if the offensive order is detected by a single receptor type in the nose whereby pharmacologic blockade of that specific receptor with a receptor blocking ligand, will produce a specific "smell blindness" for that smell. This is superior to the use of vapors of formaldehyde or cocaine or zinc oxide cream which have been used as non-specific receptor blocking agents which cause complete anosmia or hyposmia. Odor molecule removal by catabolysis of the molecule or binding another macromolecule to it can both remove the materials from the air and thus remove the odor. There are commercially available products intended to remove specific odors by one of these methods. All of these approaches are included in the teachings of the present patent and all could benefit from a device or method that would provide dispensing accuracy and precise control.

In U.S. Pat. No. 6,390,453 from May 21, 2002, titled "Method and Apparatus for Delivery of Fragrances and Vapors to the Nose", included herein, Frederickson, et al describes a system to provide accurate controlled dispensing of pharmaceuticals, herbs and psychoactive substances of all types. The device claims a superior method for dispensing such compounds because dispensing can be precise, metered, interactive, and the dispenser can be tamperproof with prescribed dispensing rates possible. The above disclosure is also included herein.

In addition to this improved device it would be desirable to have a dispensing device that was discreet, digital, programmable and hooked up to a central fragrance supply container.

In general fragrances are expensive, difficult to dispense in the correct dosage and it would not be cost effective to provide scent to a large area. Therefore, a number of fragrance dispensers would need to be distributed over the area involving great expense at establishing the power and control infrastructure necessary for the correct and cost-effective dispensing of the aroma.

For example, in a department store, a fragrance generator located near the wall of the elderly ladies shoe department is adjacent to the male teens clothing section. The scents preferred by the young teens wafting over to the shoe department don't generally match the taste of the elderly set. Thus, there is a need to centrally locate the fragrance dispenser and to find a proper mounting surface and a power source. In general the added systems and extra devices add initial cost and contribute to the increasing logistics headache of the maintenance department.

Sound systems are used prevalently in living spaces to create mood or therapeutic action. Sounds may also positively or negatively affect one's feelings. It is commonly perceived that soft music makes people feel leisurely, classic music makes people feel elegant, and rock and roll makes people excited enough to dance. Other sounds may be perceived as irritating noise, causing aggravation while noise such as waves bring on relaxation. Apparently, sound, its cadence and intensity as in music and beat, affect people's mood quite a bit. In a restaurant one couple may be in the mood for jazz while the other is looking for romance in classical waltzes. The sound preference of one would irritate the other therefore there is a need for music localization.

Music is known to aid relaxation and therapy. Through centuries of music composition, music can have a healing and/or invigorating effect. In U.S. Pat. No. 5,192,342 by Baron, et al. titled "Apparatus for Enhancing the Environmental Quality of Work Spaces" provides for a portable apparatus for enhancing the environmental quality of work and living space. The apparatus combines a high efficiency particulate air filter, a gas-adsorbent element, a means for moving air, a means for releasing a pleasant odor and a means for sound masking. The odor-releasing means and sound-producing means are designed to improve the affective state, and thereby the task-performance, of persons working in the space being treated.

This device actually is coming to solve a problem that it creates which is noise generated by the high airflow rate which has an irritating effect. The current ASHRAE standards for offices and homes require 5 to 12 minutes per air change or 66 to 160 cfm for an 8 ft. by 10 ft. by 10 ft. room. Since noise, particularly the high-frequency noise of air-filtering machinery, is likely to act as a source of negative affect, [see Nagar and Pandey J. Appl. Social Psych. 17 147-157 (1987)] whatever positive contribution is made by pleasant fragrance and removal of airborne irritants is likely to be vitiated by the noise. Although removing the air moving machinery to a site remote from the work or living space could in principle, mitigate the noise problem, this is a measure that can be applied only in certain circumstances, and this is what specifically the patent is coming to make possible. The above invention offers a way of turning the noise liability to an asset: it combines the sound produced by the air filtering system with a deliberately created additional sound at a specified wavelength to produce a positive affect—inducing "pink noise". This sound is intended as a mask to the filtration system noise rather than a modus vivendi for mood alteration.

Another way of solving the problem is to distribute the air filtration over smaller less noise-producing units. There is therefore a need for an air-moving and filtering apparatus that would handle the filtration of only a small area and thus not produce noisy air flow rates, would include a means for releasing a pleasant fragrance and would include real time noise cancellation capability to mask or eliminate unwanted noises.

An area of therapy-sound-devices uses random noise for simulating signals observed in nature. Such devices are shown in the following: U.S. Pat. No. 4,819,616 to Samson (1989) shows a device which uses a white noise generator to simulate the sound of a mother going "sshhhhh" to calm a baby. Another product which uses random noise lulls people to sleep with the sound of ocean waves or waterfalls created by white noise. Yet another product is a white noise generator for offices which increases background noise to make distracting noises less audible.

In using any systems to modify an environment there a need to control, constantly reassess present conditions of the environment and the occupants therein. Shyu in U.S. Pat. No. 5,259,553 describes an interior atmosphere control system included herein, that contains a group of sensors to detect/measure indoor and outdoor air temperature, humidity, air pressure, oxygen content, carbon-dioxide content, static electric charge, indoor wall temperature, sound and light. These measured results, through a signal transfer interface, are sent to a microcomputer which also accepts a user's command as input data through a user's interface. The microcomputer, based on a monitor/control program and data prestored in its memory unit, the sensed values, and the user's command, will then execute the necessary calculation, comparison and decision, and output adequate time variant control signals, through an output interface, to actuate a series of actuators to adjust the environmental characteristics.

In a smart home connectivity disclosure titled INTELLIGENT POWER MONITORING

US Patent Publication US 20100010857 by Fadell from Jan. 14, 2010 is an electronic device operative to monitor and control processes and operations. It is comprised of Smart Home Energy Management Dashboard System that interacts with Home Plug Power line networking turns every power outlet in a home or office into a conduit for audio, video and data. The network connects devices rather than components around the living space with data transfer and monitoring without synergy between the devices carried on by the central controller and without situational awareness.

In the present invention, the devices are brought to the optimal location to service people where they are located in an indoor or outdoor living space. The delivery devices are attached to a suspended platform, drop ceiling or are affixed to the structure and networked via wires or wireless means. In a preferred embodiment the docking station is naturally combined with the lighting function. This is because it is ceiling mounted in the center of the room such that the sensors have a bird's eye view of activities occurring in the room and occupies the location and uses the utility power wiring of the room's lighting fixture. The combination light fixture and modular appliance docking system for the automated delivery of utilities and media intends to replace the state-of-the-art smart home filled with a myriad of separate devices controlled via remote control interfaces or pre-set rules with an "Intelligent" Utility and Media Service Pod. The difference between smart and intelligent is used herein to refer to an added automation functionality. The If This Then That, IFTTT rules entered by user of the smart home are replaced by an Artificial Intelligence expert system running on the logical controller. The expert system automatically provides user needs detected by one or more sensors directly detecting the user's present activity or body characteristic. It emulates the decision-making ability of a human expert by running artificial intelligence algorithms as known in the art which are designed to deduce user needs and provide the best practice conditions for the being or living space by automated reasoning about knowledge, represented primarily as IF-THEN rules. The expert system is divided into two sub-systems: the inference engine and the knowledge base. The knowledge base represents facts about user needs in a living space based on its sensor measured environmental factors and rules. The logical controller has an inference engine as known in the art of artificial intelligence and applies the rules stored in memory to the known facts to deduce new facts. Using stored behavioral models and data obtained on the behavior of that specific person human intention prediction is also carried out. The inference engine uses a user interface to provide explanation and debugging capabilities. The sensor and logical system is designed such that it perceives its environment and takes actions that maximize its chances of success using these probabilistic decision algorithms.

Within this disclosure, the term delivery-device is defined as an apparatus that supplies to people or a living space with energy, mass, sensation or information. The devices can be found in a house, room or outdoor living space and networked either physically, in power or in data as part of the logical controller controlled network of devices and include devices used for the delivery of energy and/or mass. The energy to be delivered includes radiated energy such as light energy, heat radiation, UV radiation, microwave, radio wave and sound and pressure energy where the signal may stimulate any of a human's five senses or effect change in the environs. The mass to be delivered includes material such as molecules for fragrance, humidity, heated air, cooled air, water, food and any other material. A delivery device for sound would be a speaker and a delivery device for video would be a projector, display screen, holographic image. A delivery device for light may be a lamp or luminescent device. As defined in this disclosure a sensor, detector, sensors or sensor pack or sensor pod refer to any sensor and sensor/transducer set of sensors operation in the electromagnetic spectrum such as electro-optical sensors, a photodetector, photoresistor, photodiode, an array of photodetectors, with or without a lens, a digital camera, a 3D stereo camera, a LED or laser time of flight camera system, terahertz, submillimeter radiation and detection system, a bolometer, an array of bolometers with or without a lens, microbolometers, a thermal camera, thermographic camera, a pressure transducer, a thermometer, a microphone, a barometer, a humidity detector, a smoke detector, a gas detector, a spectral meter, a seismometer, flame detector, infra-red sensor, ultrasonic transducer, ultrasonic sensor, humistor, colorimeter, occupancy detectors/sensors and motion detectors, including: passive infrared (PIR), ultrasonic, microwave, tomographic motion detector etc.

Within this disclosure including the claims the term living space is defined to include homes, indoor and outdoor areas, rooms, halls, offices, industrial buildings, vehicles, commercial buildings, institutions and any place where human beings inhabit or occupy. Within this disclosure and the claims the term "or" is intended to mean "either or both and is consistent with its technical (computer) definition where a logical OR operator returns a true value when one or both operands are true. Also the term "and/or" as in "A and/or B" is to be interpreted as meaning A alone, B alone, or A and B together and is equivalent to "at least one of A and B."

Deficiencies with the Prior Art

The prior art indicates a number of methodologies and devices, which are capable of providing stimuli to the senses, modifying and conditioning the environment, and providing monitoring and control. FIG. 1 is a block diagram of the prior art approach to the stationing of equipment in the ceiling area of a building. It shows many devices used in modifying and controlling an environment and the heavy investment required in design and infrastructure. Each separately hung device requires separate piping, conduits and clearance considerations. Air conditioning and heating ducts carrying air mass are generally provided on a room basis with air-intake as well. Lighting, media and entertainment delivery devices for video and audio need their separate locations in the room and together with their power cords are adding to the clutter in the room. FIG. 1 illustrates the lack of integration between the devices and the overall system's difficulty in preventing interference from the effects of all the devices. Separate switches/control knobs have to be stationed and power and communication lines have to be run to each device. Each device has its own remote controller and the IR sensor must be kept exposed. Limited building "Real Estate" has to be assigned to each component and the clutter exacerbates the aesthetics of the place. The plethora of individually installed devices necessary for so called increasing the quality of life in a living space, on the other hand pose a maintenance-man's headache, are expensive to mount, add complexity and aesthetically clutter the space creating an eyesore.

Office and home network systems have been proposed where each device has an IP address. Operation through the internet provides connectability to the world and between the devices for the purpose of control. Examples of internet connected systems where each device has an IP address are common in industry. However, each system is an independent device so there is duplication of processors, communications, circuitry, power supplies and other components. That is, a room may have a radio, stereo speakers, smoke alarm, a TV set, each with its own speaker. Instead, one high quality speaker system could replace them all. An example of a connective protocol for controlling industrial devices over TCP/IP is networks using Lonworks. The smart home uses many protocols from WiFi, Zigbee, Z-Wave, UPB, OpenHAB, KNX, Insteon, C-Bus and X10 among others but they all are individual device based with no integration.

The laptop computer and Smartphone are excellent examples of the device integration possible. They have placed numerous devices under the purview of a single controller. For example, upon receiving an incoming phone call the speakers will mute the music player. If cellular internet service is desired on the laptop, then a cellular internet receiver is inserted in the USB port adding web access to the laptop. No separate power supply is needed. However, the Smartphone integration has essentially been limited to the control of virtual devices such as media which need not be distributed over an area. The present integrated devices don't operate in 3D space, people need to sit in front of them or hold them in their hand. Therefore, it would be beneficial if an integrated system for the delivery of media and energy offering a hands-free solution or freedom to be anywhere in the space is desirable. However, in the physical non-media world, the laws of physics and best practice require that many forms of mass delivery, such as air and energy delivery such as lighting emanate from distributed locations for the optimal performance, comfort and energy saving. Therefore, it would be beneficial if an integrated system for the delivery of mass, and energy distributed over the area to be serviced is provided.

For illustration purposes one such stimuli generator, fragrance, is taken as an example but the same deficiencies exist with others as well. As opposed to using lighting or sound, fragrance requires both mass and electronic control. Fragrance marketing teaches the use of fragrances to effect association with pre-memorized scents. Thus if in retrofitting an offsite bakery outlet where the smell of fresh baked bread is to be artificially introduced, numerous scent dispensing devices would have to be hung, power would have to be brought to them and the ceiling expanse would become cluttered with numerous devices.

Another problem with using scent to effect emotion is that the person quickly gets used to the smell and no longer discerns the pleasing effects of the odor. Therefore, after a certain amount of time of exposure it becomes necessary to rapidly introduce a new odor and thus a close-in odor dispenser with a variety of odors to be dispensed would be advantageous. This also requires the fragrance dispenser to have a constant supply of fragrances or integral storage containers, which adds volume to the dispenser, or require it to be hooked up to a central supply.

There is also the need to control the area covered by the effect. A problem with fragrances but also with sound systems in a department store is that they are not tailored to the specific shopping area. Music for teen's clothing should be young and upbeat while the denture department would best keep things sedate. The present effect in general is storewide. Thus, in a department store, a clothing department for young male teens has the same music as the adjacent Geriatric Denture department. PA systems are very efficient at distributing sounds and messages however they are not customized to a specific area without the placement of a plethora of speakers throughout the store. Subsequently there is a need for an ability to deliver customized mood creating stimulus over the living space and again there will be numerous installations, wiring and points of maintenance.

With all the different stimuli being produced it is necessary to predict counter interactions. Recently a strobing display on a television program caused children in Japan to exhibit epileptic convulsions. Thus, a lighting system hooked up automatically to music and a separate fragrance generator without supervision may generate parameters unhealthy to the people under its influence.

Lighting in an expanse is often separated into general lighting and task lighting. In office workspaces generally the intensities vary from 300 lux in the general lighting to 1000 lux. A problem with having to set up a lighting system and its ensuing infrastructure dominates the interior design scene especially in terms of the ceiling, light switches, which equipment is to be placed within the living area to make it usable day and night. Significant engineering design and cost is involved with setting up lighting systems, their placement and double connection to the power once for power from the mains, a second time for on/off and even a third connection for diming control.

In addition without a central controller logically and operationally networking them together, one device is unaware of other and incapable of using its capabilities. For example, where a stereo sound system's sound will interfere with hearing the ringing phone or disturb the phone conversation an integrated system would reduce the sound of one in deference to the other. A security system with a view of an area usually serves one purpose. Either that of monitoring for security while a second process monitoring camera is capable of warning of deviance from planned operation. These sensors are single purpose and duplicative and are without a capability on calling on other devices to rectify other happenings within a living space. An integrated vision system would use data of a detected spill to call on a robot floor sweeper to go to the location and clean the spill before someone slips and falls.

Another problem in general is that in present technology homes and offices there is a tendency heat/cool, provide sound or video and illuminate areas where no one is there to have benefit from it. The present technology for devices that deliver light or conditioned air is such that we illuminate heat and cool entire houses and entire room areas irrespective of whether or not people are actually deriving benefit. This is because the devices are unaware of user needs in real time. That is an air conditioner system will supply cooled air to a room independent of whether or not it's occupied or not or whether the people within are thermally uncomfortable. People could be overcooled in a living space irrespective of the thermostat's reading on the wall because state of the art wall thermostats monitor room parameters rather than the actual occupant's physiological parameters and in the approximation compromises on comfort and waste energy. Therefore, it would be advantageous is sensors directly measured people parameters rather than room parameters.

In addition if one could focus the energy to sub-areas where people are located much waste of energy could be prevented. Presently, the devices used to deliver lighting, cooling, heating, water in fire control sprinklers, sound, video, etc. are incapable of delivering their energy or mass confined to sub-areas within their coverage area. Thus a fire in a corner of a room sets off a sprinkler which instead of only putting out the fire in the corner, produces water damage to the rest of the room.

In addition it would be beneficial if the multiple devices used to deliver functionality of lighting, media, climate control could be provided by a single integrating device having shared components with only a need to provide additional apparatus for the specific device's unique functionality. Thus, a FM radio would only need the FM communications IC chip but not the power supply, amplifier or speaker which is common to a music player or intercom system.

Present home, office and industrial automation systems are equipped with lighting, heating, and electronic devices that can be controlled remotely by a remote controller, Smartphone or computer. This man machine interface often requires access to an input device which may involve difficulty in finding it or it requires handling where hands free operation may be more convenient. The smart home intends to reduce the need to use the interface, however, the problem with smart home or office automation is that it requires the user to set up rules as to how it will operate. It is often inconvenient to take the time and forethought to tune the system and there are always exceptions to the rule. Also, various members of a home may have their personal preferences. To correctly control all these different energy and entertainment systems is too much bother and the "smart" home has not gained wide market penetration. Thus the majority of offices and homes are still not operated at optimal level.

To gain acceptance a more autonomous system which automatically deduces peoples' need for energy and mass based on any of persons' locations, activity, eye closure, body position, body temperature, respiration, perspiration, pulse, vasodilation, and person's identity among other properties, coupled with an energy/mass-delivery system that could selectively deliver a different amount of power/mass to different sub-areas within an area covered by the system would be most beneficial.

Therefore when looking for an integrating-platform capable of reducing the number of independent systems for aesthetic, monitoring, maintenance, supply, control and cost considerations, the already established lighting system becomes a prime candidate.

Object and Advantages

It is an object of the invention to provide an integrated, universal device platform to provide occupants within a living space the services they need in an optimal manner, at minimal cost and with least environmental impact.

It is a further objective of the invention that said services be automatically furnished to users at their present location, hands free, when they need it, automatically optimized according to best practice human engineering factors or tailored to their personal preferences.

It is a further objective of the invention that energy or mass is provided as localized to occupants' specific location as possible to the greatest benefit to the user and the environment It is a further objective of the invention to automatically deduce user needs based on sensors which detect these needs as directly as possible. Therefore, a climate control system of the present system would also measure body temperature rather than only room temperature. The advantage being that people, rather than rooms, are in need heating and cooling therefore, a more comfortable less wasteful climate control can be achieved.

It is a further objective of the invention to utilize a logical controller's unique interconnectability with sensors, internet information and delivery devices to create a unique situational awareness of an occupant and their environs in real-time allowing for the artificial intelligence system to more accurately interpret and use devices under its control to best fulfill user needs.

It is a further objective of the invention to provide a hands-free man machine interface such that devices may be controlled without the need to find or handle any other device. The objective is that anywhere a person is in the living space they may use just their voice, gesture, nodding the head or even face expressions to signal desires to the amenity delivering devices without requiring access to a switch, dimmer, thermostat, remote controller, or Smartphone.

It is an object of the invention to provide a unified platform for the generation and/or dispensing of sense stimuli for two or more of the four remotely accessible human senses, sight, hearing, touch and smell, by means of light, sound, air composition and radiation based sensation and odor.

It is an objective of this invention to provide for a unified platform for environment conditioning outlets or devices used in climate control or affecting the quality or composition of the air.

It is a further objective of this invention to provide for a unified electric power, materials supply and communication infrastructure for the various devices in the room.

It is a further objective of this invention to provide for a unified logical controller to control the devices and thereby reap synergistic effects and savings from the interaction among them.

It is a further objective of this invention to provide for a multiple sensor array for detecting the physical parameters of the living space such as temperature, humidity, pressure, geometry, light intensity, light spectrum, surface luminances, sound, vibration etc. as well as sensing the characteristics of living beings located within.

It is a further objective of this invention to provide for the provision of a variable diversity of light, sound, sensation and smell differentiated per sub-areas within the living space.

It is a further objective of this invention to provide alone or in conjunction with sense stimuli, for the elimination of unwanted stimuli such as bad odors or sounds through cancellation methods known in the art.

It is an objective of this invention to provide for the controlled delivery of energy and mass as a function of time enabling interactions between the effect and a sensor. Such interactions include the timing of lighting and the frame rate of the camera.

It is a further objective of this invention to provide for the controlled dispensing of the stimuli as a function of quantity and time and possible interactions between the various stimuli. Such interactions include the frequency of the light as a function of the rhythm of the sound and odor coinciding with light color temperature.

It is a further objective of this invention to provide for a feedback control to keep stimuli within predetermined parameters with sensors located on the combined dispensers or at other locations.

The advantages to be derived from the teachings of the methods and devices of the present disclosure include: Common infrastructure for power, communication and fixation to building. Even distribution of effects over the area. Close-in delivery of dispensed energy; smaller components, lower cost, energy saving. Close-in delivery of dispensed materials; less material, quicker effect, lower noise and energy saving. Coordination between the environment modification effects. Localization of the effects to achieve individually tailored lighting, fragrance and sound to separate individuals or groups of individuals within the living space. Reduction in the number if duplicated components found in the various devices servicing a living space Reduction of living space clutter improving aesthetics. Fewer points to be serviced by maintenance men who often have to erect costly and dangerous scaffolding to reach units. Synergism among components and devices. Lighting fixtures have power, housings, expansive reflectors capable of doming over areas and produce excess heat useful in vaporization of water and fragrance. Sensors and detectors of sound, lighting and smell for providing feedback are provided with a venue and are also evenly distributed over the area. Storage capacity inside of lighting fixture. Lighting fixture reflector can serve as sound dome.

SUMMARY OF THE INVENTION

The invention is of a stationary room robot located on the ceiling that can have various sensors, actuators and electronics added to it physically or communicatively as the need arises. It is comprised of a processor, sensors and a device docking system for the mechanical, electrical and data connection of appliances, detectors, sensors, transducers, processors, storage media, logical controllers, communications and media devices for the automatic provision of amenities and services to people. The system is expandable similar to the well-known PC motherboard with expansion slots for cards and hubs linking to peripheral devices where the expandable docking system also provides for the inclusion of material and energy dispensing devices. While a computer's peripherals are centered around the serving the computer itself, the docking system's energy, information and mass delivery devices are centered around providing people in an indoor or outdoor living space with what they need, at their location. So conceptually, instead of prior-art tech requiring the person to come to the device to get served the novel system brings the deliverable to the person where they are located.

A unique ability of this artificial intelligence system is the synergy offered by a single system capable of the local and personal measurement of user needs combined with the metered control of those devices to locally and personally deliver the energy or mass required to meet those needs. Thus, the device docking system platform is used to house the intelligent lighting fixture, sensors and amenity providing components such that they operate at optimal performance. As such, to provide a platform for light sources it must keep up-lights far enough from ceiling to prevent hot spots and must keep downlights as high up as possible such that there is a low angle of lighting to prevent glare. The platform must support the sensors including a camera vision function with optimal FOV mounting position with an ability to provide geometric locations of room areas to the logical controller. The docking system concept is that it serves as an Appliance, Media and Service Pod. The platform has a power supply, physical mounting and data transfer architecture so as to be an Expandable System Hub for add on devices—e.g. smoke detector, battery pack for emergency lighting, directional speakers etc.

Overview: The appliance docking-system is installed beneath, on or within the ceilings of a room as a means of integrating the myriad of appliances used to provide us with amenities. The basic device is comprised of an appliance mounting chassis, a power supply, a logical controller and wired/wireless communications means. In a preferred embodiment the "smart" home technology is an "open" system in terms of communications protocols, physical and electrical connectors whereby manufacturers of products can develop devices and software that integrate with the control system and bus.

The platform takes this further in a synergy with remote mass and energy delivery devices physically or remotely connected to the data and power. It also brings the synergy to a more advanced level of "plug and play". Thus, while the large dimension platform's effect is spread over a large area its delivery is localized where the occupant resides. Yet, it is similar to the laptop as a "plug and play system in that grows modularly. If a cellular internet service or FM reception is desired to be added, then a network receiver is inserted in the USB port adding web access or FM radio to the room platform.

An example of added synergy is on the operational level. Cameras used in machine vision are often sensitive to changes in lighting. Noise due to power signals such as 50 and 60 Hertz often show up as disturbing bands on the image. The periodic fluctuations are then filtered out before the frames are submitted to image recognition algorithms. In this instance of the integrated platform where the same controlling system reads the sensors and also provides the lighting, the system is aware of the frequency driving the LEDs even if it is PWM with changing duty cycle and can correctly control the power to the light source or time the camera frame so that an optimal noise-free image is obtained. Correct lighting is often needed to obtain an optimal image for recognition processing. The integrated controller controlling both the camera and lighting now accesses algorithms and changes the lighting so as to best optimize the image capture within the realms of maintaining a comfortable user experience. Thus, the synchronized timing of the lighting and or its intensity or spectral characteristics in the unique unified platform can be integrated with the camera driver for the optimization of video capture to begin with rather than filtering out noise after image capture. The power of infrared lighting used for night vision can thus be reduced where fewer LEDs are used at higher pulse power now timed to coincide with the camera frame rate.

Upon installation a calibration routine using a lensed sensor array is run to determine the room geometry and identify objects within the room. The detector array pixels are calibrated to the room coordinates and the data is stored in the controller's circuitry. Algorithms for any of machine vision or image recognition, pattern recognition, computer vision, the terminology is used interchangeably throughout the disclosure, are used to decipher data obtained from a camera. Within this disclosure, a camera is defined to include visible, IR and thermographic, terahertz and sub-terahertz cameras.

The platform is used to fixture, power and control multiple devices capable of providing sensual stimuli to occupants, the modification of the environs or the control of processes. The devices attached to the platform are operable via the platforms integrating controller. The controller has code for running artificial intelligence, expert system computer programs and includes machine learning algorithms based on inputs from user interactions with the environs and devices. The machine learning system records events and uses code to analyze user feedback in reaction to actions which were automatically deduced regarding user needs and/or environmental changes that the controller decided require intervention. This is done by the AI system using algorithms to determine the best practice operation of devices to meet needs in real time. When contradicted in a decision automatically made after one or many such learning events the AI system has code for machine learning known in the art for altering the stored best practice data. The uniquely constructed system and algorithms learn from data to distinguish between situations and classify new situations for specific system responses. Using code known in the art of machine learning systems, the controller constructs a representation of the data instances and uses functions to evaluate the instances. Thought this disclosure when referring to the automatic delivery of mass, information, or energy to a user in an optimized manner, the definition of the term automatic or automatically is an action produced by the system's controller using stored algorithms run on a processor for regulation of processes without direct human intervention. The controller monitors and physically alters via electronic apparatus the operating conditions of the delivery devices used to supply user needs. The controller is comprised of electronic circuitry designed to: acquire data from sensing elements or user input devices, store and retrieve data, process algorithms for acting on stored or acquired data, generate control and power signals to drive the delivery devices and communicate with people and other devices. Thus, the term automatically refers to a full electronic control loop with processing, actuating and feedback is executed and that is the intended use herein. Similarly, used thought the disclosure the term controller knows, has information, detects, controls refer to a computer program for instructing a computer to perform the method of obtaining data from the sensors, obtaining values and instruction sets from memory circuits, processing the instruction set and generating control signal to operate devices and receive feedback signals from those devices as to their present state of operation.

The machine learning program has algorithms to compare data obtained from the sensors, commands issued by the controller, the output of delivery devices, information providing sensors and data from user inputs. The controller has machine learning computer programs known in the art that learn from experience E with respect to some class of tasks T and performance measure P, if its performance at tasks in T, as measured by P, improves with experience E as measured with a decrease in user intervention over time.

In another novel aspect of the invention the situational context of the user is used to understand gestures, expressions and voice commands as well as search queries submitted to the internet. SIRI of Apple Computer and Google Now are examples of voice assistants arranging submitted queries and providing results. Very often poor results are obtained due to ambiguous wordings by the user. Part of understanding the true intent of a query such as "Jaguar's top speed"—the animal or automobile may be aided by the context from which it is asked. So, if the TV projection system is a part of the appliance docking system, the control system has situational awareness of the channel, if not the actual data of the show's content from the program guide, and thus, if it's detected a person watching National Geographic channel, the contextual and/or situational information now allows for an augmented query to be submitted to the search engine for the animals speed. We thus describe a new paradigm for performing search in situational context. This includes using the platform sensor pod's temperature, image, humidity, gas and sound detection sensors data on the person's activity and body parameters, room parameters, as well as the controller's data on outdoor weather parameters and the instantaneous functions being performed by devices to generate a situational context for better interpretation of the user's commands and/or queries. Thus, if the sensor tracks the person has moved proximate to the TV screen which is off, and the person says "computer turn it on", the controller uses algorithms to assess the movement and proximity to determine the most probable intent to be the TV and not the lighting. Thus, without needing a second stage of back-query "turn on what device?", the robotic system has more seamlessly integrated with the user. If the controller has begun ringing an incoming phone call over the speaker and the person reacts in a timely fashion with a gesture, the situationally aware AI inference machine can in context associate the two events interpreting the user's intent as wanting to answer the phone. The significance of the new situational context-based approach lies in the greatly improved command response of the controller and/or accurate information retrieval from the internet thereby providing users with results the largest part relevant to their needs the first time around.

The integrated sensor and delivery device control system utilizes the combination of sensors to detect sound, motion and vision thereby facilitating a man-machine interface similar as possible to man to man interface. Besides easy control, it makes many more features of devices easily accessible as a natural programming process occurs as situations occur. The controller recognizing or hearing a user need, where the need fulfillment methodology is still undefined, offers a menu of possibilities for different devices or stored content of media or material. The user having heard the options makes the choice by voice control. As opposed to prior art rules based systems that need to be preprogrammed this is simple to use allowing for machine learning of correct solution or personal preferences. Using combination of sound and vision sensors to detect where a person is facing towards, pointing in the direction of or proximate to a device of known coordinate and/or functionality and although by the user's speech or gesture an ambiguous command, not specifically describing the device that is to be interfaced with is given, even this command is now associated in a most probabilistic calculation by algorithms based on the sensed data as referring to a specific device whose functionality best fits the immediately deduced situation. Using face recognition and a user's stored preference or user profile further disambiguates the expert systems choice of action to be taken. A more natural communication between man and the devices obtained by utilizing more than one sensory perception, stored data of preferences and device characteristics and functionality has many benefits.

The same situational interpretation is used by the logical controller running probabilistic decision making algorithms for gesture recognition. The proximity, or face orientation to devices or the directional aspect of the gesture in relation to an identified object or device at a known coordinates are used to disambiguate the user's intent. This means that a limited set of gestures is universally applicable to numerous devices. Thus, if the image sensor tracks that the person is situated or is moving proximate to the TV screen and the person snaps their finger, the controller uses algorithms assess the movement and proximity to determine the most probable intent to be the TV and not the lighting. Thus, if the TV is off the gesture will be interpreted as turn the TV on. On the other hand, if the person raises their hand pointing towards an illuminating light source and snaps their finger the light source is turned off. A unique feature of the integrated sensor system having image recognition of devices or room features and has obtained their location's coordinates is the ability to recognize head facing direction and/or arm and or finger pointing. The computer vision system has data storage circuitry and can save a number of seconds of frames backwards in time. If a voice command is now given in conjunction with the finger pointing, the computer vision system algorithms use the previous frames stored in the controller system's memory device to recognize the gesture and determines the vector intersection of the finger or hand pointing with a room feature or device and associates the voice command recognized by the controller's speech recognition algorithms to the feature or device. A gesture, smile, frown or other expression or positive nod gesture or negative nod gesture is situationally interpreted in context based on: 1) if action was initiated by the controller such as turning on a fan controller or 2) controller speech generator has made an audible query or 3) controller over a display device has made a text query and the individual or group of individuals is responding. This illustrates the natural way people normally interface with other people around them by utilizing more than one sensory perception and context to interpret another's intent. In a similar fashion the camera, microphone, speaker and display screen are used in the novel man machine interface of the integrative device presented in the disclosure to effect a natural interface without need to learn new signs. The person interacts with the machine using gesture body language facial expression and voice as they naturally would with people and the artificial intelligence system employs the processor and algorithms to interpret the pantomime, expressions, gestures and other signals in relation to the device and service desired.

Another advantage of the location based network of delivery devices is its ability to direct energy for powering or charging portable devices located in the area of its coverage with one or more connected power charging stations. The sensors are capable of identifying the location of devices as well as people. This capability is used by the controller running algorithms upon detection a device in need of charging and having wireless charging apparatus to be charged in situ. That is, a device that it is in communications with, and the controller and the camera vision system has identified it and its location, is now charged employing magnetic resonant wireless power transfer technology. Efficiencies and safety are achieved in the power broadcast because of camera vision location knowing where to aim the focused beam. Therefore, wherever the device is placed in the room it has relatively close by charger or a charging station that has a direct line of sight coupling without passing through living beings. This is an added feature for those concerned with safety of the radiation passing through people. The camera derived location is then used to aim or re-position the movable charging station to the position on the platform chassis best suited for efficiency and or safety. In cases where an individual is detected as being in the path, the charging would be paused.

As a result of the novel design the integrated device platform system contains different components (and not entire devices) such as camera, microphone, speaker, smoke detector etc., all within one platform that synchronizes all of them. The control system of the devices is uniquely "situational" which means it analyses the room in which it's located, the people, actions within there, and response correspondingly. For example, the control system has image recognition software that is programmed to distinguish when water spills on the floor and instruction set to call the robot cleaner to clean the spill, but when someone pours water to clean the house, not to call the robot cleaner to clean the spill.

Additionally the integrated delivery system is highly "local" since the system maps the entire room into 3D coordinates with very high resolution. For example, the devices such as a directional microphone or a speaker may be placed and directed by the controller driving the motorized pitch and yaw movement mechanism mounting them so only one person's voice is picked up or one occupant can hear the directional speakers output.

Most non-portable devices located on ceilings and walls require any of the following: a housing, affixation to the building structure, hook-up to power, hook-up to control signals and communication, re-supply of depleted materials and general maintenance. They also take up room and thus contributing to clutter creating an eyesore.

The premise of one of the embodiments of the invention is that lighting fixtures are almost always installed throughout modern living spaces, typically suspended from the ceiling and often lowered into the midst of such areas. As such they provide a close-in, architecturally accepted and already hooked-up to the infrastructure unit on which other devices may be integrated into a unified Environment and Mood Modifying and Control Device (EMCD). The intention is to provide an innocuous platform on which elements capable of generating effects and carrying out processes including, electromagnetic, mechanical and chemical stimuli. These include light, ions, sounds, odors, air quality filtration and air make-up, which create an atmosphere conducive to carrying out tasks, affecting a person's moods or providing therapeutic action to the body and or mind.

It is another premise to provide a structured platform enabling the gathering of all devices distributed on the ceilings and walls in a certain area of a building such as detectors, lighting fixtures, alarms, safety lights, heaters, air conditioning outlets, motion detectors etc. and concentrate them into a single device called a Localized Service Platform (LSP) and providing that platform with all the utilities, e.g. water, electricity, compressed air, natural gas supply etc. and communications capabilities required. An onboard central processing unit can execute control signals to individual devices and control interactions between devices. Self-diagnostic routines are built into the device and data sent back to the building control central.

Alternately the devices can be hidden in the space between the structural ceiling and the suspended drop ceiling. Here in the plenum space the fixturing is supplied by the buildings structure or ceiling suspension elements. However as according to the teachings of this disclosure the controller and/or power supply is shared as are common functional components such as amplifiers, speakers, video screens etc. via wiring as with the platform chassis embodiment.

The present disclosure logical controller's artificial intelligence expert system can predict if a person (not a room) has a need and automatically provides lighting, heating, cooling, entertainment, information etc. at their specific location. Servicing people and not room (people centric vs. room centric control) is a totally different quality of service (thus the controller doesn't over illuminate, over-cool or overheat people) while at the same time offering a hitherto unknown level of energy saving. Its WiFi-ed smart sensor pack (using light, IR, sound etc.) provides the house's HVAC, safety and media devices with real-time information on where people are located, who they are, what they are doing and can even measure basic body metrics such as temperature and pulse. When the controller doesn't know what's desired or what room the person is moving to next, it can query and get voice or gesture inputs (or even inputs from a Smartphone as a last resort). With this real-time information provided by the centrally located sensor pack (inconspicuously packaged in the strategically located overhead lighting fixture) and a series of new-technology devices capable of the localized-delivery of lighting, heating, AC, sound—different rooms and even subareas of rooms can receive different levels of light intensity, sound, cooling etc. based on occupancy, usage and learned personal preferences. The platform's integrated vision system uses data of a detected spill to call on a robot floor sweeper to go to the determined room and location coordinates and clean the spill before someone slips and falls. The measure of urgency is programmed based on the occupancy and not only on the spill.

The platform's sensor pack uses indirect measurement via its sensors to directly measure the parameters of indoor or outdoor living area occupants such as their age, location, body temperature, the appearance of sweat etc. This, as opposed to prior art systems such as thermostats that measure room parameters alone. Thus, a climate control system controlled by the platform has better information to correctly control the climate than do state of the art systems. In the docking platform there are any of devices and sub-components of devices used to deliver lighting, cooling, heating, water (as in fire control sprinklers, drink dispensers), sound, video, fragrance, humidity control among others. They are capable of delivering their energy or mass to sub-areas within their coverage area. Thus, a fire in a corner of a room sets off a sprinkler which has aiming control equipment to swivel the nozzle to the detected fire area thereby, by only putting out the fire in the corner, it reduces water damage to the rest of the room. For safety, above the aimable fire nozzle is a standard sprinkle nozzle for redundancy. It will activate in the usual manner should the aimable nozzle not succeed in extinguishing the fire.

The modular system's hardware and software architecture is capable of growth in terms of number of devices performing different functions as well as in the quality of the delivered effect. As an example, when the smoke detector was installed, it came with a buzzer since there was no other speaker connected with the platform. Eventually, as the user purchases and adds to the docking station a speaker system, its onboard circuitry upon installation sends data to the controller on the sound generating characteristics. The controller, from a stored look up table of characteristics determines and sets flags in the code that the new speaker is the preferred sound generation device for the smoke detector upon alarm, but not during test. As the hardware is updated so is the software for the smoke detector functionality updated. With a microphone and speaker hardware now available, the controller runs and installation program where the user is queried as to the smoke detectors room of placement identifier, where that identifier is used during alarm to provide information on the fires alarm's location such as "smoke detected in children's bedroom". In this procedure shared components in the docking system can change the device used to generate sound, light heat etc. when installed and thereby increase the effects quality as well as overall service quality.

As an extreme example of the synergy of the shared component docking system the alarm clock functionality built into the logical controller normally uses a speaker alarm to waken an occupant. However, some occupants have difficulty in getting up and an alarm buzzer is not enough. Therefore, in addition the other components of the networked system may be used to awaken a deep slumberer. The light sources may be strobed, the music player can play a clamoring song, the fragrance dispenser can dispense a skunk smell and if that arsenal is not enough, the sprinkler can spritz the sleeper with water on the face. Therefore, the user interface program with the controller has been programmed with code allowing for the user to see the available devices. The user by interconnecting the icons of the alarm clock and the sprinkler in the GUI program has arranged the alarm clock program such that is programmed to make use of the sprinkler to awaken that system recognized individual. The sprinkler has valves to set the flow and time and the GUI program lets the user set these parameters to minimally wet the bed with the camera serving as feedback to alter the valve opening so as to correctly direct the sprinkler stream to the slumberer's head. Hereby, the clear advantage of integration on the component level of the present invention can be seen.

Whereas present technology homes and offices heat/cool, provide sound or video and illuminate areas where no one is there to have benefit from it, the present technology uses controlled devices with apparatus for the spatially controllable delivery of light, radiation, sound, images, fragrance or conditioned air to specific areas where users are located, In place of illuminating, heating and cooling the entire house or entire rooms areas irrespective of whether or not people are actually deriving benefit the platform of devices has multiple devices distributed over the area to be effected that are equipped to focus the energy to the sub-areas where people are located thereby preventing the discomfort and massive energy waste of present monolithic delivery devices. Having a focusable device requires that the control systems have sensors that have spatial differentiation. A passive infrared motion detector is very good at detection but has no spatial differentiation with its coverage zone. However, a lensed photodetector array will register different sub-areas of its coverage area on different pixels. The controller has factory set or run a computer routine and correlated room coordinates to pixels and has a routine to correlate the devices output coordinates of influence. The integrated spatially differentiated camera sensor detects occupancy in an area and drives the specific device that provides service in that area.

The use of sound, voice, visible light, IR and far IR sensors allows the system to be people based rather than room based which uses inference to determine user's needs and is highly inaccurate. People are in need of the heating, lighting and cooling not the room as in prior-art systems, so in the present technology, the location, body position, activity, body temperature, sweating, etc. is measured directly such that an artificial intelligence system measures the temperature of the people in the room not the room temperature.

While there are presently some home, office and industrial automation systems where homes are equipped with "smart" lighting, heating, and electronic devices that can be controlled remotely by a remote controller, Smartphone or computer the market acceptance has been low. The platform delivery and control apparatus of present disclosure run algorithms known in the art of artificial intelligence expert system and thereby provides a much more automatic man machine interface rarely requiring access to an input device. In addition, with little need for handling the devices can be located up in the ceiling area reducing clutter and offers hands free operation that is more convenient. An additional benefit if the image-sensor based control technology is that various members of an office or home may have their personal preferences. Using image recognition, the platform's logical controller stores a person's manually input preferences or automatically learned preferences from occasions when the user contravened the AI system's decision in a data file of the user's profile in its storage circuitry or media. Alternately, or in addition to the controller uses voice recognition algorithms to identify the individual. The controller can then corroborate the identification by both methods increasing chances for correct identification. Thus, the autonomous system which automatically deduces peoples' need for energy, materials, information, communications and entertainment based on any of persons' locations, voice and or gesture commands, body temperature, activity and person's identity among other properties, coupled with the mass and energy-delivery system that selectively delivers a different amount of power or mass to different sub-areas within an area covered by the system is most beneficial. The easy to operate smart home finally achieved with the present system increases the chance for wide market penetration whereby more and more offices and homes will be operated at optimal level bringing people added comfort, saving energy costs and the environment.

In a preferred embodiment, the controller's operating system is open such that developers can write their own applications and such application can be added from a flash memory device via a USB port or downloaded for the internet as is done for i-phone or Android based applications and operated via the controller. An example of an application that can make use of the synergy of the integrated system is a system having devices a) for managing all telephony, such the land line, cell phone calls and/or voice over IP communications, b) equipment for displaying wireless or cable television broadcast and c) an ability to send text messages. The controller controlling the TV content and all telephones can automatically divert calls when the occupant has instructed the system to hold calls or has made a rule for the control program or execute regarding what to do or content of the message to text to the caller when user is viewing critical TV events. Thus, when the occupant is watching a football game and only desires to be disturbed during break time. The camera vision system observes that the person is watching the game and invokes via the Smartphone or regular land line a text message to be sent that they're busy and will call back. The TV player or the platform's computer vision or microphone sound recognition system monitoring the TV feed recognizes that a break has come. To this end, a commercially available program for removing TV commercial can be used or a system such as that described by Glasberg et al. Recognizing Commercials in Real-Time Using Three Visual Descriptors and A Decision-Tree by the Communication Systems Group, Technical University Berlin. At the beginning of the detected break, the control system suggests to the occupant over the speaker system the option of returning the missed calls.

The same break recognition system can work with interconnected program recorders to turn them off and on when the break comes or a commercial program for removing commercials from recording can be adapted to monitor in real-time and indicate to the controller that a break has occurred and the controller can make the calls or start the coffee machine via its smart home interface or work as known in the art. When the controller's sensor sends information that a person is advancing towards the TV viewing location it automatically turns on the TV. A voice command such as "News" can have the TV automatically go to the most watched news station having been logged and learned by the machine learning system. If the user is face recognized by the controller, then the TV turns on to the manually or machine learned stored channel of preference.

Another example where situational awareness of an operating system networked to other devices is as follows: There are systems which circulate water from the hot water pipe to the cold water pipe such that when the hot water tap is turned on hot water is immediate delivered (see Metlund® Hot Water D'MAND® Systems). A camera system based in a bedroom with an attached bathroom has stored algorithms which the processor runs such that it generates a data message of impending entrance to the bathroom. The controller then sends data via the communications circuitry using a communications protocol to a controller in the bathroom that turns on the power to the water circulation pump and valves even in advance of the person's entry.

Just as delivery components and devices can be added, so too can sensors be added to the system's sensor pack. Many sensors would perform better if they were located in an optimal position vis-a-vis one or more occupants. Thus, in an embodiment, the docking platform with a distributed bus is outfitted with a robotic arm or an embodiment where the device base is motion equipped, the sensor can be moved to a more optimal position. Microphones, cameras heat sensors etc. could be added or moved into positions recommended by the logical controller, where a lack of signal or data has been determined by the machine learning computer program as a deficiency that can be corrected by obtaining more accurate data or input by an additional and/or more correctly placed detector. When a camera added its location is determined by the controller and the controller runs a calibration routine program to determine pixels which receive images that correlate with the area covered by another camera. After the addition and calibration of the new sensor the controller re-programs the operating code to use the new sensor to obtain superior input from that area. An added microphone of better location or better quality of voice acquisition is similarly calibrated into the sensor pack system.

The synergy in the camera monitoring system exhibits itself in a localized monitoring of the camera image around users versus heretofore monitoring within the entire field of view. That is within the optical flow, when the motion detection system has identified an occupant and then passes on to a tracking recognition computer routine. When motion has been detected as having stopped and the controller has now a location for the occupant within the rooms 3-D space; the controller of the computer vision system reduces the Region of Interest, ROI, to those pixels in the immediate location of the occupant. The controller also has control of the lighting in the ROI especially since the occupant needs the lighting and adjusts the pulsed lighting with the frames to maximize image acquisition quality and computer vision activities become area specific. Rather than needing to run image recognition algorithms on the entire camera image, only pixels in the occupant's location or near the room's entry locations are processed. Thus, the accuracy for activity, expression and gesture recognition can be increased by using the full pixel array by removing the binning of pixels without overloading the DSP. For further accuracy in the detection of a gesture by the occupant, a number of frames back are saved into memory and if a motion is detected the frames are played back using multiple image recognition techniques to best decipher the user's intent.

DETAILED DESCRIPTION OF THE INVENTION

Figure 1:
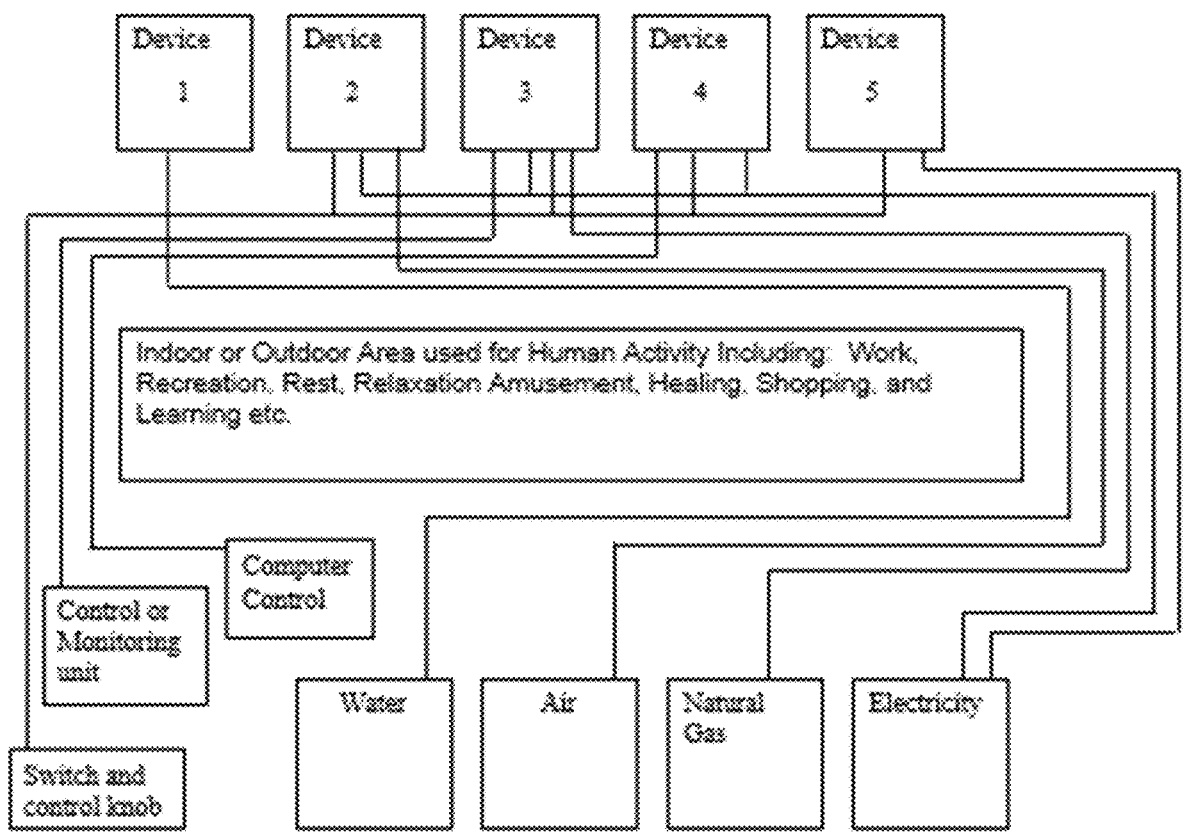
FIG. 1 is a block diagram of a combined mood generation system. Prior-Art Multiple Independent Devices with Separate Affixation, Supply Connections and Controls
Figure 2:
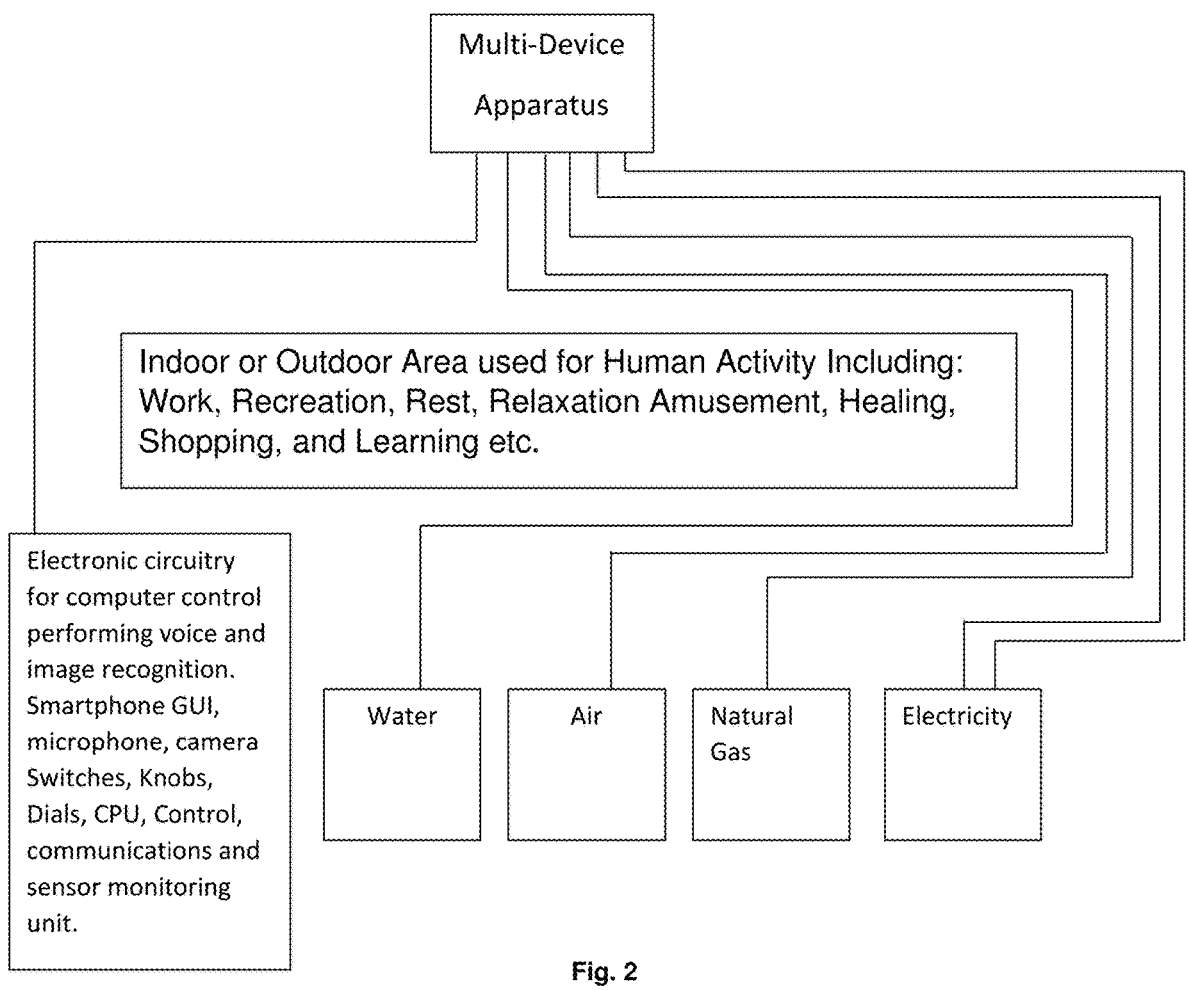
FIG. 2 is a block diagram of a Multiple Integrated Devices with Common Affixation, Supply Connections and Controls

FIG. 2 is a block diagram illustrating the simplified approach, as taught by this invention, to provide services, environment-modifying materials and radiations, monitoring, media, control and communications to a living space. Essentially one location in a room takes on as many functions as is practical when considering possible interactions from a safety, cost and functionality perspective. Many similar components such as power supplies, housings and control circuitry are shared between the devices. As is apparent when comparing the figures, the single integrated multi-device apparatus of FIG. 2, which replaces the many independent devices of FIG. 1 simplifies the communication to it and from it as well as structural, piping, control and maintenance points to be considered. FIG. 2 thus clearly illustrates a system which provides a less complicated solution to environmental control of living spaces used in work and leisure.

Figure 3:
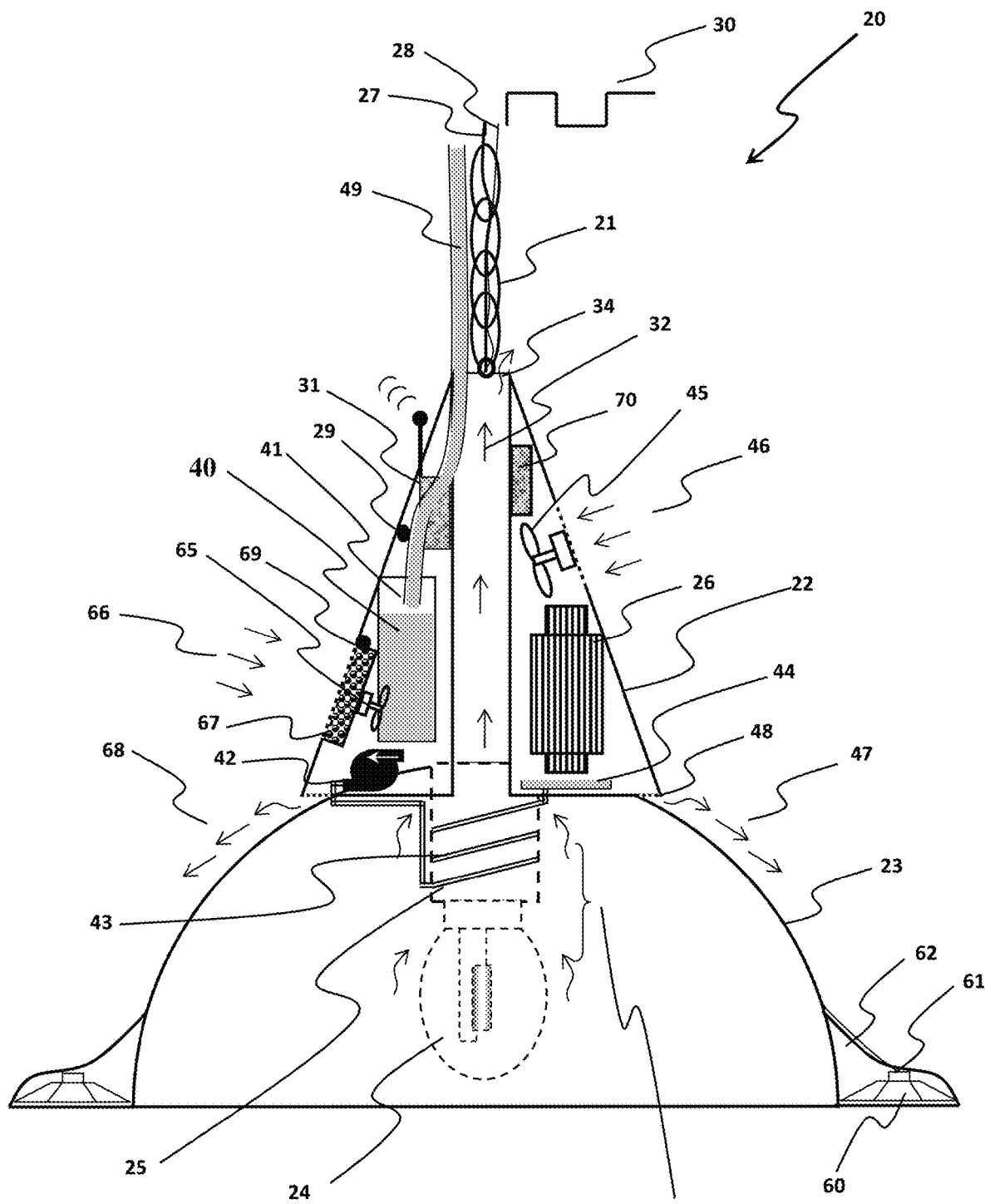
FIG. 3 depicts an EMCD Apparatus used to Modify and Control Conditions Within a Living Space

Embodiments of the present invention will now be described, by way of example only. Further details and advantages of the invention will emerge from a description of a preferred embodiment which is illustrated in the drawing FIG. 3. The apparatus combines light producing element with fragrance generators, odor eliminators, air cleaners, including a particulate air filter, an ion generator, a means for moving air, a means for releasing a pleasant odor, a speaker system or a total sound system, a device capable of real-time sound masking or noise elimination, sensors for measuring intensity of effects and characteristics of the room environment and occupants and a computerized control device. The end result is a contrivance capable of introducing or modifying the energies and materials present in the physical surround, which we will call atmosphere modification. The purpose of many of these devices, rather than only providing for the physical wellbeing of persons under its influence, is to effect changes beneficial to their mental well-being or mood. People may use this apparatus for their own benefit, for the benefit of others, or owners, who have control of the living space, may employ it for their own purposes or purposes of exploitation.

A unified Environment and Mood Modifying and Control Device (EMCD) 20 is an apparatus comprised of a number of devices capable of different environment and mood modifying and control functions. It is comprised of both shared and unique components for each function. The EMCD 20 is equipped with affixing chain, stem or fastener 21 to facilitate attaching it to the building structure. The chain is attached to the EMCD housing 22 to which is attached directly or via other components all other mechanical and functional elements. The EMCD has great similarity to a typical lighting fixture and may be expected by people to be hanging where it is and is thus not an eyesore. The components affiliated with the lighting fixture/luminaire function and look are the reflector or shade 23, lamp 24 which may be a discharge lamp or an LED lamp, lampholder or socket 25, power conditioning equipment, electronic power supply or ballast 26 and power cord 27. The ballast 26 may be of an auto-regulator transformer type or switching power supply with voltage taps at 6, 12 and 24 volts for the operation of ancillary equipment. Optional control wiring 28 for a dimmer or other control is often present with modern luminaire lighting systems and is shown as 29 with a control signal 30 sent from a dimmer or other control device. An embedded controller, microcontrollers (i.e. CPUs with integrated memory and/or peripheral interfaces, DSPs, ECU or electronic circuitry with or without media storage and data communication capabilities 31 is used to control the luminaire's operation or that of the EMCD in general or that of any of the other devices in particular and is a shared component. The lighting fixture function is often enhanced by a dimmer 29, or alternatively utilizing electronic components a process that ECU 31 and power supply 26 can effect in place of dedicated dimmer 29 thus replacing it. The heat generated in a luminaire is possibly disruptive to the functioning of other devices such as communication and control electronics. In order to keep the reflector and equipment under the housing cool, a thermal chimney 32 is used to channel the heated airflow 33 out through the top of the EMCD at 34. The correct thermal design of the EMCD has grouped heat sensitive equipment such as the electronic computer and communication equipment, fragrance storage, and sensor/detector components on the "cool side" of the EMCD and the power supply and other heat tolerant components on the heat producing side where each effect has been used to advantage.

A fragrance generator/dispenser device is mounted within the EMCD 20 as well. It is comprised of one or more fragrance, scent, perfume, odor or aroma generating or eliminating materials 40 contained in one or more permanent or replaceable containers 41, or supplied in real-time via outside piping, which flow in a controlled manner, driven by gravity or pump through a valve, constriction or pump 42 through tubing 43 over heated socket 25 where it picks up heat to facilitate vaporization in a wick or pan 44 located by the heat generating ballast 26. Alternately scented air is supplied from the outside via tubing or a nebulizer unit replaces the pan 44 and the fluid in it heated along the way. Alternately the heating is not provided to the fragrance by the socket 25 but by the ballast 26 or both in combination. A fan 45 induces airflow 46 to enter ballast compartment, evaporate fragrance 40 from the pan 44 and exit as a downward headed air stream 47 through orifice 48. The fragrance reserve 40 is depleted over time and must be replenished. The re-supply can occur as in typical air freshener devices, by replacing the entire fragrance storage container or by hooking up the EMCD 20 to a central fragrance supply system and piping the fragrance via tubing 49 into the refillable storage vessel 41. The flow to the evaporation wick or pan 44 may be natural, based on capillary action or be forced by gravity or the pump 42 and controlled by a float sensor on the pan 44. The control logic for turning on fragrance generation and system performance may come from the ECU controller 31 or via control wiring 28.

A sound generating device which consists minimally of speakers 60, left and right, which receive signal from outside sources via the control wiring 28 or power wiring 27 is mounted within the EMCD 20 as well. Stereo wires 61 are taped onto the reflector under a decorative decal. The speakers are aesthetically and innocuously housed in the speaker niche 62 provided. A complete autonomous audio system can be provided between speakers and ECU control logic unit 31 which may have storage media with canned music. If required by the by the need for privacy, the speakers 60 are highly directional limiting noise pollution outside of its coverage zone. Power is supplied via cable 27 the shared power conditioning equipment 26.

A negative ion generator and/or ozone-generating device similar to those available commercially is mounted within the EMCD 20 as well. A fan element 65 pulls in room air 66 over a high-voltage-ionizer and/or filtration unit 67 and the treated air 68 is expelled downward into the living space. Control from the outside world is accomplished via control wiring 28 or from the ECU controller unit 31.

Sensors 69 capable of detecting general environmental conditions such as temperature and humidity as well as parameters specific to the control and operation of the EMCD such as light, sound, air quality and odors are installed in the EMCD 20. The specific location of the sensor pack 69 is dependent on the specific function they are to carry out. Thus, sensors may be spread over the EMCD located at optimum sites. An "artificial nose" sensor would optimally be placed near the air intake of the ionizer/filter 65 device or ballast compartment fan 45. A camera sensor with a fisheye lens for image recognition or surveillance can be located at the center. Feedback control of the light, fragrance, sound and air quality generators can be carried out onboard with the ECU 31. Power is supplied to the sensors 69 directly by the ECU or via the shared power supply 26. The sensor pack 69 can contain detectors typically found in living spaces. These include smoke, fire, gas, burglar alarms and motion detectors. It can also produce alarms for the above, whether audible, using the sound system speakers or special speakers, visual, such as flashing of the light source or of a separate light source or electronic signaling via the communications network back to a central control. To ensure an onboard supply of power to these critical detector functions a battery, fuel cell or other energy storage device 70 is included in the EMCD.

It is clear from the description that the sum is greater than the total of the individual parts. There is a synergistic relationship between the various devices with many shared components resulting in a reduction in energy use, space and cost. The cooled power supply or ballast compartment has an added benefit of increasing the lifetime of the ballast 26. It is also evident that a stripped down EMCD 20 consisting of just the lighting fixture elements and any one or more of the other devices such as the fragrance, sound, air filtration and ionization is possible and that external wired 28 or onboard processed 31 controls allow for the combined, independent or simultaneous operation of any of the devices.

In another embodiment of the environmental modifying device is an expandable, yet integrated mounting device or Modular Delivery Device Docking System, MDS. It is designed to be positioned over living spaces in homes, offices, and commercial installations, low bay and high bay industrial halls. In a preferred configuration shown in FIG. 9, the MDS platform 200 is comprised of a chassis 201 offering the modular addition or change out of all components excepting the structure providing the physical attachment to the ceiling 202 and the hook-up to utility power 203. The modular system is unique in that it can accept devices 204 which are fully working appliances or components that work together with other components via the controller's computer bus, USB, Ethernet or other protocol based network connection. In a preferred embodiment the chassis serves as the low voltage 24 or 12V DC power bus. Data signals may also carried over the power bus. High data transfer rates may include the need for a physical cable hook-up such that the chassis 201 has a channel for running Ethernet, HDMI or USB cables. A light fixture is a first candidate "resident" appliance of the MDS as it takes up its place and power on the ceiling. The housing 205 contains structural fixturing and utility power wiring for power supply, driver, controller and communications circuitry 206. The controller 206 contains all the processor, cache memory storage, communications circuitry, long and short term data and algorithm storage devices printed circuit boards sockets, power control and drivers necessary for the functioning of the sensors, processors, actuators and delivery devices of the platform 200. The controller may use of an onboard processor or make use of another computers processor that it is in communications with which may be in the home on available via the web. Alternately, a number of devices on a platform or a number of platforms in the same or different rooms can share their processors in grid computing using a distributed computing program on the controller. The control and electronic circuitry is expandable in a similar way to the way a PC computer motherboard printed circuit board has expansion slot and data bus expansion capability. A backplane architecture or mother board architecture is used as in known in the art, to allow for additional components to be attached to the computer bus, which includes processors, micro-controllers camera modules, sound cards, communications cards video cards, modems, network cards, active and/or passive storage devices, clock, radio tuner, TV tuner cards, cards providing extra USB or FireWire slots and other custom components following PICMG 1.3 specification or other plug and play and communications specification such as USB, Ethernet or Firewire. The communications may be added on a single card such as a USB 3.0 and 1394A Firewire and Ethernet Combo PCI, PCI-E Card or come as a SOC on the processor board.

The platform has circuitry to accept plug and play devices added and ported during a boot-time assignment or has hot-swapping functionality using connectivity protocol of the Universal Serial Bus (USB) that allows users to add or remove peripheral components and device resources and to hotplug systems such as is known in the art with USB and IEEE 1394 (FireWire) technology.

The platform controller 206 has the circuitry to use any of the smart home protocols WiFi, Zigbee, Z-Wave, UPB, OpenHAB, KNX, Insteon, C-Bus and X10 among others to communicate in the smart home from platform 200 to platform 200 or to other communications ready device not on the platform 200 where some of the communication can come over the home or office power lines.

The MDS 200 can be configured to serve as a multifunctional LED lighting fixture for the office or home living area. In a bedroom which is comprised of mounting structure to ceiling 202 and housing 205 for power supply, driver, controller and communications circuitry 206. The overhead fixture 200 provides general lighting dimmable down to below one percent and two overhead led narrow beam spots 207 replace two table lamps. The controller operating selected LEDs 208 on the MDS which are aimed away from the sleepers' eyes at very low power provides a night light function and replaces typical night light plugged into an outlet. Emergency light functionality is modularly added to the same system when a battery 209 is connected to the MDS. It serves in an—battery backup lighting mode during power failures.

In a specific lighting application configuration the fixture 200 is used in a master bedroom approximately 4 meter square with general lighting provided at 150 lux with possible 200-300 lux overdrive mode for 5 min—in case where a user is looking for a pin on the floor. The fixture uses uplighting—up to 30% for a pleasant illuminating effect especially in area where eyes near pillow naturally looking up can be glared. For uptight 210, a preferable configuration is to redirect light by arranging the LED and optics such that the light emanates out of non-dust collecting surfaces. Dust may affect cooling fins operation over time and thus in a preferable configuration the large fin surfaces for natural convective air cooling are vertical. The larger spread out design of the platform 200 in FIG. 9 allows for eliminating the noise generating and failure-prone cooling fan for the processor or power supply. The two task lighting reading lamps 207 are tightly controlled beams of between 10 to 20 degrees with no spill light to glare a sleeping roommate able to provide 500 lux each where in one configuration the design architecture is plug and play allowing for additional purchase of spots lights for reading, putting on make-up etc. where each LED spot unit upon installation uploads code and has an identifier and controller 206 now has specific instruction sets how to drive each one independently at its own intensity and/or spectrum. The very low dimming level is such that night lighting is from the level of moonlight at 0.1 lux to 0.5 lux bedroom perimeter for orientation. The nightlight distribution of light illuminates the path around bed and doesn't wake roommate when someone goes to the restroom in the middle of the night. All or specific LEDs are dimmable at least down to 0.33% of max for 0.5 Lux. The user may choose night light variably or have a choice of 3 levels—0.1 0.5 and 1 lux via the User Interface UI, provided from controller 206 via Bluetooth communication to a Smartphone. The UI options range from dedicated IR remote controller to voice recognition with Smartphone app or PC computer program having GUI to control various functions, to set preferred light levels, color spectrum and operating rules with gesture recognition also an interface option.

The fixture physical dimension in the said configuration is large such as 1 m dia. Circular track lighting design so as to spread distribution of general lighting LEDs 211 over most of the room such that shading and glare is reduced. The fixture attachment to ceiling uses standard mounting hardware for DIY which has equipment to allow for positioning the square-ness of the light distribution relative to the square-ness of the room, bed pillow location and window location for factory mounted light sources which are designed to give an even distribution over the room.

The fixture 200 has wiring equipment to hook-up to the utility power supply. In an alternate configuration an E26 or E27 lamp socket of the existing fixture is used to draw power using a lamp base to draw off power to the new MDS. The installer only needs to screw into existing fixture socket making it safer and provided clamping devices are used to mechanically attach new fixture to the old one.

In non-factory installed systems the LED 211 light attachment to the platform's chassis 201 and aiming is done via a ball joint or gimbaled system attachment base for flexible aiming. The LED cooling is accomplished being thermally connected in one of three possible configurations: 1) the individual LED thermal pads are in contact with the fixture structure which is used for cooling 2) PCB mounting based cooling 3) special heat sinks per LED array at aiming direction. The LEDs generate the light pattern based on their aiming and to give an even distribution, up to 50 individually aimed LEDs can be used. The LEDs light may glare occupants in bed looking upward and movable louvers, shading or blinders make sure no rays are directed at sleeping eyes. One or more cameras 212 are used for computer vision. One camera overhead uses a fisheye lens or two or more cameras angled from ceiling to floor use wide 100 degree or regular lens. For night for night vision—a PIR detector can be used to turn on IR LED illumination. A sensor pack 212 can include numerous sensors and be concentrated in a single location or the sensor pack devices can be distributed around the chassis 201 adding distance between the stereo sensors adds fidelity. The sensors in the pack 212 can include hardware including the firmware or software to operate it and includes any of: a microphone, a stereo microphone, a microphone array, a camera, a stereo camera, a range camera, time of flight camera, a thermographic camera, a humidity sensor, a light sensor, a gas detector, a bolometer, a bolometer array, a sub terahertz and terahertz emitters, detectors and sensors, a smoke doctor, a temperature detector among others. The location of the occupant in the room can be carried out by a number of sensors in sensor pack 212 and algorithmic including: Pressure sensors, the microphone, Doppler-shift sensors, the stereo microphones, Ultrasound transducers, Photodetectors, Phototransistors, Photodiodes, Cameras, CMOS image sensors, CCD image sensors, Specialized motion- or edge-detecting imagers, Thermal imagers, Microbolometer arrays, PVDF (Polyvinylidene Fluoride) arrays, Ranging sensors, Ultrasonic range-transponders, Scanning range sensors, Radars, Lidars, Sonars, Motion sensors, PIRs, Motion cameras, Binary Doppler-shift sensors. Added accuracy can be obtained when two sensors detect the location such as the camera and stereo microphone both indicate an occupant at a specific room coordinate. Integrated commercial devices used for gaming and communication such as Microsoft's Kinect motion sensing input device which combines voice and a camera system for accurate image acquisition in 3D coordinate space can easily be used in the sensor pack.

The computer micro-processor 206 can be a micro-controller, FPGA, a DSP or other circuitry used to control and connect the devices attached to the platform and communicate via the communications circuitry and protocols with other home devices or the internet. It can use internally stored best practice information in via lookup tables or access a cloud based database for a larger database that is continuously added to as machine learning user experience data is uploaded from installed systems which continuously feeds user statistic and best practice energy, environmental health and other factors useable by the AI decision tree in choosing optimal solution to needs. A single embedded DSP processor 206 has processing power for sensors vision, voice, noise & echo cancellation memory control, and logical control, clock function, and wired and wireless communications including (Bluetooth. WiFi, Zigbee, USB, Ethernet where software updates may be sent on flash memory stick plugged in by the user or over an internet connection. Power and data bus with expansion ports in an "open" design includes possibility of USB hub for data and power for the future addition of devices. The housing 205 has mounting for additional power supplies 206 which can be piggy backed to one another to obtain utility power and whose low voltage power output is added to the platform's power reserves to power additional devices in the expandable system.

The Computer Vision, CV system uses the camera sensor 212 and the processor 206 running stored algorithms to process images to obtain data regarding room geometry, room contents, room occupants, physiological data regarding room occupants, activity of room occupants, location of room occupants, eye open or closed information, gesture information, expression information, head position, direction person is facing, body position among others. Methodologies for camera vision with mathematical libraries of codes used to process camera data are known in the art and are used by the processor. These algorithms are published and incorporated herein, include: Fast Feature Pyramids for Object Detection, P. Dollar, R. Appel, S. Belongie and P. Perona PAMI 2014; Improved adaptive Gausian mixture model for background subtraction, International Conference Pattern Recognition, Z. Zivkovic, UK, August, 2004; "Face description with local binary patterns: Application to face recognition," T. Ahonen, A. Hadid, and M. Pietikainen, IEEE Trans. Pattern Anal. Mach. Intell., vol. 28, no. 12, pp. 2037-2041, December 2006 and computer vision routines provided with MATLAB® by The MathWorks, Inc. 3 Apple Hill Drive, Natick, Mass. 01760 USA and open source programs available on http://opencv.org. In a preferred embodiment Camera 212 is equipped with a fisheye lens. This means that features of an occupant visible to the camera mounted on the ceiling substantially near the center of the room will appear to the camera differently at different locations. Uniquely, the camera obtains multiple features of the occupant at entry and as the angle of view changes such as from a view near the wall at entry vs. a view of the occupant while under the camera the computer vision system tracks the occupant by methods known in the art. Should the tracking fail, the CV system can still obtain identification. This is done by handing off one feature to another. For example, upon entry the occupant was identified as being Mr. Joe from stored face recognition information. Joe's skin features or hair color were then recorded as well. Thus, even if Joes face is no longer visible under the camera, skin or hair color still identifies the occupant as they are resumed being tracked. In an alternative embodiment the camera 212 with a wide angle lens is located on a wall with a view of the living area. In another alternative embodiment there are two cameras 212 with a stereo view of the room which are correlated in their views by methods known in the art and from the stereo view by means of algorithms and triangulation the depth of people and objects from the camera may be determined and used in the computer recognition algorithms.

The power system architecture that's preferred allows for the individual dimming of each LED. Alternately for manufacturing cost reduction, grouping LEDs in groups of 12V or limiting the light distribution types to only four addressable groupings of LEDs—general, night light area which illuminates the entire room and the two individual task lights. The LED drivers may be located in the housing 205 were drivers use line voltage or a dual level system comprised of constant voltage power supply and individual step down LED drivers. Alternately, the drivers can be located on the LED modules attached to the chassis. The information as to the power level from the controller can be sent over the data bus to the LED module or an optical transmitter and receiver can be used. The PWM signal to actually drive the LED is thus localized within the module. If the PWM power signal is sent over the chassis bus radio interference may occur. Thus sending a data signal to the LED module driver, which interprets it into the duty cycle keeps the PWM power signal highly localize and reduces RF interference.

The integrated focused energy delivery device and intelligent control system offer numerous benefits from energy saving from the efficient controlled beam and specific area aimed optical distribution combined with a false-trip immune occupancy sensor—providing for automatic on/off—never leave the lights on again operation and protects from automatic turn-on upon entry when there is an already sleeping roommate in the room. The controller 206 algorithms have been programmed to provide a novel occupancy detection functionality based on sensor system 212 recognition of the room occupants' activity. Upon entry to a room, the system has the ability to turn on the room lights to full when no one is detected as being already asleep in the room versus turning on the very low intensity night light mode when previous room occupant has been detected as sleeping. If the automatic control system 206 makes, in the eyes of the user, an erroneous change, the voice controlled operation and override command capability lets the user to easily correct. The narrow beam reading light 207 offers one roommate to continue reading with no spill light to bed mate while the gesture recognition allows a silent hand signal by the user to shut the light and drop off to bed without disturbing others. Adding melatonin friendly special spectrum LEDs 213 to the MDS and updating the controller algorithms to enter a pre-sleep lighting mode two hours before going to sleep keeps biorhythms correct and helps an occupant quickly fall asleep. Placed in a baby's room, the microphone and speaker equipped MDS device can be used as a "baby sitter" or intercom and can play stored music or the parent's voice for calming the baby. When the baby cries, the intercom function turns on and the parent from any other room can hear and assess their need. With a surveillance camera on the MDS platform in the baby's room broadcasting over the networked communications system, any MDS having identified the presence of the parent in its room via image recognition, will now present in the parent's present location over the platform's speaker and display device (or a regular TV having networking with the platform and invoked from the controller 206), the scene from the baby's room.

Using the camera vision recognition algorithms working off of (eyes close OR sleep position)+(TV off OR book close) the controller 206 in communication with the LED drivers will automatically upon detecting "gone-to-sleep" situation turn the lights out. The very narrow task light 207 has a motorized gimbaled mounting and can follow the book being read via a manual remote controller or automatic self-centering program deriving coordinated in 3D space from the computer vision modules 212. The processor 206 algorithms calculate the book center of mass and using the camera pixels light meters as the feedback, control the motorized mount x y motors until the light is re-centered on the book. Added to the platform is AM/FM radio/alarm clock 214 with the time and control panel projected on ceiling whose day to day UI is voice and gesture control. The alarm clock uses high intensity task lighting 207 for wake-up prior to alarm—lighting suppresses melatonin and increases serotonin production. Adding to the platform a hypersonic speaker 215 on a motorized mount controlled operatively and positionally by the controller so that specific aimed stereo & alarm sound is only heard by one roommate where sound damping material is used to prevent non-directional sound reflection. The directed light 207 and alarm sound only wakes one occupant while roommate continues to sleep on. The user via the Smartphone interface to the controller sets the alarm time for each occupant. The occupants are recognized on entry by the vision system 212 and tracked in an optical flow routine as they move about the room and their coordinates in the room are stored in controller system 206. The controller 206 running the alarm clock algorithms in the seconds preceding the alarm time calls from memory storage the coordinates of the identified occupant whose flagged wake-up time is approaching and using the speaker 215 mount's aiming mechanism directs the focused speaker to the person needing wake up and at set time controller 206 drives the sound system to broadcast the alarm.

The system, even with a single camera, is capable of determining where occupants are in 3D space. The computer 206 runs algorithms on the camera obtained images to measure distances between objects and obtain room geometry to be stored in its memory apparatus for use in later calculations. The imagining system's 2D and 3D spatial measurement capability may be calibrated at installation by placing template sheets of a known size at different points in the room and on the floor and walls. As the distance between the lines printed on the sheet or the sheet edges is known, the pixel distance difference is then used by the processor to determine the depth coordinates at that point by triangulation. In order to add additional cameras, the camera images are coordinated by the location of a commonly image-recognized image, object or person instantaneously located at the location. In a standard system, focused light sources, IR or laser pointer 216 are placed at known spacing's at coordinates around the platform 200. The controller pulses an individual laser 216 to aid the computer vision processor running algorithms for the coordinate determination processes to identify the pointer 216 to the camera vision system. The processor compares the camera 212 pixels reacting to the laser pulse reflected off a room surface and its known spacing between laser elements 216 on the platform 200. To aim a device such as the focused speaker 215 at an individual or object, a laser pointer 216 is factory mounted and calibrated on the speaker axis. The controller then operates the laser 216 and drives the movable mount of 215 until the camera vision system identifies the laser reflection off the target. Using the camera pixels as feedback and running algorithms to determine the best path of movement of the laser to the target, while using an inexpensive laser or light, the motion system does not require expensive servo-motors to aim devices. The LED light sources 207 can be aimed by the controller 206 coordinating the timed light output itself as the camera pixels registration. The processor running algorithms known in the art of image recognition calculates the center of mass for the light output using the pixels as light meters. It determines its center of effect and the controller drives the mount movement devices to light the coordinate of interest. Synergistically, an IR light source 217 for aiding camera 212 for night vision is also used for IR control of appliances that use IR remote controllers now uniting them under the controller in a network. To measure the temperature of objects and beings in the room, the devices 216 with laser pointers are also equipped with simple Far-IR sensor incorporating a thermopile and lens element having a narrow field of view aligned to the axis of the laser beam. The camera 212 easily recognizes pixel coordinates of the laser and room surface intersection. The computer vision system has recognition of objects in the room. For a HVAC system it is assumed that the air temperature is near that of room surfaces or object in the room. Thus, there is now correlation between the visible camera 212 object recognition and the bolometer 216 temperature reading at the surface at that coordinate. The pointers 216 can be manually or automatically motorized aimed at occupant's specific body surfaces or room object and it is thus possible to obtain the temperature of surfaces at various coordinates throughout the room without an expensive thermographic camera. An automatically amiable motorized mount of 215 can support numerous directional delivery devices such as direction fire sprinkler 215 or display projector 215 for example.

Figure 4:
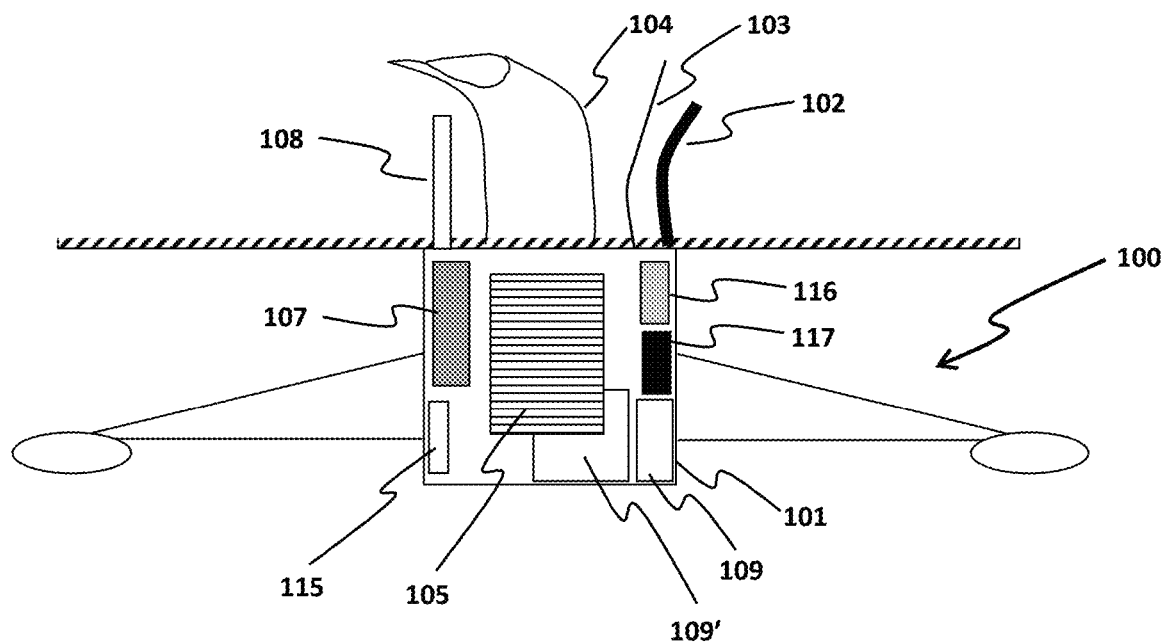
FIG. 4 illustrates side view of the Localized Service Platform; A Synergistic Assemblage of Multiple Infrastructure and Service Devices

FIG. 4. Illustrates another concept which takes all living space related utilities, conditioning devices, detectors and control elements normally situated on the ceiling and walls and concentrates them into a multi-device service pod or platform. The platform in more than a mere agglomeration of separate components, rather it creates a synergistic sharing of elements, facilitates efficiencies in service and maintenance, reduces costs and provides as an aesthetic relief to the common clutter of ceilings. In this embodiment a physical or conceptual platform is created by fixturing or otherwise connecting multiple devices together. The platform's infrastructure enables the efficient gathering of all devices distributed on the ceilings and walls of a building and concentrates them advantageously into a one or more apparatus which covers a certain area within the living space called a Localized Service Platform (LSP). These ceiling and wall mounted devices include: lighting fixtures, alarms, safety lights, motion detectors, smoke detectors, temperature and humidity probes, gas detectors, water sprinklers, fire alarms, air-conditioning units or vents heaters or heating vents, PA or sound system speakers, fragrance generators, ion generators, air filtration units, humidifiers, surveillance cameras, message boards, microphones, display screens, projectors, pest removal devices, humidity control devices and any other typical or atypical device located in a living space. The LSP is then provided with all the utilities, e.g. water, electricity, compressed air, natural gas supply etc. and all the communication capabilities required. Many such platforms would normally cover a building or outdoor area and the density of each device is such as is required for the task at hand. Thus, not every platform has the same line-up of on-board devices. However, a unified utility hook-up, communications protocol and aesthetic design make for a more easily controlled, less costly to install, easier to maintain and more aesthetic ceiling environment.

Figure 5:
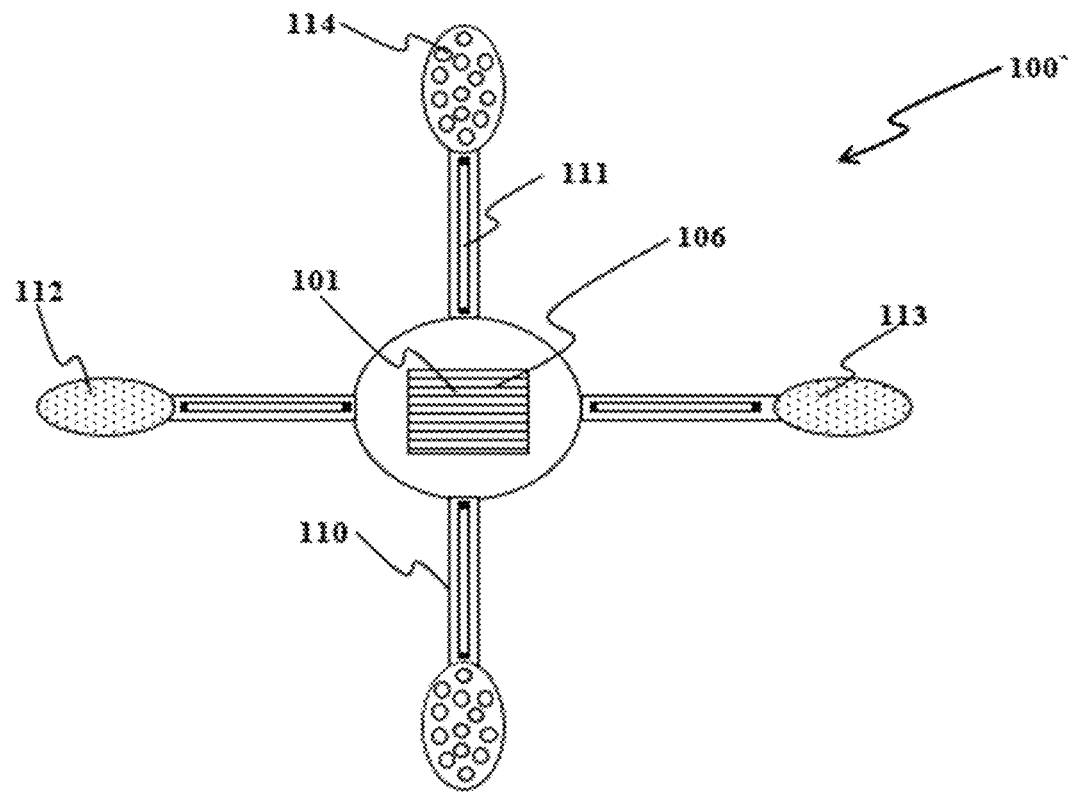
FIG. 5 illustrates a bottom view the Localized Service Platform; A Synergistic Assemblage of Multiple Infrastructure and Service Devices

An example platform 100 is shown in FIG. 4 side view and FIG. 5 bottom view as in 100' of the same. The platform can have any practical shape to hold, connect or contain the devices in its care and control. Platform 100 may or may not have a covering 101 for aesthetic purposes. Power and materials are supplied to the LSP. One or more power lines 102 supplies electric current at a given frequency and voltage. One or more communication lines 103 provide digital and analog signals, for control, data sound and video transmission. One or more pipes, ducting or tubing 104 can bring in heated, cooled and or filtered air which is distributed to the environs via register 105 and/or 106. On another platform the register 105 can serve as an air return inlet. In a heating application an inline blower will accelerate the heated air out of register 106 such that in efficiently reaches the living space to be heated. The supply of natural gas, water, compressed air and other industrial gases, fragrances or whatever materials that are not stored in on-board containers 107 are piped in via piping or tubing 108.

Energy conversion and material modifying and dispensing devices represented by 109 and 109' are located on-board or connected to the LSP 100. These include fragrance generating and dispensing devices, power conditioning equipment, air-conditioning elements: including, cooling heating, humidifying, ion and ozone generators, blowers and filters. The combined operation of one or more of these units has many beneficial effects. The blower of 109 for example integrates with the fragrance generator of 109 to provide for the rapid dispersion of the fragrance within the living space. Alternately, in place of centrally heated air being ducted through 104 an onboard natural gas heater would utilize the gas supply to generate heat on-board. Piping 108 can also bring in refrigerant to the LSP and an evaporator or condenser unit 109 would cool or heat air taken in at register 105 and blown by blower 109' and disperse it through register 106. In many correct HVAC systems the waste heat from lighting fixture lamps and ballasts is exhausted through the air-return system such that it does add to the air conditioning load. Similarly in this system all waste heat contributing devices on the LSP can have the heat exhausted before it enters the living space.

In the bottom view of the LSP 100' one or more arms 110 which carry and spread out other energy conversion, material modifying and dispensing devices are shown. The arms 110 contains energy conversion device fluorescent or LED lamp 111 within an inconspicuous lighting fixture with ancillary optical elements such as lampholders, reflectors and louvers. The electromagnetic ballast or power conditioning electronics is located in the arm 110 or in the common device pack 109. Device pods 112 contain loudspeakers 113 for the PA and/or sound system and sprinklers 114 for the fire extinguishing system. The pods 112 can also be used for fragrance dispensing or other devices.

Detectors, sensors and alarms 115 including surveillance cameras, temperature, humidity probes, sweat detectors, artificial nose odor detectors, gas, smoke motion detectors, burglar and fire alarms are part of the LSP. The location of any detector 115 can be where most efficient, including in the pods 112 which may be optimal for the location of camera, microphone, sensors and detectors.

In advanced technology usage what probably ties the group together more than the previously mentioned shared, utility, fixturing and location aspects, is the common control and communications feature. A common embedded controller or CPU 116 with or without memory storage circuitry or media devices is provided for the control and communications functions. All the communication between centralized control units and the LSPs and devices thereon is carried out via the power wiring or dedicated control wiring such as Ethernet or USB. An independent power supply capability is provident in case of mains power failure. A battery backup is required for emergency lighting, smoke detectors, and burglar alarms. It would be beneficial to have a centralized backup power supply. A backup power supply requires monitoring and maintenance also the cost is reduced as the capacity increases. A common battery backup pack 117 is provided taking advantage of these factors of scale.

Therefore what has been sought by the gathering of many functions into the LSP together with the correctly designed interaction of many discrete elements has been achieved. The LSP has yielded an apparatus such that the total effect is greater than the sum of the individual effects.

Infrastructure will include tubing or piping to bring in a constant supply of fragrance. The special infrastructure will provide fragrance via a central storage container via tubing. Alternately one central fragrance generator per building will be used to generate the smell in air then fragrant air shall be to the LSP or lighting fixture—aroma dispenser—acoustic generator.

The fragrance dispenser can be of the following types which include nebulizer, heat, pressurized and wick. In U.S. Pat. No. 6,471,193 from Oct. 29, 2002 contained herein for reference, Cole Warren describes an Automated Odor Modification System. The device having an electronic programmable timer, a container liquid level detector, a nozzle liquid level detector, a motor control circuit, an electric motor, a liquid container, a housing for the enclosure, a nozzle, a fan, and tubing. A fan is used to transfer the vapors of the odor modification liquid from the nozzle to the desired locations. The fan keeps running until the electronic programmable timer completes its cycle. The system is designed so that if the liquid in the container is insufficient; the system will be deactivated until the level of the liquid therein, is brought into specification.

In U.S. Pat. No. 6,390,453 dated May 21, 2002, titled "Method and Apparatus for Delivery of Fragrances and Vapors to the Nose", Frederickson, et al included herein describes a system to provide accurate controlled dispensing of pharmaceuticals, herbs and psychoactive substances of all types. The device claims a superior method for dispensing such compounds because dispensing can be precise, metered, interactive, and the dispenser can be tamperproof with prescribed dispensing rates possible.

The following is a list of applications, tasks and processes that can be improved through the application in amount and/or frequency of Environment, atmosphere and Mood Modifying Factors EMMF such as light, fragrance, sound, ions, humidity, temperature, air composition and pressure.

Vehicles: EMMF can be used to enhance alertness and mental clarity for operators of cars, busses, trucks, and planes and for hazardous equipment. Vehicles can be fitted with LSP devices which generate EMMF noise in the Alpha range to make the ride seem smoother and more pleasant. The airflow in the passenger cabin of jets can be modulated to include infrasonic pressure waves to reduce the side effects of a monotonous hiss and to help relax the passengers.

Environmental conditioning: Air conditioning fans in the LSP can be modulated through inlet vanes or pressure dampers to induce infrasonic pressure waves throughout the building to relax employees, provide increased clarity of thinking, reduce focus on emotional concerns, improve health, and reduce absenteeism. Air ionizers (negative ion generators) can be modulated to apply ordered or chaotic waves of varying electric potential for room occupants.

Task oriented applications: Lighting devices on the LSP can introduce a chaotic signal to users by chaotically varying the background color or other attributes to reduce stress and increase mental clarity (7.8-13.5 Hz.), to increase analytical focus (7.8-16 Hz.), or to enhance creativity (16-24 Hz.). In stores, chaotic signals can increase customer comfort and influence mood. In schools EMMF can bring students to states of mental clarity or analytical preparedness. And in factories, EMMF can help maintain mental clarity for reduced occupational injuries.

Entertainment: EMMF can intensify the emotional highs and lows and feelings of inspiration induced by movies and high-end amusement park rides. EMMF sounds can also be applied subliminally to billboard, TV and radio advertising techniques to enhance desire and decrease analytical functioning.

Odor control: EMMF can be used to alter the nature of the perception of pollutants resulting from cooking, combustion or other processes.

Sedation devices: In an EMMF based device located on a domestic LSP for example the overhead bedroom or living room light, can be used to help people sleep and to calm animals.

Bioactivity: LSP sound generating systems will provide pest control, and improve yield in biochemical processes. A simple example is ultrasonic rodent and bug repellants that work better or provide the same effect on insects and rodents without annoying people and dogs.

Figure 6:
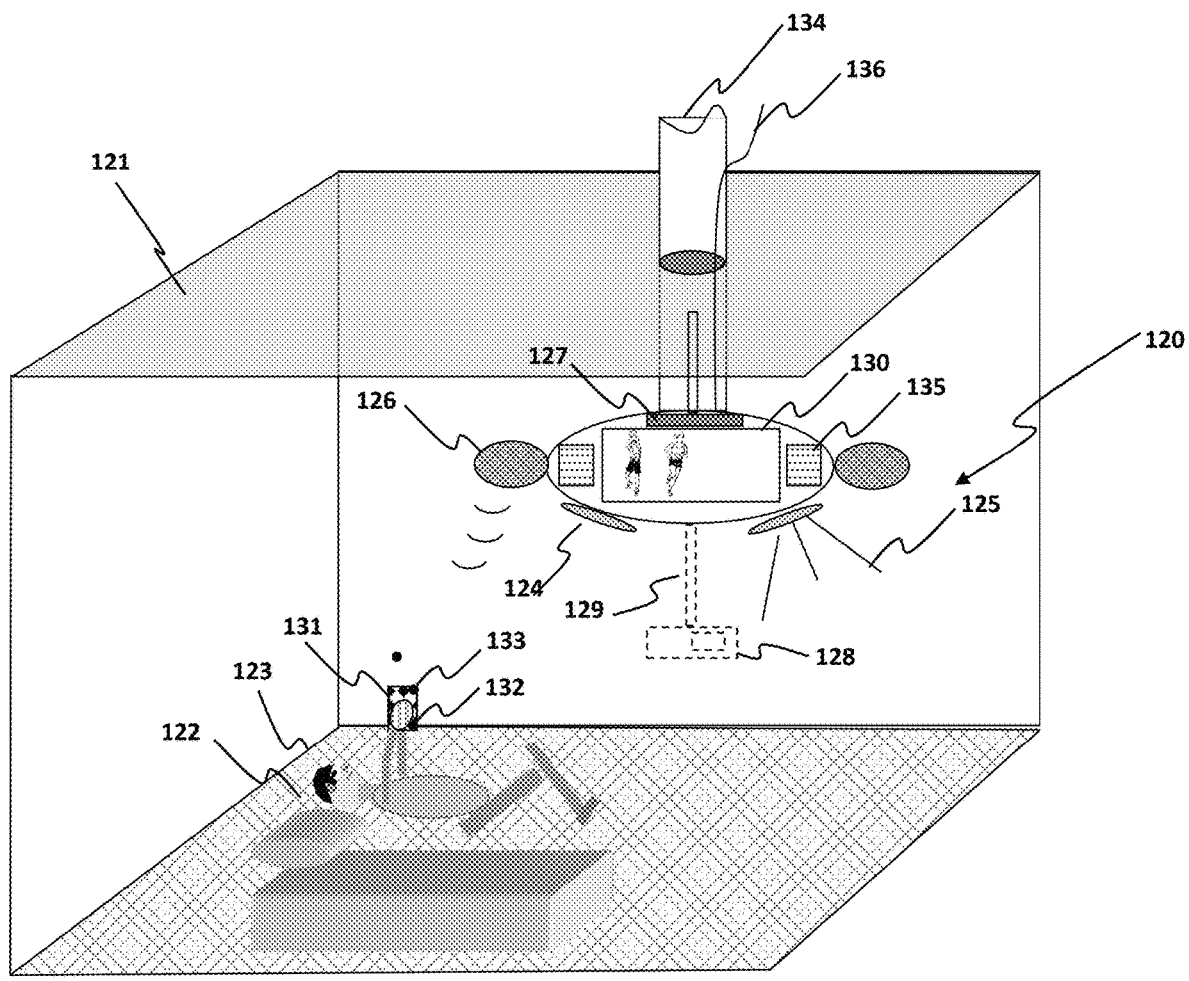
FIG. 6 illustrates a Total Room Service Device Based on a Lighting Fixture Installation

FIG. 6 further illustrates another embodiment based on the teachings of the present invention. A living loom or bedroom lighting fixture serves as a platform for numerous devices. These include any of the following list: a TV monitor system, TV or video projection system, stereo system, radio alarm clock, fragrance generator, heater, humidifier, air conditioner, ionizer, smoke detector, emergency lighting, cordless telephone, cell phone etc. The operation of these devices is united under a single processor preferably with sensors such as a camera and array microphone among others. All these devices can be controlled from bed or the sofa by the remote controller, voice, gesture, expression etc. The light fixture is positioned so that the TV can be watched from bed. Go to sleep to the sound of waves and wake up in the morning to the smell of spring blossoms and chirping birds. With this controllability you don't have to get up out of bed to turn off the lights or set the heating. While "combo" stereo systems, even some including TV's are known in the present art the present design synergistically integrates devices capable of effecting the senses and modifying the environment with a lighting fixture in a unique manner such that many components are shared, convenience is increased and control is unified, so as to prevent damaging interactions.

A subset of an LSP which would be a single apparatus for the room called a Room Services Device RSD 120 is attached to the ceiling 121 at a convenient angle for viewing form the bed, chair or sofa 122 by room occupant/s 123. The height at which it is hung is optimal for viewing or the entire unit or parts therefrom can be manually or automatically (on command) adjusted. This special case of an EMCD and LSP where a lighting fixture 124 supplying downlight 125, and/or uptight, to the room is combined with other mood and environmental modifying devices and delivered materials. A main feature is the entertainment devices, a subset of the mood modifying devices, which are now totally or partially contained onboard. The devices include stereo speakers 126 or an entire combination stereo system with cassette player, CD player, digital music player such as an MP3 player, video player such as MP4 and stereo radio in the central device pack 127 which may also have a micro-processor to integrate and control all the devices. It may also include sensors such as camera, microphone, temperature, humidity. IR and ultrasonic to capture occupancy, voice commands, gesture and activities. Using Bluetooth alone with dedicated drivers in the controller or with a Bluetooth profile such as Advanced Audio Distribution Profile, A2DP and/or or Audio/Video Remote Control Profile, AVRCP the content stored on the users smartphone can be played over devices 127. Access to change USB memory sticks or CD's is provided by lowering a part of pack 127, the device packet 128 via telescoping arm 129 so that it is easily within reach. The device pack 127 physically and/or conceptually harbors the multiple mechanical, electrical, chemical and electronic devices of the RSD and integrates supply and communication among them. The device packet 128 contains some or all of the exchangeable or refillable elements of devices contained on the RSD 120. In addition to or alternately the entire RSD can be lowered in order to access and refill material storage vessels and replaceable parts such as the lamps and filters. Such a centralized device offers many savings. A maintenance man is no longer moving scaffolding or ladders to multiple positions in order to service different ceiling and wall mounted apparatus. Power, wiring, and material supply tubing is outfitted with disconnect fittings and thus the unit can be lowered and raised with minimum downtime and labor.

The television monitor 130 is of any of the known types CRT, LCD, front or back projector etc. and holographic display can be part of a TV system for broadcast and/or cable TV with a video and/or DVD player. It may also serve as a computer screen similar to the Philips electronics 150MT LCD Monitor/TV flat screen device which is a multifunction device and the remote mouse and keyboard or RSD control device 131 can serve as the input device. Part of the monitor when necessary can also serve as a display monitor for the control device 131 which may be a smartphone providing for "soft keys" used to control the many devices on the RSD or elsewhere. Communication from controller 131 to the RSD is accomplished by infrared or "wireless" radio communication as is known in the art. In addition to keypad control, the devices may receive audio control from a microphone 132 located in 131 and with the addition of a speaker 133 the remote control optionally operated as a cordless telephone. HVAC—air conditioning and heating functions are carried out by air which is piped in via ducting and/or piping 134 and which exits from register 135. The fragrance generator located in device pack 127 generates and/or dispenses aroma into the air, which is delivered to the room via register 135.

Alternately, HVAC functions are provided by a reversible heat pump with refrigerant piped in via 134 with a heat exchange coil at device pack 127 operating as the condenser or evaporator for cooling. Water for an air humidifier in 127 is piped in via piping 134 and condensate water produced during air-cooling is dispersed in the air by the nebulizer of the fragrance generating system in 127 or pumped out via piping 134. As in the EMCD many common elements such as power supplies, communication and control chips, blowers and fixturing are shared among the devices. Electric power and control signals are input via wiring 136 and/or wireless or infrared signal from the controller 131. A central computer or embedded device together with sensors and detectors are located in device pack 127 and are used to control and keep within tolerance all the EMMF activities of the RSD. An air ionizer together with an air filter function keeps the air in the room fresh and invigorating.

Operation

The benefits of the integrated RSD can now be appreciated if we describe a typical bedroom usage situation. If room occupant 123 wants to prepare for sleep by reading an e-book, listening to music, heating the room to a comfortable temperature for awake hours, monitoring news on the web and checking social media messages and emails every 15 minutes or so; this is how it is done. Using control device 131 occupant 123 opens his e-book on the monitor 130. Using a pointing device on 131 he clicks on the news update icon on the menu bar. In place of the pointing device a pointing gesture by the user is used to generate a vector to the monitor upon which a red laser dot appears. The laser dot is movable by machinery controlled by the controller where the computer vision system obtains information from the user via their hand movement regarding the motion of the pointer as how much to move the dot vertically or horizontally. The user's brain serves as the feedback device by moving the arm vertically or horizontally until the computer vision system reacting to the movements brings the dot to the menu selection. The user then performs a clicking gesture which the CV system recognizes and using optical character recognition routines reads the menu selection. Alternately, the controller based on xy screen coordinates has defined which menu selection is at the screen coordinate and the camera reads the dot's coordinates on the screen to identify the selection. No news interests him and so he goes back to the book but before doing so he selects a new piece of music from the media player in 127 via gesture or voice control. The clock on device pack 127 strikes 11:00 pm and it is time to turn in. Using the controller 131 room occupant 123 now closes the e-book, turns the heat down for sleep, sets the stereo system to broadcast lulling wave sounds from speakers 126 for the next 20 minutes, after which except for the heating and air filtration units, everything else is shut down. Occupant 123 now sets the air ionizer in 127 to go on at 6:00 AM, the fragrance generator in 127 to go on at 6:15 with the smell of an apple orchard and sets the heater thermostat control using sensors in 127 to go back to high at that time. The occupant before retiring also sets the alarm clock to wake him up to song birds at 6:25 heard on the speakers 126 and the morning TV news to automatically come on at 6:30 and then finally using the controller 131 turns off the lights 124. Using the processor's sensors in 127 to observe the users daily routine, who turns on what device or performs an activity as part of a sequence of activities or at a certain hour the machine learning algorithms known in the art stored in 127's memory learns to automatically perform the user's settings and programs the processor per the individual's daily routine. The user will see more and more control actions taken over by the controller as the learning progresses. Thus, a home automation system has been created where there is no need for an initial setting up the rules of operation based on If This Then That IFTT scenarios. Many smart home installations have failed because the process is too difficult for users. Now with an image recognition system built in to the smart home control system the individually recognized person's totality of activities in the room is observed from an overhead vantage point and the systems machine learning algorithms store the events and using code program the rules for each individual occupant. The above is an example of using the concept of integration of multiple devices around a standard room fixture. The design has taken every single device in the bedroom (may be excluding the exercise bike) and gotten it off the floor, dresser and the night table to free up space and integrate all entertainment and environment controls in a single device operated off of one controller.

Thus the invented EMCD and LSP systems can modify and modulate environmental factors to set a specified atmosphere through integrated control of light, fragrance, air content, sound, temperature, humidity, air pressure, static electricity, magnetic field, etc. It can be applied to many living spaces in many places. For example, in a room for entertainment, relaxation and study, the classroom or the working place, it can be controlled to promote concentration so as to give encouragement and improvement of working efficiency; in a restaurant, it can provide a refreshing atmosphere to give an appetite; in an amusement place, it can provide a refreshing or specified atmosphere to make people feel blissful; in a vehicle or boat, it can provide a concentrative or refreshing atmosphere to avoid drowsiness or carsickness; in the bedroom, it can provide a drowsy or comfortable atmosphere to make people feel sleepy or promote romantic feelings; in an interrogation room, it can provide different atmosphere to make a suspect confess without covering up; and in a conference or meeting room, it can provide a refreshing or harmonious atmosphere to enhance the negotiating effect and reduce conflict.

As pointed out in the background, it would be beneficial in all energy devices, not only those for lighting, to have digital energy delivery capability. Thus, specific areas where people reside can be targeted and not the entire room. Also, when the occupants various identities are known via facial recognition algorithms known in the art or input information then their personal preferences for heating, cooling, desired connectivity with the world via telephones or internet, entertainment preferences etc. for their maximum comfort and privacy can be individually provided by the control system 127. Some people when lying down in bed may automatically desire that the phone ringer be suppressed while others may not. The control system over the speaker using personal assistant speech synthesis and logical programming known in the art may then query and ask audibly if the occupant desires cutting off the phone ringer till they arise. On getting up the system would automatically reinstate connectivity. Using voice recognition and voice synthesis routines stored in the controller machine learning known in the art can be used to teach the controller what the user's personal preferences are. That is, if the control system has a voice override or a manual input and the identified occupant typically changes the pre-set temperature or intensities for air-conditioning, heating, stereo, media genre, fragrance, window shade settings, social media access, lighting, etc., the control system learns the personal preferences and to begin with provides them with their preferred regime. Some occupants will opt for the balanced comfort vs. economy mode of the cooling system while others may go to extremes of over or under cooling. One may prefer certain type of music at a certain volume etc. This data is stored, recalled and processed by the electronic circuitry arranged to execute computer processing and make devices operate to fulfill the user's need.

Figure 7:
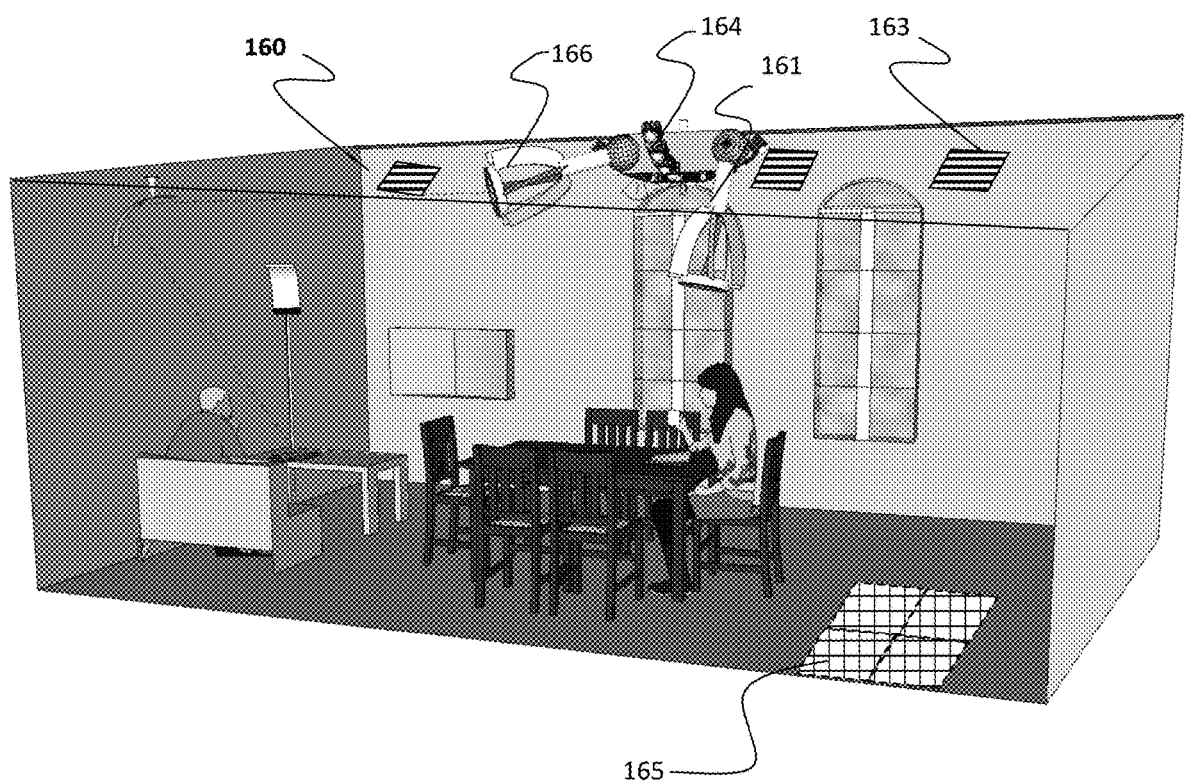
FIG. 7 is a room with apparatus for providing sub-area, localized delivery of light, cooled air, hot air via radiation and/or convection.

Shown in FIG. 7 is a room 160 maintained at an ambient temperature. The room such as a living room, kitchen or bedroom is equipped with one or more sensors and processor 161 capable of integrating information from the sensor. The sensor pod 161 may include computer vision capabilities as well as sound, smoke, gas, and temperature. The energy delivery and detector alarm, entertainment and communications platform 164 is capable of providing people with services. That is, it may include any of lighting, security cameras, intercom system, infra-red heating, smoke detector alarm, speaker system, video projection system, gas alarm etc. and the sensor system must be capable of being able to detect occupancy in sub-areas of the room. A disclosed herein, a unique photo-detector array sensor system is capable of either seeing in the visible and/or infrared spectrum. Computer vision technology known in the art is used in order to locate one or more person's whereabouts in the room. The controller has the capability of correlating geometric values in the room floor or ceiling with energy delivery elements under its control and occupant coordinates. In addition to visible and infrared image information, sonar, ultrasound or voice or sound data may be used in combination or alone. Thus, a transducer or microphone system may be used to pick up activity and location data as is known in gunfire locator systems, or an array of microphones can be used. The control artificial intelligence system can thus be more accurate in its automatic provision of focused energy delivery or entertainment content by basing its decisions on more than one type of sensor input and corroborating the data.

A learning mode is entered into by the controller and camera vision system when the sensor device is installed in the room. The geometry of the room 160 is measured using methods known in the art and sub-areas serviced by specific energy delivery lighting, heating, ventilating and air-conditioning HVAC devices and outlets in the room are correlated to the areas. This is done either manually by mapping the controller from an input device or automatically. Uniquely, by using machine learning techniques known in the art, the system controller's operation of delivery devices to produce an effect measurable by its own sensors is used to automatically teach the system the extent and type of effect the device is capable of delivering. The energy delivery device such as a cooling air flow outlet 163 is singularly enabled by the controller to provide cooling. The temperature measuring sensor 161 such an aimable bolometer or thermographic camera with a view of the room 160. The controller then activates 163 in timing with the detector and then determines by changes in the measured temperature of surfaces the coordinates of the area affected by the cool air delivery device 163. The same coordinate correlation routine between the camera pixels and sub-area affected is carried out for all the other controllable cooling air registers located on the ceiling until the controller has learned the sub-area affected by each controllable cool air delivery device. The same would go for a zonal controlled heating system and any other convective, radiative, mass or sound delivery system within a room or outdoor living area. An example on 164 would be a fire sprinkler system with directable water stream where the camera detector system limits water damage of automatic fire sprinkler systems by providing the controller with the fire's coordinates. The controller would then direct the water stream specifically at the fire, extinguishing it with minimum water damage to room.

The room geometry is obtained by the system in a programmed calibration routine run after installation in a room and can be manual or automatic. A manual method includes using a paper template of known size and placing it on axis horizontal or vertical, facing the camera, on the floor, walls and objects. The known template size subtends a number of pixels on system and the controller 161 uses algorithms to calculate the distance and coordinates of structure and object. The detector pixels can then be used to obtain images of the room which the controller can assess as furniture, equipment or occupants. Pattern recognition methods known in the art, including neural networks, can provide a generalized stored application library of usages to the controller or the controller is an artificial intelligence controller or intelligent agent, where the intelligent agent system used to control the delivery of effects within the room perceives its environment and takes actions that maximize its chances of success in meeting the goals of the delivery of those effects and can further learn from the actual room usage with time. Outputs from the optical, radiation and sound detector arrays are analyzed by appropriate computational means employing trained pattern recognition technologies, to classify, identify or locate the contents. These techniques known in the art are covered in texts such as: Pattern Recognition and Neural Networks Paperback, Brian D. Ripley, Cambridge University Press, Jan. 10, 2008; Machine Learning: A Probabilistic Perspective by Kevin P. Murphy, MIT, Aug. 24, 2012; Pattern Recognition, statistical, structural and neural approaches, Schalkhoff, John Wiley and Sons, New York, 1992 and Neural Networks for Pattern Recognition by Christopher M. Bishop, Chris Bishop, Oxford University Press; (January 1996) included herein by reference.

One way of determining the x y z coordinates of an element in a room is to use a stereo camera system 161 which can determine depth based on the known offset between the cameras and the angular shift to the element seen by each camera as is known in the art of stereo photogrammetry. Many cameras with known spacing situated throughout the room can be used for this as well. The controller 161 is equipped with storage media where factory set data, lookup tables, instruction sets and learned data from automatic sensor and user interface device is stored. The controller which is arranged to operate devices by turning on, up, down or off the power to devices for radiating or directing mass flows has a processor for calculating parameters influencing the controllers operation. Where said processor is having an instruction set from the stored or communicated algorithms and calculates from the acquired sensor data changes needed in the operation of the devices.

Herein is disclosed a unique machine learning aspect of a single lensed multiple photo-detector array as a visible and infrared camera sensor system or thermo-graphic camera 161 using the physiological features of identified people of known height, distance between the eyes, ears etc. to supply 3D coordinates within a space. A method of 3D coordinate acquisition uses a person who lives in that room as they naturally move around the space and to have machine learning process correlate x y z coordinates around the room. In one method, initially a calibration routine is performed with people who use the room where instructions may be broadcast on the speaker of pod 161 or delivered via a hand held communications device. First the person may be identified by a voice recognition routine as to name for the creation of a file in the controller's storage. This as well as the following tasks may be automatic or substituted for. The person is to stand facing the camera at a set distance from a point under the camera such as 2 meters at a known angle from the nadir (0 degrees under the camera). The logical controller can then calculate the known x distance characteristics of that person's physical features such as height width etc. As the camera is fixed it the room, the same pixel covers the same area or 3D volume. Alternately, a template sheet of known dimension such as a US letter piece of stationary is placed or held on the recognized individual. The target element of known XY measure to the logical controller 161 is then used with methods of triangulation in the processor stored code. The processor runs algorithms comparing the pixel difference and known printed line or edge distance difference of the target and deduces the individual's height and width when direct-on to the camera. A limb such as the head and eye dimensions can also be used as the head is always almost exposed. From now on as the individual moves through the room the camera vision algorithms, using edge detection and other imaging techniques measures the pixel spacing as it foreshortens with distance to assess the distance from the camera to that location and determine its coordinates and record the pixel to coordinate relationship in the controller's memory storage for future use. The geometric measure of the room and distances of the objects in the room can also be calibrated for each wall using the same target placed on the walls and floor. Therefore every time the controller identifies person on a unique set of pixels and has a direct-on view of the persons stored physiological feature such as the distance between the eyes and height, then that xyz coordinate being seen on the background of the room content can be determined That is, by comparing the angles subtended by physiological feature and the known room content, the xyz coordinate of multiple points in space in the room can be determined. Other automatic methods include using the deletion of multiple pixels to bring object back into focus and thus knowing the lens focal length to determine the distance to the object. Other single camera methods known in the art apply the homographic theory to map the parameters onto the 3D space then map the position to the 3D coordinate plane using perspective projection theory.

The image sensor can also have capability of measuring the skin temperature of room occupants. The novel multi-tasking sensor technology comprised of hardware and software for computer vision is used to control energy consuming & entertainment activities from HVAC, and lighting to video, sound and health radiative and sensual experiences. The use of a Body Temperature Sensor allows for a novel heating and air-conditioning system control based on the actual need of occupants. In addition, computer vision seeing increased body activity can allow the controller algorithms of the artificial intelligence export system to be predictive in knowing that increased metabolic rate will require increased cooling. Thus, when a group of occupants begin dancing, the vision enabled control system can immediately predict an increased cooling need and supply more cooled air. This, as opposed to the prior art system which will need to measure the air temperature rise on the room thermostat or the return air temperature. In the meanwhile, the occupants will suffer discomfort.

The controller 161 uses algorithms based on sensor data to determine if the occupant may be feeling hot or cold. This technique uses direct measurements of human physiology and recognition of activity to replace the thermostat and maintain individuals at a higher level of thermal comfort then is presently possible. The human-thermostat is realized by using sensors which measure characteristics including the radiation from the body, reflection of radiation from body surfaces, identification of vasodilation, pulse, respiratory rate, skin color among others.

Figure 8:
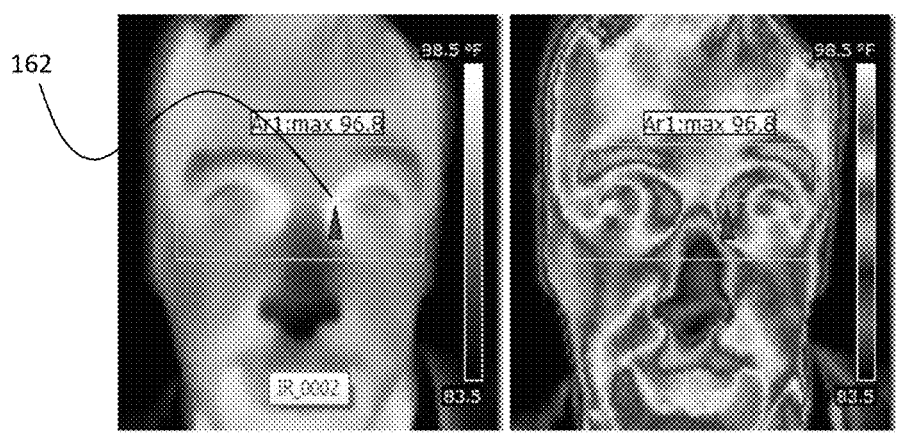
FIG. 8 is a thermographic image of a face showing optimal measurement location

FIG. 8 is a thermograph of a human showing that the most reliable skin area to measure core body temperature for thermal imaging is on the human face, specifically the inner canthus of eye. The most accurate part to measure human body temperature is at inner canthus of eye 162 which it is most consistently warmest area on the head despite ambient temperature change. The reason it is the most stable area is that this canthus region is fed by the internal carotid artery, with the blood circulation coming from brain. Whereas the rest of the face is supplied by external carotid artery, so it is less reliable indicator of core body temperature. On the other hand, the body extremities such as the ear edges, nose, and fingers are good indicators of extra warmth or cold felt by a person. Inexpensive Infra-red camera systems may not be accurate at reading the absolute temperature. However, by using the computer vision determination of the inner canthus of eye, possible wherever people are without glasses, are located and oriented for a good image, the camera temperature measurement can be calibrated. In addition, if the camera has an ability to juxtapose the inner canthus of eye with the temperature of an extremity such as the tip of the nose or ear lobe the system does not need know the absolute temperature. The difference between the two temperatures detected in the sensor with a view of room occupants is an indication if the person is being underheated or undercooled or is being overheated or overcooled by the HVAC system. The reaction of a HVAC system so controlled is much quicker than a room temperature based system and much more accurate in meeting people's actual needs. If the HVAC delivery can further be personalized based on the room occupant's location and identity greater comfort can be achieved, especially when the controller 161 has learned the individual's preferences such as when the user's commands counter the controller's actions as described earlier.

An additional method to detect the onset of thermal discomfort is to sense the onset of sweating. Detection of sweat or moisture on the skin is often an indication of a human's comfort in terms of artificial climate control. Sub-tera hertz radiation is known to be sensitive to the existence of sweat. This is even true where the sweat is still in the ducts and is thus detectible before the person is in discomfort. Predicting the onset of discomfort allows for less extreme demands on the climate control thereby saving energy expenditure. Studies such as "Circular polarization induced by the three-dimensional chiral structure of human sweat ducts", Phys. Rev. E 89, 042715—Published 25 Apr. 2014 by Hayut et al show where sweat gland ducts function as helical antennas and the emission of the sweat glands, which lies in the sub-terahertz range, varies according to sweat levels. Studies by M. Ney and I. Abdulhalim, "Does human skin truly behave as an array of helical antennae in the millimeter and terahertz wave ranges?," Opt. Lett., vol. 35, pp. 3180-3182, 2010; and 0," J Biomed. Opt., vol. 16, pp. 067006-15, 2011. A radiation transducer generates waves that are reflected off of an occupant's body and detected by a sensor; an inexpensive focused array can be used. The method of using a camera with a fisheye lens to gain the coordinates of an occupant and guide the focused array to measure on the occupant has been explained elsewhere in the disclosure. By bouncing sub-terahertz radiation between 75 and 110 GHz off the skin and measuring the strength of the reflected radiation as a function of frequency the terahertz emissions can be correlated well with sweating, pulse rate and blood pressure measurements. The visible and IR spectrum camera also makes additional non-contact measurements and methods known in the art have been used to observe vasodilation and pulse which are physiological metabolic measures used by the body's thermoregulatory system to maintain thermal equilibrium. The controller's algorithms use sensor data about visible, IR and other spectrum radiation alone or in unison together with its environmental sensors for temperature, pressure and humidity as well as data obtained from the internet as to the outside weather conditions to determine directly a room occupant's thermal comfort and the necessary operation of climate control devices to maintain that comfort. The human thermostat uses primary user comfort data in palace of using secondary climate data from the wall thermostat which measures air temperature.

Installed in an automotive cockpit application instead of a room, the disclosed sensor system using the canthus of eye compared to skin temperatures at body extremities and other non-contact measurements with visible IR and terahertz radiation would be able to correlate the temperature and other physiological and environmental indicators and or reflections off skin will determine whether or not a person has too much air conditioning or too little and thereby adjust the fan speed, humidity or cold or hot air temperature.

Having a sensor system which is capable of correlating room geometry, with the service, mass and energy delivery devices allows for hitherto unachievable levels of cost saving while maintaining comfort. The system makes the smart home a reality with a predictive machine learning system capable, most of the time, of automatically providing the user with the desired environmental conditions for their maximum comfort and privacy. Therefore, systems for providing heating and air conditioning would benefit from an ability to be localized in their effect to a sub-area rather than the entire room. Herein is disclosed a unique energy delivery system for heating and air conditioning. As hot air rises and cold air sinks, it is possible to have zones within a room at different temperatures. That is, if there is not too much of a difference between the basic room ambient temperature and a specific sub-area comfortable but localized temperature, drafts can be prevented. For example, in heating a room it becomes possible to provide an ambient temperature such as 16 degrees C., that while not comfortable in its own right, is close enough to the comfortable 21 C temperature range such that drafts are not generated. The zonal heating that can be provided by infra-red heat from a digital lighting fixture 164 disclosed by Spero in a United States Patent Application 20120206050, can provide such a boost. Cooling can be effected in the same way in a sub-area. Where the comfortable temperature may be 23 degrees C. the ambient temperature can be above 30 C. Cold air-exiting from above will fall in the sub-area where people are located. Thus as opposed to prior-art cooling systems where the whole room is conditioned, here with additional air delivery outlets 163 it is possible to cool only where the sensor has detected occupants. The energy saving for just a few degrees of cooling is large as the temperature differential with the outside air is lessened. Butterfly valves or other similarly motor or solenoid actuated air flow are used to open and close airflow to the specific AC registers 163. As the climate control is occupancy based, rapid response is needed to quickly cool the environs upon entry. Fans in the ducts forcing the air can be used to quickly increase the localized cooling on entry to a new zone. For heating, quick response is offered by radiative heating. An additional rapid and energy saving way to make an occupant feel cool is to lower the temperature of the surrounding surfaces to which the person's body is radiating. However, this skin surface cooling is limited by condensation effects which may be mitigated by anti-nucleation coatings thereon.

Another way or a complementary way to heat is to use a floor based heating system 165 where greater amounts of heat rises in a sub-zone that is occupied. Underfloor heating systems use either electrical resistance elements ("electric systems") or fluid flowing in pipes ("hydronic systems") to heat the floor. Therefore, if within the floor we have specific cells addressable by control system 161 then the controller will provide extra power to those for heating specific zones 165. It then becomes possible to correlate between location of the occupant and the energy delivered to their location which is a sub-area of the room. Using an occupancy sensor that is capable of knowing which zone the occupant is located therein and thereby energize the heating elements under the floor in their proximity. The same energy differentiation can be carried out with air conditioning systems. That is with providing sub-area outlet apparatus for the delivery of the air conditioned air. Similarly in cooling, hydronic systems can be used in the ceiling for cooling if measures are taken to handle the condensation water. Anti-droplet formation coatings on the piping can prevent condensation up to a certain temperature differential. The controller would then operate valves controlling the coolant flow to various zones.

A novel adaptive surround sound system is disclosed. A stereo sound system is comprised of multiple speakers located around a room or outdoors. For the best operation of a surround sound system the position of the person relative to the speakers can help optimize the surround sound phase control system processing software to create surround sound playback between the loudspeakers. With advanced methodology, virtual surround sound can be achieved with two speakers but the occupant's position needs to be known. Technology such as "head-related transfer function" (HRTF) which is a database expressing the difference in sound wave spectrum and arrival time at each ear is capable of virtually recreating the source using reverse logic. HRTF is used as the basis for precise Digital Signal Processing (DSP) to create proper volume, sound time lag and sound wave spectrum to deliver (with only two front speakers) an audio experience which, to the listener, seems to emanate from various locations throughout a room. For a system to operate optimally it is necessary 1) to know where the speakers are located coordinate wise in the room and 2) where the occupant is located relative to the speakers. Thus, the microphone array range determining system, is used by the controller in timed sound output from each speaker in conjunction with the microphone array detection determines the location of the speakers around the room. The camera based computer vision system determines the coordinates of the listener. The controller having all the speaker location information and the occupant's instantaneous location relative to that of the speakers can in real time optimize the speaker's balance for superior sound. In outdoor systems the proximity of people to speakers can help fade between them.

In other directional sound systems putting sound where it is wanted means that one person in a room can hear one type of audio content while a second person in the room can hear a second content. Binaural sound localization and focusing techniques such as Norris et al. in U.S. Pat. No. 6,850,623 as well as others discloses a parametric loudspeaker which uses multiple piezoelectric bimorph transducers. The parametric loudspeakers which utilize the non-linearity of air when excited by high frequency or ultrasonic waves for reproducing frequencies in the audible range at specific location. Therefore when combined with the controller-sensor system of this and the Spero patent above for: a) identifying one or more persons using facial recognition or other calibrated recognition routines, b) the controller detecting the person's coordinates and c) the controller having stored or real time coordinate information for the speakers aiming; then the directional sound system can bring each of these individuals their preferred, similar or dissimilar media content at their location. Where the controller has a motorized aiming system for the ultrasonic speakers, with feedback regarding the coordinates to which it is being aimed, then the one or more directional loudspeakers located on the lighting fixture pod or elsewhere in the room can then be mounted on mechanisms which the controller uses to aim the loudspeakers in real time following the exact location of the target occupant's ears even if they are moving about an area so as to maximize performance. To prevent the directed sound waves from reflection off of surfaces and reaching other persons sound damping material is used behind the target.

Thus by combining a) sensors to obtain data about the occupants and activities occurring in a room, b) a processor to analyze and act on that data and c) electronic circuitry to operate devices for the delivery and/or movement of mass and energy, a system of collaborating components has been arranged for the localized delivery of heating, cooling, lighting, providing sound, video, fire sprinkler protection and a myriad of other services differently to different parts of a room based on the location and/or identity of occupants therein. Within this disclosure localized has been defined as to refer to the provision of an effect to a limited area as opposed to a greater area that could be effected. The localization is to obtain a benefit such as not disturbing a neighbor or saving energy and is not an exact boundary. Thus, a localized heating or cooling device based on a person's coordinates would provide substantially localized cooling or heating to a sub-area in a room where that person is located. The definition of substantially used throughout the disclosure refers to a clearly definable property due to functionality gained by being so substantially positioned or arranged. To obtain the ability to provide different intensities of the effect such as heating or lighting differently to room sub-areas, the system 164 uses delivery devices 163 and 166 with multiple actuators, outlets, transducers, vents, registers, reflectors, energy sources so arranged over the area so as to provide sub-areas with a localized service. For example, a heating system comprises a control system having a sensor capable of detecting the location coordinates of an occupant, multiple, underfloor electric resistive heating devices which receive power based on the control system, where the room area is covered by more than one independently power controllable heating devices, where the controller has storage means for recording the sub-area coordinates of the specific heating devices effect, where the power to one sub-area or another is based on the controller's detection of the location of an occupant, being or other element requiring a controlled temperature at that particular heating device's coordinates. In this manner a system having sensors, processor and drivers of energy and mass delivery devices for the provision of services over a room area that is comprised of many delivery outlets for said services which are spatially distributed over the area where the system is designed such that the effect of each outlet is substantially localized to a sub-area and where the sensor information regarding occupancy, who the person is, where they are located, what activity they are performing, what are their instantaneous physiological characteristics are determines which sub-area receives the service and what are its characteristics. The net effect of the collaborating elements of the system is being able to provide different individuals with a localized environment of energy and mass flows to maintain them in thermal comfort.

Figure 9:
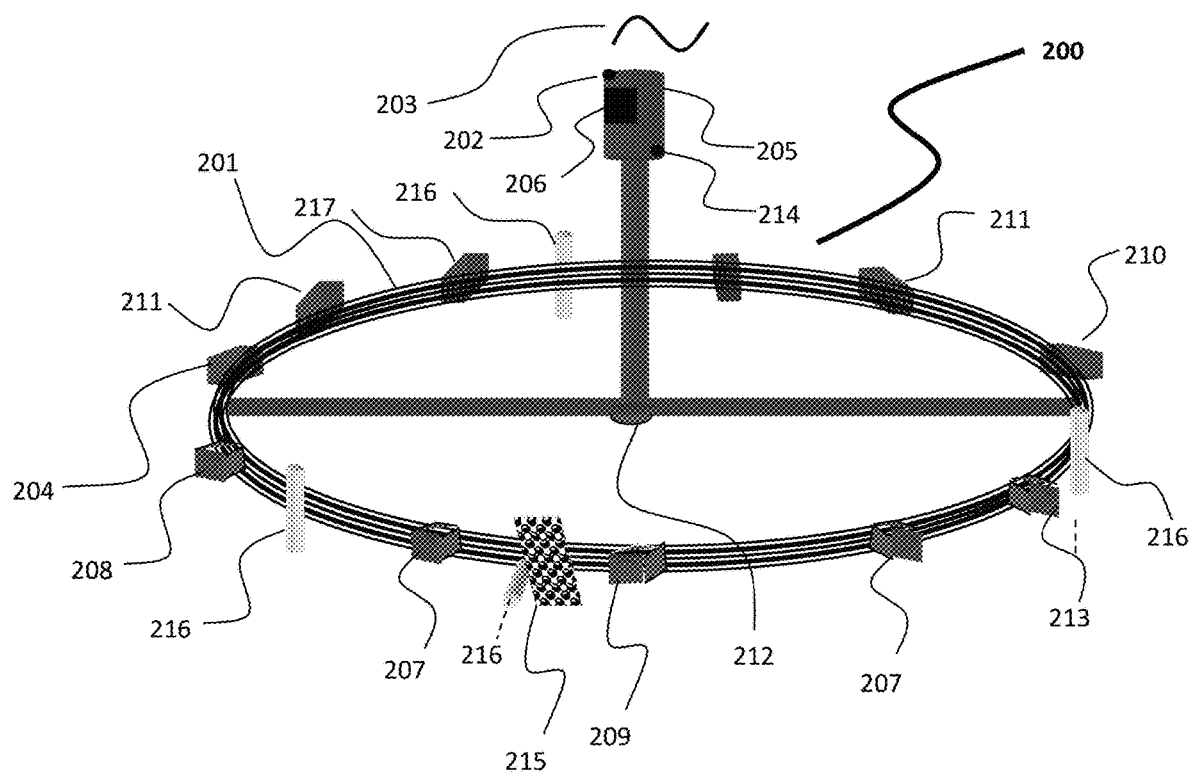
FIG. 9 is a basic embodiment of the of the integrated sensor and delivery device docking platform

FIG. 9 depicts an embodiment of the docking platform having structural and motion equipment so arranged as to be able to bring devices for the delivery and/or modification of energy, mass and media to a more advantageous position for their delivery. The platform chassis 201 having large circumference or large rectangular spacing between the sides is a distributed mounting platform. Its construction allows the devices attached to it to supply the energy or materials from positions that are more optimal for the said supply. Very often in lighting the angle from which the lighting comes is critical in preventing glare and helping vision. In place of cooling entire rooms, it is possible, optimally, to cool only the subarea of the room that is occupied. With proper placement of air outlets is possible to create air curtains that can contain temperate air mass in the area of interest.

Figure 10:
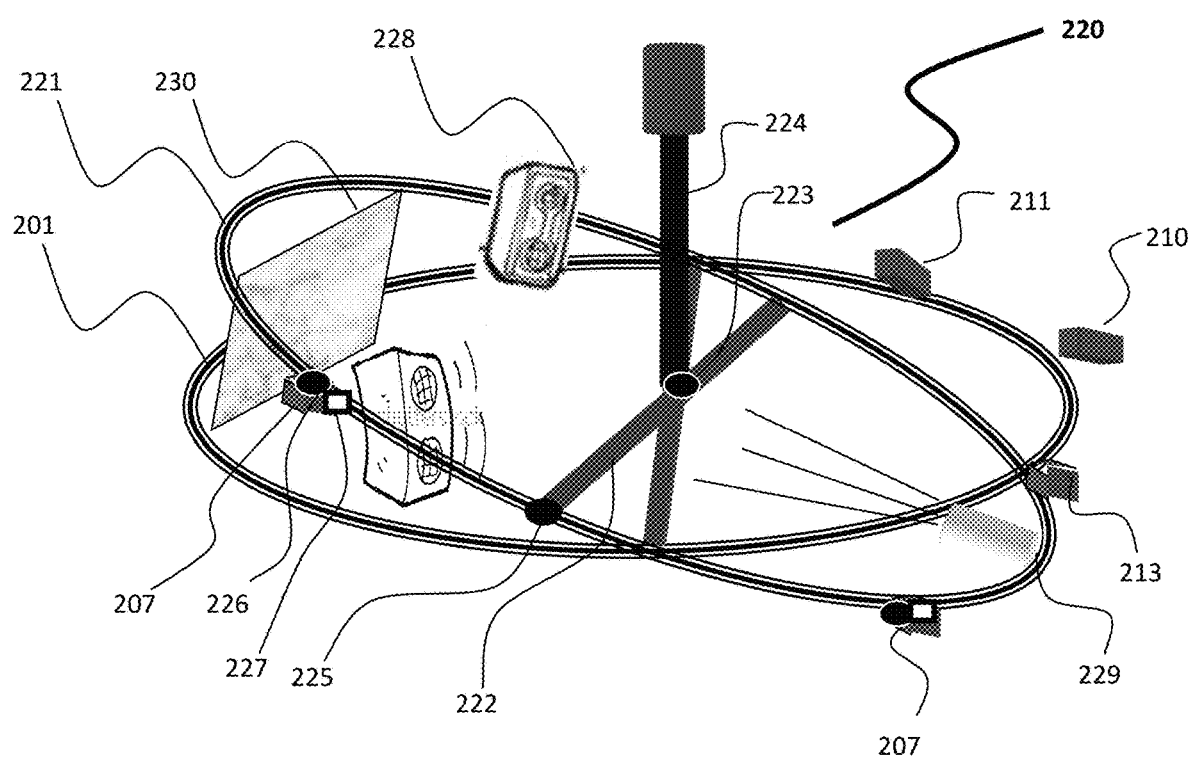
FIG. 10 illustrates an embodiment with a delivery device re-positioning capability

The embodiment in FIG. 10 has the ability to properly position delivery devices. The platform 220 has one or more device mounting chassis 221 having their support bar 222 equipped with a motion mechanism 223 for allowing for the elements to be rotated around the vertical support structure 224 and motion mechanism 225 providing rotation around horizontal support bar 222 thereby bringing devices over to the optimal location for delivery of energy or material. In addition to or alternately, supply or sensor devices 207 have individual movement mechanism 226 that is controlled by controller 206 arranging their pitch and yaw so as to be optimally aimed. Additionally, device 207 can be equipped with a translational movement mechanism 227 on the device 207 mounting equipment which moves along the platform chassis 221 repositioning devices over different areas of the room. In this way a camera sensor is repositioned by the controller to obtain a better angle of view of an occupant's eye gaze so as to better deduce their visual activity and need for lighting. When an occupant locates themselves in a room and light is needed for reading, task light 207 is moved to a position recommended by best practice design as determined by the controller algorithms and power and/or control signals are communicated by the controller to necessary motion devices 223, 225, 226 and 227 to correctly position the spot light so that it optimally illuminates the visual task for the room occupant.

The controller 206 drives directional mounts of devices having an effect such as spot light 207 by using the camera vision registration of the effect registered on pixels previously coordinated with the room's Cartesian coordinates, to a target area determined to be occupied by an occupant. The positional motor could be a stepper motor moving from a home-location to those new coordinates. However, stepper motor and controllers are costly. Therefore, alternately, in the present invention the camera or microphone are used to provide feedback to the mount's motor such that when the effect produced by the device has been detected by 212 as having moved into the occupant's location and as the traverse continues it is then is detected as moving beyond the desired location, the motor driving circuitry reverses the motor, causing the aiming to go back a programmed number of cycles to the previous "correct" position. In this novel way, a system having sensors and devices for delivery of localized effects in sub-area of a room, where the effect producing device has a motorized mount that is to be re-positioned to produce its effect in a newly targeted sub-area, uses its sensors, which are sensitive to the effect, to measure the coordinates of the extent of the effect. The system then uses these obtained coordinates to control the repositioning of the localized delivery device on the new target area. The synergy of using the detected effect to self-program the controller is unique to the spatially differentiated delivery device wed to the spatially differentiated sensor thereby offering a unique inherent feedback control. Alternately, a LED or infrared laser 216 is used for aiming techniques from gun aiming technology such as a red dot sight which uses a tilted spherical mirror reflector with a red light-emitting diode (LED) at its off axis focus or LED laser aligned with the axis of the delivery device 215 is detected by the camera as being located at a certain pixel coordinate. The target occupant that the system 206 is interested in the delivery device to affect, has been located by the image recognition software to be located at pixel coordinates that differ from the coordinate of the detected reflectance of the laser pointer. Using stored algorithms for triangulation and guided systems known in the art, the controller 206 processes that geometric difference between the coordinates and outputs power signals that power the x y motors on the laser mount whose beam is aligned with the device's axis such that the laser coordinates detected by the camera sensor are now brought closer to the targets geometric coordinates location. The process continues by the controller 206 until the laser 216 is detected to be at the center of the target's coordinates.

Speaker devices 228 for listening to music can be added to the platform 220. Proper location relative to surround sound stereo systems is vital for an optimal listening experience. In prior art technology an occupant is relegated to sit at a specific location in the room. The platform's 220 manual or automatic re-positioning capability allows an occupant to sit anywhere and still receive an optimal listening experience. The system controller 206 runs best-practice algorithms to determine the position of the surround sound stereo system's speakers relative to the listeners in order to get optimal listening experience. The sensors in the automated system 220 upon occupant entry and taking up a position in the room, determines the location of the one or more listeners. Algorithms known in the art such as covered in "Providing Surround Sound with Loudspeakers: A Synopsis of Current Methods" Jens Blauert et al. archives of Acoustics, Volume 37, Issue 1, Pages 5-18, are be run by the processor 206 in order to determine the best location of the multiple speakers 228 vis-a-vis the listeners in the room. The controller now moves the chassis 221 around axis 224 to a position where the speakers are optimally located for sound surround effect at that occupant location. To effect toe-in for better accuracy, speaker mount motion control 226 adjusts the angle. Often speaker height is a factor and the ability of the chassis to rotate around support bar 222 and lower or raise devices mounted thereon allows another dimension of accuracy in positioning. Thus, an occupant is free to sit where they prefer and automatically via the controller, the delivery devices are moved to the optimal position by the controller software, drives and platform motion devices.

In prior art technology a person desiring to watch television is constrained to sit in front of the TV device. Users have many more needs for displays today and for the sake of portability they often watch media on small Smartphone displays. With the present ceiling mounted MDS system 220 the user can sit in any part of the room, lay in any position and the projection equipment is automatically moved to an optimal viewing position on the wall or ceiling. A video projection device 229 has been attached to a chassis 221 this is a video device such as a home theater projector, mini-projector, a micro projector or a pico-projector such as M2 Micro Projector or P300 Pico/Micro LED Projector, from AAXA Technologies. The projector can be shown on a wall or on a pull down projection screen 230 which is mounted opposite the projector 229. Alternately, the MDS display device 230 can be a regular flatscreen TV. When a user has need for a display, the controller's sensor detects the user's eye location and determines a best practice location for the display screen and/or projector. The controller then calculated the required movement of the mounting chassis 221 to bring the display to the correct location in 3D space for optimal viewing. If the user readjusts their position, the controller's sensors automatically detect if the movement requires repositioning the display and if needed the controller drivers can now automatically move it to a new more comfortable position. In addition to or alternately the entire MDS 220 or a chassis 221 can be lowered in order to properly position devices. The platform has a mechanical winch or motorized winch that is employed to lower the MDS 220 or parts thereon to a serviceable height to access the chassis to add new devices, adjust or re-aim devices, refill material storage vessels and replaceable parts such as lamps and filters. A self-guiding disconnect coupling makes the electrical connection when the platform is raised back into position.

Often elderly citizens need hearing aids in order to hear phone conversation or face to face conversations properly. Sometimes in the morning before the person has placed their hearing aids in their ears it is hard to contact them via telephone or speakerphone. Often even with the hearing aids it is difficult for them to understand phone conversations. As is typical with the hearing impaired text is flashed on a video screen and the hearing impaired person can understand. Using voice to text program, a phone call or in person conversation can now be shown in large text letters on the screen 230 which is easily visible to the hearing impaired person from any position they are facing thus facilitating commutations with them.

A unique use of the system is for hands free text input without needing to hold a device. A preferred embodiment enabling one to type in air is to combine the display screen 230 and gesture recognition sensor pack 212 to detect the pointing vector of the occupant's finger in relation to keys on an enlarged keyboard displayed on the 230 or projected on the wall. The controller 206 is running a set of algorithms and controlling devices for this air-typing text input application. A projected key determined by the controller as being the one being aimed at will change color or have a visible dot on it providing feedback indication to the user where his finger presently is on the keyboard. The occupant may use pecking motions in the air to press on the indicated key where they are picked up by the detectors 212 of the camera vision system using gesture recognition software known in the art. Alternately, Swype, by Swype Inc, type of sliding finger motions from the first letter of a word to its last letter and then lifting can be used. Thus, a motion recognition system used for accurate hand and finger motion detection as used for gaming, e.g. Kinect sensors from Microsoft, can be used for text inputting in the air anywhere a person is located hands free. Using air-typing the occupant can connect with social media and the internet or input commands to the platform 220 without recourse to a hand held device or physical keyboard.

The platform system of FIG. 10 allows for a hands free telephone answering operation. A complete telephony system can be created for managing all telephony from all landline, VOIP and wireless sources by adding minimal communication cards, or re-programming the processor with communications protocols and codecs alone. Thus, in the integrated docking system there is a sub-system having devices for managing all telephony, such as modem card for the land line, Bluetooth link to the cell phone calls and/or voice over IP communications protocol for calls over the internet as well as a microphone 132 or 212 for voice pick up and a speaker already present and implementable by software addition. The home's land-line phone system or the user's cell phone via direct hookup to the home or office's telephony system or via Bluetooth, ZigBee or WiFi is in communications with the platform's communications system circuitry 206. In one embodiment a router and/or computer in the home, which may also be the platform's 220 computer 206 is outfitted with software and a modem for uniting the land line together with the VOIP telephone software and to broadcast calls over the WiFi system. When the phone rings the controller plays the ring over the speaker where an occupant is present. The occupant via a gesture, voice command or entry via a connected computer or Smartphone GUI can signal that they want to answer the phone hands free. If a single occupant is detected in a room then occupant can then conduct a conversation over the platforms microphone 212 and speaker system 228 with the controller invoking algorithms to deal with the acoustic issues of echo cancellation and noise suppression.

A parabolic loudspeaker is a loudspeaker which seeks to focus its sound in coherent plane waves either by reflecting sound output from a speaker driver to a parabolic reflector aimed at the target audience, or by arraying drivers on a parabolic surface. The resulting beam of sound travels, with little dissipation in air and can be sent to isolated audience targets. The parabolic loudspeaker 254 is mounted on the chassis 201 or a robotic arm 250. A localizer sound dome is directional speakers with the tightest focus. They focus directional sound to a single listener or direct sound to a broader zone. If so requested by the user, or rules have been recorded in the recognized occupant's data file, the controller 206 can position the dome over occupants as needed to carry out private phone conversation. If a second occupant is detected in a room and for privacy reasons or so as not to disturb others, a remote active noise cancellation as in US Patent Application 20090060216 by Sweeney et al. is executed in the processor 206 to be broadcast proximate to the second occupant and/or U.S. Pat. No. 7,853,024 "Active noise control system and method" may be used at the first occupant voice source so the second occupant does not hear the first occupant speaking and disturb them. The controller coordinates speaker output timing with the noise cancellation device proximate to the second occupant. Uniquely to the patent, the controller in handling both the telephony voice sampling and the noise cancellation function. The controller runs algorithms to calculate the optimal parameters and operates simultaneously the noise cancellation at the voice source, timed with the telephone microphone voice sampling and the noise cancellation at the second occupant's ears. While noise cancellation may be best when the speakers 228 broadcast at limited frequencies, or when limited frequency hypersonic speakers 215 are used, with the present configuration of algorithms, sampling and controlled driving, the speaker system 228 is able to broadcast in all frequencies. In another configuration of operational and control parameters based on the specific sound wave interaction, one or more private conversations can be carried at the users' present locations without them needing to don headphones. When a call is entered on the Bluetooth connection or other telephony connections the controller drives the motion equipment used to bring the noise cancelling equipment 254 proximate to the noise source or by the second occupant the platform. The sound focuser 254 has a positioning boom and lowering system to bring the active noise cancellation equipment nearby the user. The controller uses the movement device to locate the sound device 254 to wake up only a single occupant in a room at the time input for the specifically controller recognized individual.

Figure 11:
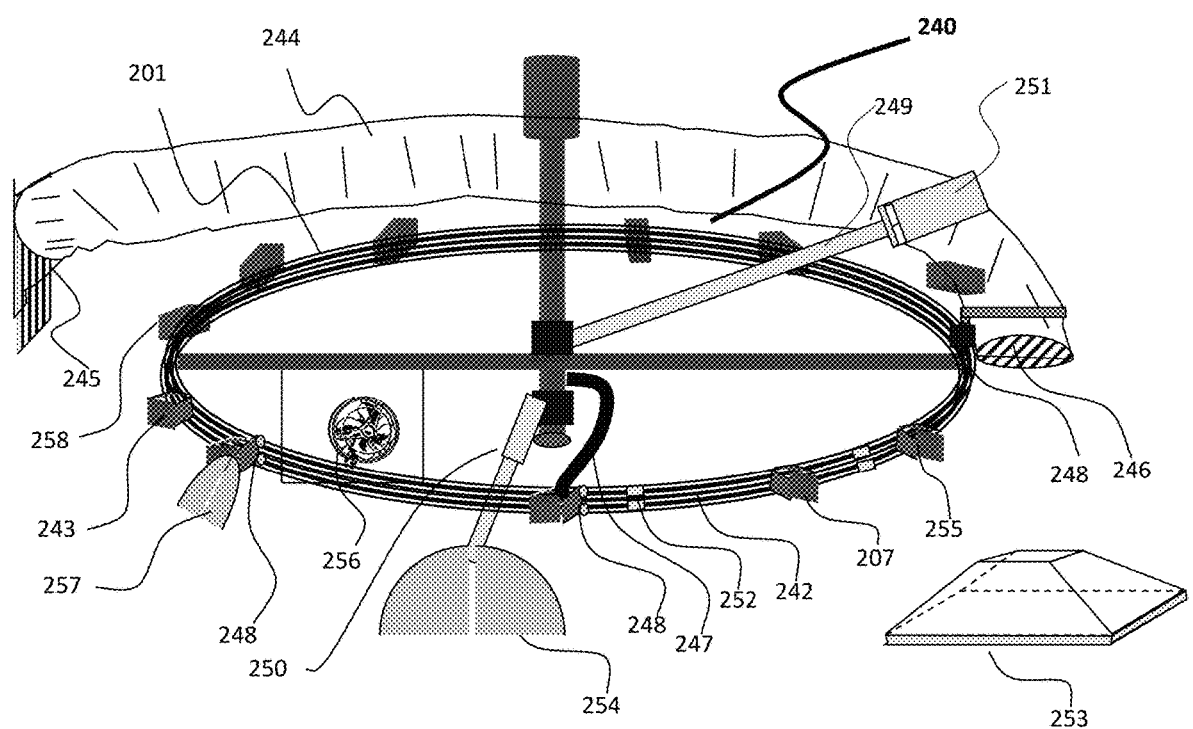
FIG. 11 depicts a robotic embodiment of the device platform

FIG. 11 illustrates an alternate method of bringing device to an optimal location for delivery. As the delivery of heated or cooling air to the location where one or more occupants are located is advantageous in saving energy, a method is disclosed for the platform to have air outlets that can be controlled and/or moved to the optimal delivery position. It can be taken into account that in the office and home, Americans sit about 9.5 hours per day and thus it is possible to use micro-environs to provide optimal services. The platform 240 is shown in a below the ceiling configuration. Alternate, more aesthetic configurations, include deployment within the plenum above a drop-ceiling as well as below a floor. In one embodiment, the platform 240 has chassis 201 where devices are mounted electrically and mechanically and the chassis 201 has channels for carrying air flow and/or tubing for carrying water, air or refrigerant 242. The platform 240 has connection to the HVAC air supply and/or heat pump refrigerant. Controlled air vents 243 are distributed along the chassis and controller 206 drives the air vents air flow valve to control the amount of air exiting. In an alternate embodiment the controlled air delivery device 243 is equipped with a heat exchanger using air, steam, water or refrigerant as its fluid and/or an air moving device. Alternately, the air vents are connected to the HVAC air supply via flexible ducting 244. The duct is connected to the air supply 245 and has one or more outlets 246. Alternately, the central heating or cooling system designed to actively circulate air uses a more powerful blower, smaller 2 inch mini ducts of flexible tubing 247 to distribute the air which is now attached to many more outlets 243. In a similar fashion a camera vision and/or bolometer controlled air delivery system distributed over the occupancy area in a bus or airplane is automatically capable of opening and closing specific vents 246 in relation to the occupant's actual physiologically measured climate control needs as disclosed earlier.

In another embodiment the energy or mass delivery devices such as task light sources 207 or climate control air outlets 243 are equipped with electro-mechanical actuators or wheels or electro-magnetic apparatus for moving from position to position on the platform chassis. The platform structure has rails and guides that allow the device's movement mechanism, which may be a linear modules with ball rail systems and/or typical pulley belt system toothed belt drive movement mechanism or using a direct gear drive method to run along chassis 201 as known in the art. When a need for an amenity or service is detected by the controller in a specific area the controller will calculate the optimal best practice delivery position for the device and send signals to the motion device to move a device from a storage area or from a previous position to a new position on the platform such that they are over a sub-area of a user in need.

The ducts 243 can be equipped with a moving mechanism 248 such that the controller can provide a driving power signal to move the outlet 243 along a track. Alternately, the platform is equipped with one or more robotic arms 249. The robotic arm 249 with motion actuators is connected to support structure 223. It is controlled by controller 206 to move a delivery or sensor device and moves and holds the device in the control determined position for service. An alternate configuration of the platform 240 without a chassis 201 is comprised of many robotic arms 249, 250 etc. like spokes of a bicycle wheel extending from hub 223 holding one or more devices each over an area. Robotic arm 250 is equipped with an extender and controller 206 drives the motion mechanism of robotic arm 250 to place the devices in the correct coordinate. Thus, a platform 240 may be sans chassis 201 and use a series of arms to position devices like spokes on a hub where some of the arms may be moveable. In another configuration the robotic arms 250 and chassis 241 hold different devices dependent on their cost and frequency of the need for re-positioning. The robotic arm 250 is equipped with an end-effector 251 such as a simple gripper or anthropomorphic end effector to pick and place variously shaped devices and move them to a different position and release the clamps as controlled by the controllers algorithms known in the art for computer vision driven robotic systems such as used in autonomous robot by Epson (TSE:6724 Seiko Epson). In this way medicines may be delivered to patients in need of supervision and caregiving giving staff and family a remote ability to dispense and monitor medicines and food.

In an embodiment the rail is constructed having insulation and is equipped with power and data connectors that are pre-installed at the factory at set points around the circumference or may be user installed at the correct location. Alternately, a delivery or sensor device may be easily connected to the rail 201 via a spring loaded clamp which allows the power connection to be positively made anywhere along the conductive rail 201. The individual clamp arms have insulation piercing tips that make a conductive path to the rail. In another embodiment the chassis is equipped with hot-shoes 252 which may be a magnetic power connector with multiple pins such as the MagSafe introduced by Apple Inc. The connector is held in place by a magnet. The devices have mating apparatus with the pins of the chassis connectors 252 distributed along its circumference or lengths. Thus, the pick and place robot arm 250 with gripper 251 can place any connector outfitted device in a new location and the physical, data and electrical connection in made as the device snaps to the magnetic connector 252.

In a drop-ceiling based system the platform is hidden by the ceiling material. In another embodiment there is no chassis 201, the platform's structural support function is carried out by the drop ceiling and the rail electric and data function is carried out by cables such as USB which becomes the power connectors and data. Again the robotic arm operating in the plenum or under the floor picks devices from one position moves the device to a new position and remounts them in the new position where there is mechanism to make connection to the power and or data bus of the controller or alternately there are cable connections.

As a result of the platform being equipped with tubing or channels for carrying cooled air, valves for controlling the exit of air from outlets and air outlets the controller having many air delivery devices that have an effect localized to a specific location the occupants receive a better quality of service and energy saving is achieved. Air conditioning, humidifying and heating is now localized. Where the air channel is flexible and the outlet has a movement mechanism to move it over a desired area, the controller based on data of the occupant location as well as the temperature of the air being delivered vs. the ambient temperature and having algorithms to calculate the air density effect on cooling, heating and the creation of drafts calculates the optimal location in 3 D space for air injection to the rooms environment and moves the outlet to the optimal delivery position. The platform thus may have movement mechanisms 250 to move the devices in a plane parallel with the floor and additionally have movement mechanisms for raising and lowering the delivery devices 243 and/or 246 in relation to the floor. So in the distribution of cooled or heated air mass for cooling or heating the devices are attached to the HVAC system and platform control network and the supply devices are capable of bringing air substantially only to the occupant's location thereby saving great amounts of energy. A booster fan may be used with heated or cooled air 245 to bring large mass of air to a newly occupied area to quickly change the air temperature upward or downward such that there is no need to keep the entire house or even an entire room hot or cool to quickly insure a feeling of comfort. In another embodiment, the booster fan blades in the duct 244 also serve as the air flow valve blocking air flow when the controller decides to limit air flow from that outlet register. The fan or blower blades are built such that the blades have movement mechanism and are positionable such that they can block the air flow in various amounts till closure as the controller sends signals as needed. A hood device 253 to create an air curtain about an individual is shown as being attachable to outlet 246. It is moved by the controller over an occupant and the air moving downward creates an air curtain of air at higher pressure preventing outside air to enter and affect the air temperature within thereby isolating the microclimate allowing for much less energy to be used to effect climate control.

The ability of the controlled pick and place robotic arm to move devices on the platform for sound 228 and projection and/or display 229 allows a person to stay in their present position while the platform system brings the delivery device into the optimal position for listening and viewing. The camera system acquired and calculated location data is fed into the controller's processor where algorithms determine the present best placement for the speakers and drive the motion generating mechanisms of the speaker's mounting apparatus to move the speakers to the optimal location for the surround sound stereo effect. The system is novel in that in prior art, a person must come to a device while now the device comes to the person in the correct configuration. Thus in the present technology, in place of expensive robots running around a room, a stationary automated ceiling platform is capable of delivering services and items to people in situ in a much simpler device.

As it is an object of the technology to localize the delivery of energy and mass to occupants as much as is possible these delivery devices for example 207 and 210 need to be placed proximate over the location of the users. The system 240 has devices 249, 250 and 251 to move devices where needed. The platform has tools in non-used locations or a special storage area and in a similar fashion to the tools magazine of a numeric CNC turret head punching machine. The pick and place robot arm 250 with its end tool picks up devices as needed and holds it at optimal location for use and returns the device to the magazine when the use has needed. Thus, on a phone ring the robotic arm 250 grabs the speakerphone apparatus 255 from the chassis 201 or magazine 205 makes an electrical and communications connection and brings the device with its microphone and speaker over the user for optimal functionality.

The platform 240 robotic arm 250 can pick and place either an energy or mass delivery device. Examples of energy or mass delivery devices as follows: energy includes radiation, lighting, sound, visual projection systems infrared heating. Examples of mass is the delivery of heated air, cooled air, fragrance, treated air such as deionizer air, oxygen, water, mist, deodorized air etc.

So for example a fan 256 can be moved on the chassis 201 such that is placed proximate to the occupant at the proper aiming. In a similar fashion an infrared heater 257 can be moved on the chassis 201 over the occupant's location and aimed via its movement system 248 and/or brought by arm 250 to an even more optimal position, more proximate to the user thereby maximizing comfort and energy saving. As people need very few devices at a given instant a myriad of devices can be served by very few robotic arms.

It is also possible to lower devices from the docking platform such that they are further proximate to the user. For example, an electronic book reader such as Kindle can now be suspended by the controller in a comfortable position. The controller uses pre-set situational algorithms or machine learned user preferences to drive the robotic arm 250 into position. The reader can be detached from its holder and held in the hand if preferred. Thus, a person can store make-up kit that they use while in bed on the docking system platform. Then again, by interfacing with the controller which is in power and data communication with a motorized mounting base attached to the kit, it can then be raised and lowered when needed and stored out of the way. Thus, the platform can also serve as a storage and delivery device of non-consumed items. The ceiling based platform with its sensors, image and speech recognition, synthesized speech, two way communications and delivery devices combined with a robotic arm is especially useful in healthcare situation where a patient is mobility impaired and monitoring the occupant, what they have eaten, pills taken etc. The robotic arm allows for appurtenances, food, oxygen to aid in raising $SpO_2$ and medicine to be only as far away as a voice command from the patient or remote command from a caretaker. The pick and place robotic arm can access food, drugs, air supply tubing, medical materials from drawers and bring them to the occupant or hold them proximate to their nose or mouth etc.

Figure 12:
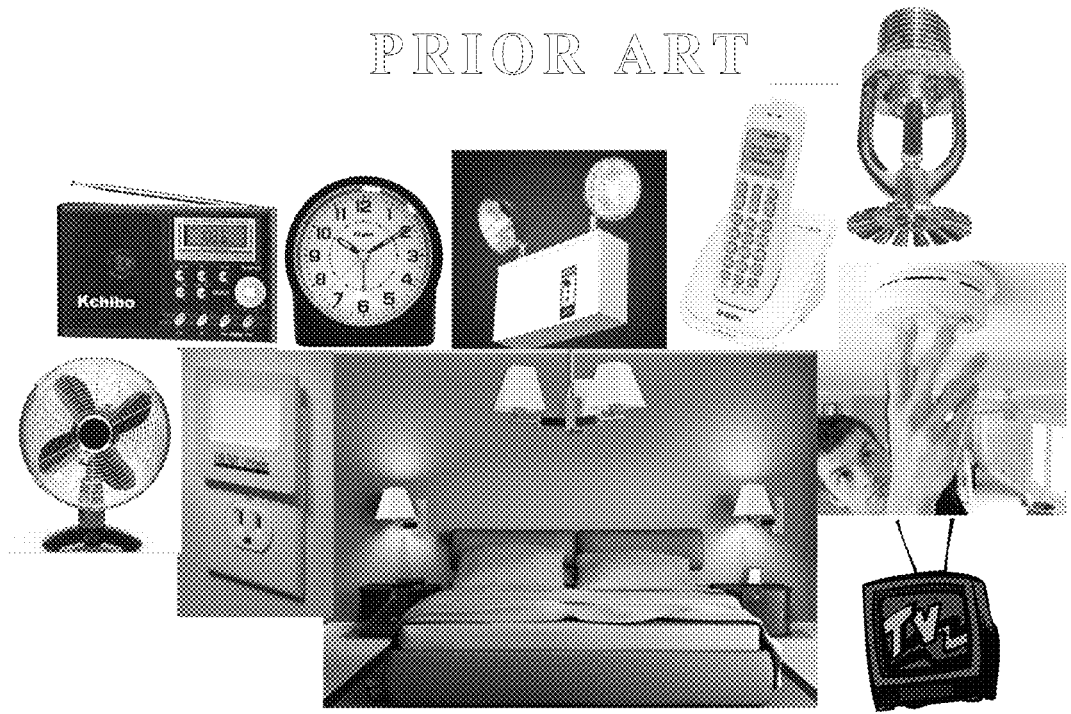
FIG. 12 illustrates the Prior Art duplication of components in a room's appliances
Figure 13:
FIG. 13 illustrates how the docking platform integrates the appliances thereby eliminating the duplication of components including a Smartphone

FIG. 12 prior art and FIG. 13 the device of the present disclosure illustrates another beneficially simplifying feature of the device docking platform common to the smaller dimensioned centralized EMCD 20 configuration and distributed MDS platform 200 is the reduction of clutter and duplication of components in office and home appliances. In prior art FIG. 12 a typical bedroom is depicted showing devices used to affect the environs and modify mood including: 1) an overhead lighting fixture is in the center off the room provided with a switched electric power supply; 2) & 3) two table lamps provide reading lights and 4) a night light for the outlet; Altogether four separate devices need to be switched daily for a user to control their illumination; 5) an emergency light, 6) a smoke detector and 7) fire sprinkler all provide safety. 8) A TV, 9) radio 10) telephone and 11) intercom offer communications while 12) a clock keeps time and 13) fan keeps cool. As the prior art shows there is extensive duplication of components in a single room. There are four devices with separate displays. There are five separate devices for illumination. There are five devices with speakers and basically each device has its own power supply. Not to mention the clutter on table tops and the number of switches.

FIG. 13 illustrates how the docking platform 260 integrates the appliances above thereby eliminating the duplication of components including the need to carry around a Smartphone inside a home or office. FIG. 13 illustrates a camouflaged platform 200, which is made to look like a lighting fixture in the center of a bedroom which actually is. In addition, it has power supply and processor 206, and sensor pack 212 which are all expandable. The unique platform can with very little hardware additions perform the functions of all the 13 devices and via the synergy among them provide additional functions in a superior way. The central platform chassis has two task lights 207 as decoratively packaged lights 261 on extender bars illuminating down onto the pillows for reading. The dimmable LED light sources 208 distributed around the chassis have a back-up battery module 209 on the chassis which integrates with the power supply such that in a power outage the LEDs illuminate as an emergency light. The platform has replaced five different illuminating devices with an integrally controlled and driven multiple area specific light sources fully dimmable down to night light levels. The situational aware controller 206 on sensing when an occupant awakes to the restroom in the middle of the night drives only the nightlight distribution of lights 208 illuminating the path around bed that won't wake a roommate. Due to the integrated, yet modular architecture of the power supply, logical control and docking apparatus, adding functionality to the platform is simplified. In many instances the usage of shared components is provided by the single integrating device platform. Therefore, often only minimal apparatus is needed in the form of additional circuitry and/or software programming of the controller in order to provide for the specific device's unique functionality. This saves on the need for added power supplies, housings, speakers, displays and many more common components. For example, assuming a customer has purchased and installed an MDS 200 with its integral power supply, controller processor and computer vision system in a room. The controller has an onboard a sound card and the customer has already modularly added a stereo microphone to the sensor pack and speakers to the platform. Adding an AM/FM radio would only entail the purchase of a communications IC chip such as the Si473x-D60 digital CMOS AM/FM radio receiver IC packaged with antenna so as to attach via a specially designed system board socket or USB port on computer board 206. There is large savings in sharing components vs. purchasing a radio as there is no need to purchase a power supply, amplifier or speaker which is common to a music player or intercom system. For the clock display it can easily be provided in easy viewing by the display projector when in sleep mode and accessed when in video mode by a voice command.

As shown, a single set of speakers 228 on a platform 220 situated in a bedroom is thereby capable of replacing the speakers of five devices thereby reducing waste on duplicative components. Similarly adding hands-free conference room quality speakerphone functionality to the platform is simply accomplished by uploading to the controller voice cancellation and telephone coding algorithms. Software alone can add functionality without purchasing speakers, housings and other parts that will fill more garbage dumps. As some people wear clothing without pockets and carrying a cell phone is difficult, as a further convenience, it is possible to have access to all phone lines answerable in every room of the house without having to carry around a phone. Additionally, the camera vision recognition system 212 in one room passes on the occupant's imminent entry to the next room's controller and the communicating controllers ready the two platform's microphones to switch over such that phone conversation carries on seamless from room to room, headphone and hands free. Persons cautious of radiation from cordless phones and wireless earphones would benefit from a platform 200 based speakerphone where the platform communication 206 itself is connected to the home's router is via cabled Ethernet.

Another example of the platform's superior ability to meet user needs based on the situational awareness is a hands free phone answering system in which the platform's controller uses the inter-dependence of more than one device to provide a superior result. Thus, if the occupant is detected by sensor 212 as reading a book with spot light 207 on high intensity or listening to stereo on 228, or TV is being watched through a device 229 and the lighting 208 is dimmed for the TV etc., all these devices are integrated, being controlled and monitored as to operation and content by the controller, then when the controller's phone system detects an incoming call, it may use the device the occupant is presently involved to present the call notification. If it be visually on the display or audibly over the speaker. On ringer activation it will stop the MP3 player or mute the TV input while playing the ringer over the same speakers 228. If the occupant chooses to answer the call the controller can invoke a device for recording the TV content being missed for later high speed review and/or adjusts the lighting 208 from dimming or the spot 207 down from high intensity or stop the music player or video for the duration of the call to make the atmosphere pleasant for a phone conversation and at the end of the call adjust to what light level is needed for the new or resumed activity of the occupant. This differs from other systems which may automatically resume irrespective of the occupants present activity which may change after the call. The media player or TV will resume at the place it left off at the end of the call unless otherwise commanded.

Figure 14:
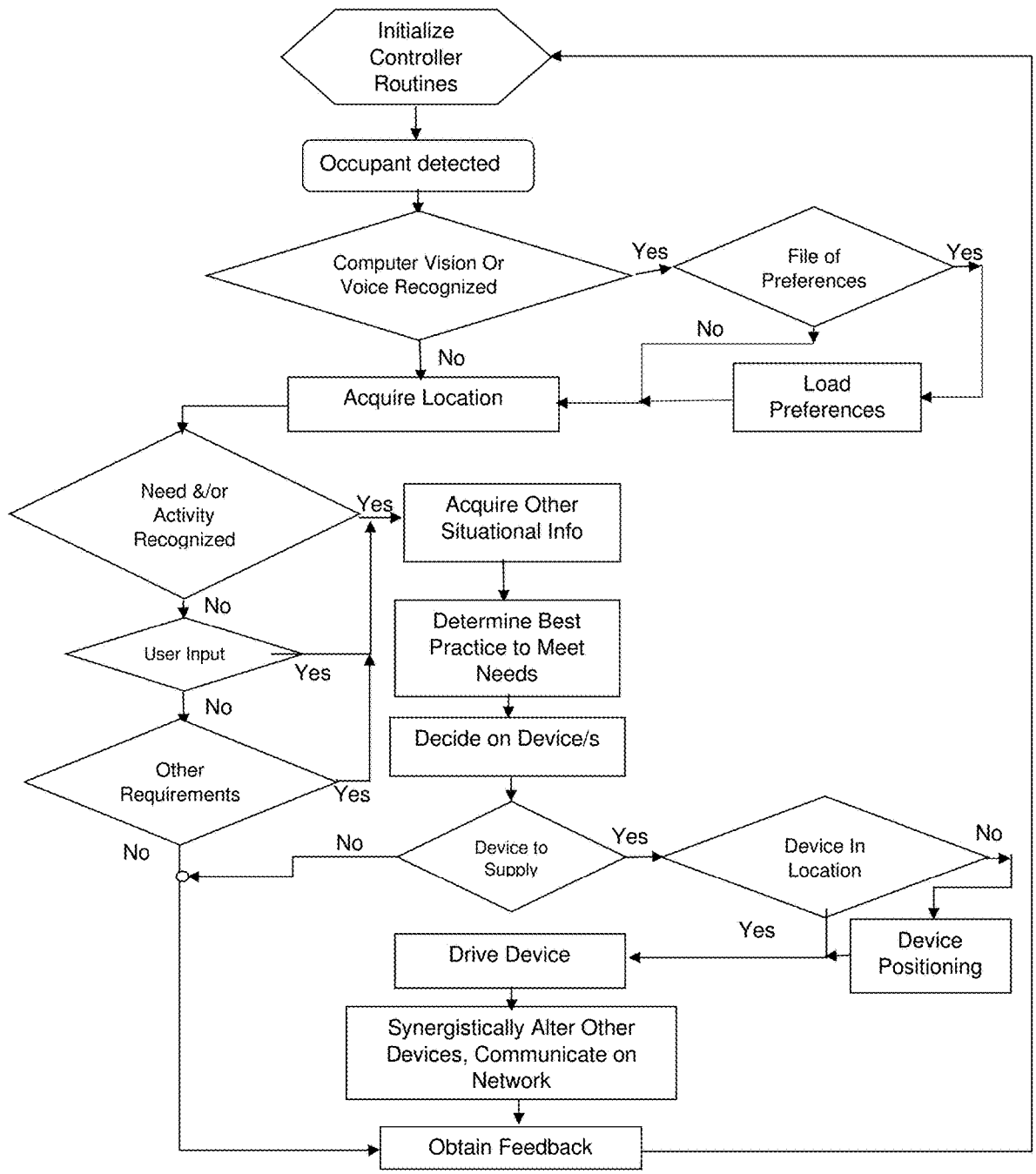
FIG. 14 is a flow chart of the situationally aware controller algorithms

The controller 206 runs programs and calls on data to process algorithms to both analyze the data and provide control signals to the delivery devices. FIG. 14 is an exemplary flow chart of the situationally-aware controller's logical processing program that is capable of gathering inputs from sensors, users, feedback from devices it is controlling and outside sources via communications, such as from a power company using a smart grid, and using artificial intelligence techniques known it the art operate devices according to best practice in meeting user needs. Controller circuitry has been arranged around the processor to manipulate the data coming through the processor. It also provides an amount of temporary data storage. The controller generates control signals that direct the operation of memory and the datapath while the memory—holds instructions and most of the data for currently executing programs. The controller receives input from external devices such as image sensors, photodetectors, bolometers, microphones, keyboards and networks that provide input to the processor and has drivers and boards for the output of control signals to external devices such light sources, motors, speakers, displays, and wider networks that receive data from the processor. The flow chart FIG. 14 of the controller's algorithms 206 for executing programs used to run the control process, diagrams the controller 206 having algorithms setting itself up in preparation with the discovery devices and sensors it is in communication with. The computer program makes use of automation methods known in the art including a finite-state machine model of computation where the machine makes a transition from the current state when initiated by a triggering event or condition picked up by the sensors or controller algorithms to a new state. The of operation of the processor upon an event of detecting an occupant is to gather information via computer vision or voice recognition of the individual and to check if there exist a look-up data file of preferences and then goes on to determine the occupant's location, discover their needs as covered in the specification. The controller will process the information and generate the power signal to devices according to best practice in meeting user needs. The main controller program will be calling other subroutines to handle various instances for controlling sensors and devices based on the occupants or room's requirements.

Hitherto, it has been necessary to locate devices such as a radio alarm clock on a night table top so that a user can physically access its controls to set a station, change volume and set alarm wake times on a daily basis. The addition of the microphone and video sensors to the platform's sensor capabilities, as well as software for the logical controller's interpretation of images as well as the proliferation of Smartphones capable of running device control applications on an easily understood Graphical Use Interface, GUI now allows devices to be placed out of the way, near the ceiling, in the walls or under the floor on integrating service platforms 200. The platform's computer vision capability is used as hands free TV controller with the use of gestures in the control of television watching. It enables the user to choose channel number by indicating digits with the number of fingers or wave hand right to increase the channel number or left to lower. Nods of the head and facial expressions, eye winks or eye motions add further dimensions of control. The natural interface of controller 206 uses natural human communications and body language in a situational basis to combine separate data inputs; one from the computer controller as to what devices are in what mode of operation combined with sensor input from the room environs using computer recognition routines to recognize and interpret the user's intention in real time as it may alternate from one device to another such as when a phone ringer is detected by the person and their attention moves away from the TV to the phone.

Monitoring how much a person eats during the day may not only entail keeping track on the supply of calories taken from the fridge or kitchen closets but following actual consumption of a Computer Vision recognized individual from room to room as needed. The camera sensors 212 in occupied spaces has a DSP running algorithms to recognize the type of food, the size and who did the eating specifically and keeps track of the calorie or salt intake etc. In a true artificial intelligence personal assistant configuration of an integrated device control system 206 the knowledge base of the computer system includes the GPS coordinates of the home. Thus, by using stored algorithms or accessing information and computer algorithms on remote computers or in the cloud the AI system has situational awareness as to environmental phenomenon such as where the sun is at that hour as well as algorithms to calculate what side the image recognized window in the room is on and is able to automatically control the blinds if an occupant is situated where intervention is advantageous. To input the window facing coordinates the user on installation of the motorized blinds which have networking circuitry and protocols to communicate with the platform's controller faces the window with a GPS, magnetometer and accelerometer equipped Smartphone and the information on the window facing is transferred to the MDS controller. In a preferred machine learning embodiment the window shade operation is self-programmed the processor has information on its longitudinal and latitudinal location, date, time of day and has used its object recognition algorithms to recognize the windows in the room. The camera pixels acting as light meters record the light on the windows as a function of time over a period of days. Using sun location algorithms stored in it memory the controller 206 now calculates the window facing direction and over time is capable of predictive action in controlling devices such as the lighting and automatic blinds based on occupancy, user activity and solar isolation. Heretofore, prior art technologies operated the blinds automatically on occupancy detection and manually programmed data, irrespective of the occupant's real benefit.

A unique feature of the invented intelligent (vs. smart) home device is that now the operation rules making process is automated. The situational based controller 206 has algorithms to detect human activities such as reading or dressing and analyze them based on time of day, user input and/or machine learned categorization. Thus, based on sensing a user's proximity to a clothes closet in the morning and having been programmed that dressing is weather and appointment calendar based, it will query via the internet the weather forecast and based on its stored or cloud accessed best practice rules advise the user on the speaker 228 as to appointments and weather affecting the choice of clothing the person should consider wearing. Using a wardrobe organizer computer application, the camera system takes pictures of the person daily after dressing and stores a record for playback on the display when the next dressing activity is detected. In this way the system will display to the person what they have recently worn and what is available that fits today's weather and events. In another application, the CV and sensor system has a program that can automatically log events that are recognized by the system. Thus, if the system has been taught to recognize car keys or a daily planner, when these items are placed somewhere that is detectable by the sensor system that event—"daily planner placed on bread box" is recorded in a log. The controller's log can also be communicated to a computer or via internet to the cloud for long term storage. So, if the person has misplaced their daily planner in the house they may enquire by voice from the event log based on keyword "daily planner" and the system can return via the speaker the room and location in terms of a piece of recognized furniture or coordinate. The same logging process is carried out for phone calls made and number of cups of coffee drunk during the day and other information for dieters or health monitoring.

Another set of algorithms run by the processor adds an additional beneficial functionality to the platform, that of passing the music from one room to another. As a person identified by the facial recognition algorithms of the platform's vision system and flagged as listening to music provided from the controller is sensed as moving out of the room and the music speaker's range, as occurs when an occupant is moving from one room to another, the music player stops playing the music or playing a codec such as MP3. Upon transferring the information on the listener's move to another rooms networked controller and upon re-recognizing the listener entering the living space the central networked controller or the new room platform's controller will then resume playing the music on its connected music player and speakers from the point where it was stopped. Using communications 206, sound hardware, media and AI software a system has been created a house-wide system offering continuous music listening experience without losing a note. Alternately, the music being turned on by the controller in another room is also dependent on factors in the programs code of best practice or as learned set of preferences; for example, if other people are detected as being present.

The communications system may also be optical using UV, visible or IR spectrums. In the synergistic sharing of components, the IR light sources 217 used to aid the camera's night vision is pulsed by the driver per the communications protocol. The emanating radiation data packet is so pulsed so as to create a specific and unique address for the data directed to each device. The data message is picked up by a device's communications circuitry and the data acted on and resulting in an action may be detected by the sensors for feedback to the controller. Where the communication back to the controller may be via the remote device's 207, 228, 243 etc. output product such as lighting or cooling whose effect is picked up by the sensors 212 or communicated via the devices 207 communication's circuitry back to the platform controller's optical sensors 212, or via the power bus 201, wired or wireless controllers. In an extremely synergistic example, the feedback for a LED lighting device's correct operation can be obtained by the temporary millisecond suppression of other light sources illuminating the area and measuring by a photodetector sensor in the platform's sensor pack the PWM or other pulse of LED driver. Alternately, the camera 212 is used as a photodetector by suspending the usual frame rate routine and instead measuring one or more of the array's photodetectors at a very high sampling rate or operating in analog mode to detect the PWM. The photodetector 212, at the same time can measure the luminance as another check on the LEDs 208 performance. The platform's optical communications ability 217 is also used to operate older generation already installed in the room legacy devices which work off standard IR remote control communications protocol.

A novel aspect of the invention is that the gesture or voice command is understood in terms of the present situation and therefore a small set of universal gestures will have a much wider set of interpretation by the artificial intelligence computer program. Thus, if a phone rings while the user is watching TV, the gesture or sound of snapping a finger is interpreted by the processor running the stored operating rules algorithms as indicative that the user is wanting to answer the phone call; while a stop hand gesture is interpreted to reject the call and stop the ringer. Had there not been an incoming phone call, the same gesture would have been interpreted by the comptroller's 206 program to control the TV. Thus uniquely, the logical controller system's simultaneous interconnectability with the sensors and devices provides its programs with data representing an awareness of what changes are going on in the occupant's environs in real time and allows for the artificial intelligence system to more accurately interpret and provide for user needs. The snapping finger gesture may be detected by sensor 212 via sound recognition or gesture recognition algorithms or uniquely by both sensors thereby increasing gesture recognition accuracy. The methodology is unique as the controller 206 follows a dynamically generated process for making the probabilistic decisions more accurate as to what gesture or activity, such as opening a book, by a room occupant has occurred. The controller's logical processing program 206, after receiving initial data input indicating with sufficient probability that an event has occurred, uses algorithms in an attempt to more positively identify the event. The logical processing program decides on a second most probable data stream obtained from sensors to recall from the storage buffers, with the same time of occurrence, for it to obtain corroborative data on the real occurrence of a suspected event. The controller 206 uses as data stream input on which it performs mathematical signal processing analysis, either multiple features captured by a single sensor or multiple sensors that captured the same event in real time and analyzes the event data for recognition. It then chooses the most probable recognition routine or sensor type to yield success and recalls data from storage and thus performs a optimized analysis. Thus, uniquely the controller based on real-time data from a first sensor detects a probable event then calls up stored data from the second sensor which it uses to increase the probability that the event did occur. This, situational awareness of the interaction between occupants and devices and the present finite states of each combined with multiple information sources e.g. the mic and camera allows for corroborating data and increases the probability of the intelligent agent AI system making correct decisions and is unique to the architecture of the integrating platform 200. When the phone is ringing a third agreed upon gesture e.g. questioning-gesture used for indicating a desire for more information, such as placement of the hand on the chin with finger extended, or a voice command stored in the controller's look-up table of commands and loaded into the processor when running recognition algorithms, represents a request for caller ID. The gesture will cause the controller to invoke the TV controller 217 or projection display unit 229 to show the caller's number on 230. The point being that the same gesture while watching TV, a situation that is the base situation would have produced a command to the TV, such as show present channel and program info but now that the controller 206 is driving the phone ringer on the speaker the context for the algorithms interpretation is changed to that of commands for the phone.

Another novel aspect of the invention is that of the novel system architecture of devices designed to integrate with the platform 200. In prior art architecture such as plug and play devices information can be passed about operation requirements, capabilities of the attached device to the controller and the devices application-programming interface API. The controller does not have access or is not made aware of the interoperable components within the device; such as a USB connectable radio having a speaker. In the present device-design the platform controller has access via the device's circuitry directly to the speaker component which it may use for the smoke alarm.

FIGS. 10 and 13 depicts the platform device that is hung from a ceiling. It has a structure for attaching add-on devices such as power supply circuitry, controllers, light sources, speakers, telephones, clocks, radios, smoke detectors, emergency battery pack, sprinkler, cameras etc. The platform has structure that has a large dimension between the east-west and north-south sides such as 2 meter spacing so as to provide mounting for the devices distributed over the room's area where the rail 201 may provide physical support and/or power and control signals. The rail allows for the devices to deployed spread out over the living space. The devices are designed such that what they deliver affects only a substantially local sub-area of the room and the spatially differentiated vision, PIR or sound sensor can detect what happens in that sub-area. Thus a few advantages are obtained: one person in a room can be delivered one type of service such as illumination and a second occupant from the same integrated device receives a different spectrum or intensity of illumination. Similarly, the knowledge of what is going on in the occupant's locality combined with devices for localized climate conditioning offers heating and cooling per the occupant's preferences and the localized climate control is much more energy efficient.

Another novel aspect of the inventions is connectivity on the component level. While prior art networks connect self-contained devices, the coordinated control and delivery technology of the present disclosure uses devices where sub-components comprising the overall device are linked in a common communications and power platform allowing other devices in the platform's network to make use of those sub-components. In this interoperability configuration, electronic circuitry architecture is such that control and feedback of the component is effected directly by the central controller or via the device's controller. The plug and play computer bus has a programmed specification that facilitates the discovery of a hardware component in a system without the need for physical device configuration or user intervention in resolving resource conflicts. When the plug and play device is first plugged in, the central intelligent system controller is provided with coded information on it and subcomponents. The central controller 206 automatically sensing an added device on the power rail, such as by a change in the electrical characteristic, as detectable by a Wheatstone bridge or equivalent electronic circuitry, begins sending a query to search for unassigned devices. The new device's circuitry broadcasts a unique, factory set identifier which can be based on the product's bar code and becomes registered in the network, communication with the device to map its performance capabilities is commenced per a given communications protocol either proprietary or public domain from IEEE or other bodies. Recognizing the independent components, it assigns a specific coding to address them as well, and/or "learns" their independent performance characteristics and uses. At the time of initial setup, the new device is queried to send stored algorithms to the platform's operating system for use in communicating with and controlling the device. If the new device has a GUI for the Smartphone it is downloaded and added to the user's platform control application and the Smartphone's GUI. In Bluetooth setup, as a first step, the Bluetooth SIG issues a Universally Unique Identifier (UUID) to the A4WP for adoption in its baseline system specification (BSS). The A4WP BSS utilizes the Bluetooth Smart radio standard to carry the session management and power control between an A4WP charging station and an A4WP-certified Smartphone device. While the connectivity of peripherals has been accomplished on the device level it has not been accomplishable heretofore on the sharing component level.

Another novel aspect is used in the control of climate control equipment such as heaters and air conditioners. In prior art, a smart room thermometer such as NEST detects the room temperature or the return air is measured by the AC controller. The climate control effecting equipment of the present invention, by using sensors is aware of user needs in real time. That is the heating, humidifying, air conditioner system will only supply cooled or heated air to a person detected as being in need of a change in regard to the present climactic conditions. People are no longer overcooled in a living space because of an irrelevant wall thermostat's reading. Instead, by using visible and far infrared sensors in the sensor pack to monitor the actual occupant's state of thermal comfort it is possible to more accurately predict the needed energy flows thereby eliminating the prior art HVAC controllers' compromises on comfort and wasted energy. Great advantage is obtained by directly measuring people's parameters such as skin temperature, vasodilation and the presence of sweat beneath or on skin rather than room parameters.

In the novel sensor system the coordination between the camera vision system having positional information can use a lensed array of microbolometers such as in thermographic cameras sold by FLIR. Their A320 series thermal imagers can detect elevated body temperature <http://www.flir.com/thermography/americas/us/view/?id=60114>. Alternately, an inexpensive single pixel or miniature 8×8 pixel camera type of bolometer is used as a detector in a thermal camera such as in U.S. Pat. No. 8,275,413 by Fraden. Infrared radiation from the body's specific range of wavelengths strikes the vanadium oxide and changes its electrical resistance. This resistance change is measured and processed into temperatures which can be interpreted and measured for different parts of the body. The microbolometer grid is commonly found in three sizes, a 640×480 array, a 320×240 array or less expensive 160×120 array. Different arrays provide the same resolution with larger array providing a wider field of view for directly measuring one or more occupants of the living space under the purview of the platform's climate control system 206. Alternately, an inexpensive single bolometer can be mounted on a motorized aimable swivel jointed base controlled by the camera vision system controller to be aimed at the persons inner canthus of eye area and then again at an extremity on the face, hands or ear lobe. This works even with the bolometer being non-calibrated and only measuring the difference between the body parts indicative of a person's discomfort of feeling too hot or cold. Another method of calibration of the bolometer array is to aim the bolometer array at a controlled thermal target 258 placed on the platform rail 201 at a known distance. When the thermal target's temperature sensor indicated it has reached a calibration temperature the controller 206 takes readings and running computer routines it then in communications with the array chip biases the array's bolometers circuitry to the correct pot setting.

FIG. 2 illustrates a block diagram of the integrated system for the delivery of energy and mass. The integrated platform's electronic circuitry contains a communications unit for use with wired devices such as a USB protocol or using wireless protocols known in the art such as the Audio/Video Remote Control (AVRCP) profile used in conjunction with Advanced Audio Distribution Profile A2DP for remote control on devices such as headphones, car audio systems, or stand-alone speaker units. These systems may also include microphones and use Headset (HSP) or Hands-Free (HFP) profiles for voice calling. Cordless Telephony Profile (CTP) is designed for cordless phones to work using Bluetooth. The mobile phones use a Bluetooth CTP gateway connected to a landline when within the home, and the mobile phone network when out of range. It is central to the Bluetooth SIG's '3-in-1 phone' use case. Generic Attribute Profile (GATT)—low-power lightweight wireless protocol in or internet protocols for controlling devices over TCP/IP such as by using Lonworks or similar protocol for device interconnectivity.

The generic platform 200 is modular being outfitted by the user with add-on devices that fit the usage of the living space in which it is installed. In one embodiment, the logical controller 206 is input data during the installation process regarding the room's usage such as kitchen or living room. Thereby the artificial intelligence system, equipped with different algorithms for different rooms, has a better chance of interpreting the person's needs and the best practice actions to fulfill those needs. Alternately, after installation the logical controller during autonomous set up may use image recognition to automatically recognize the room's usage, such as kitchen vs. bedroom by identifying objects that are unique to each that have been programmed into the controller's algorithms. The controller's programmed in artificial intelligence and machine learning algorithms further assess the actual usage of the occupants within the living space such as identifying cooking activities vs. sleep activity and thereby determining best practice for the delivery of energy and materials to that living space. Thus, in a kitchen environment, the logical controller interprets, based on best practice algorithms called from its memory, the lighting requirements of the user to be supplied at higher intensity levels than in the bedroom environment. The automatic classification system can thus identify a studio apartment where the living room, bedroom, bathroom and kitchenette are combined into a single room. In one synergistic configuration, the platform is equipped with near infra-red light sources used for communication and replacing remote controllers as well as being used for illuminating in the dark for camera vision. The controller communications algorithms can operate the infra-red source according to infrared remote control protocols like RC-5, SIRC, which are used to communicate with infrared devices. At installation setup, the TV remote controller's IR LED is aimed at IR detector 212. The buttons for volume, channel change, etc., are identified by speech recognition, then are pressed and the pulsed code is programmed into the platform 200s logical controller. The voice and gesture commands of the viewer recognized by the controller employing interpretive algorithms to be watching TV now are passed onto the legacy TV controller via the IR source being modulated to encode the data.

Several completely automated computer interfaces are currently used, each of which requires no device configuration by the computer user, and the only task of the user is to install software for the self-configuring devices such as IEEE 1394 (FireWire), PCI, Mini PCI, PCI Express, Mini PCI Express, PCMCIA, PC Card, ExpressCard, and USB. In a preferred embodiment, upon attaching a new device to the docking system and connecting it to the data communication circuitry, the device's programming is uploaded from a data storage chip on the new device with the programming needed for its operation. Alternately, an identifier is uploaded that allows the controller via communications to the internet to obtain the needed code for running on the DSP or computer. Alternately, the controller "learns" their performance characteristics by using its sensors and machine learning algorithms to determine a cause-and-effect relationship from measured changes as a result of the device's addition to the system. The autonomous machine learning system 206 offers true self learning process where synergies with other installed equipment can be measured. For example, the spectrometer in 212 can measure the spectral characteristics of operating a new and previously installed light source at the same time and storing the result for future use when that spectrum may be found best practice to fulfill an occupant need. The platform has circuitry to accept plug and play devices added and ported during a boot-time assignment or has Hot swapping functionality using connectivity protocol of the Universal Serial Bus (USB) that allows users to add or remove peripheral components and device resources and to hotplug systems such as is known in the art with USB and IEEE 1394 (FireWire) technology.

The platform 200 has an integral power supply, processor and communications circuit as well as a mounting chassis for both mechanically and electrically mounting devices. The processor has algorithms for selecting the optimal device to perform a function. For example, it is capable of channeling intercom or phone calls from a device to an amplifier's sound card and speaker and streaming the feed from the device to the components. If a radio alarm clock with a medium quality speaker is the first modular device added to the platform, then adding the smoke detector, speakerphone and wake up alarm buzzer to the docking station enable superior sound as they are all capable of accessing its speaker. Later, if a high quality stereo speaker is added, then the alarm clock can now send the alarm buzzer to the better system. This novel sharing of components, where the add-on device architecture provides circuitry for the platform's controller to access the individual components already being presently installed, allows the customer to order only the smoke detector optical chamber, IR sources and photo-detector while the power source, buzzer and control circuitry are all provided by the host platform. Similar to how a mobile internet communications function is provided by a wireless modem or Internet stick plugged into a USB port, where the plug and play device uses power and computing from the laptop. The difference in the integrating platform system of this disclosure is that, till now, cards and peripherals such as a sound card or printer were connected to a central computer, where the service the peripheral is providing is not location dependent. It's a one location device so the add-on is really a component of the central device that the user comes to. They all connect at one station. In the platform 200 quite the opposite, the devices are connected yet purposefully distributed over 3d space thereby extending the central computer connected devices over the living area. In prior art technology, people centralize around a device, one needs to sit in front of the computer or hold the Smartphone in their hand—delivery of service is local with the person coming to the device. In the present invention, the platform or structure affixed device docking system brings the devices to the optimal location to service people where they are, where they are still connected, yet localized. Correct lighting requires that the light comes from the correct angle, stereo from correct distance to a person's ears. The dimensionally extended station can have a projection TV system with a positionable screen—thus, instead of a person having to get up and move to the TV—the person stays where they are, and the video and sound is repositioned by the controller to where the persons is. After being in a certain position for a while a viewer's bones may ache and they change posture, the screen 230 is repositioned automatically by the controller's motorized mount for the best viewing experience and the lighting and automatic widow shades adapts to eliminate glare in that viewing situation. Thus, the sensor controlled system of multiple integrated devices that is employed for providing services to users is capable of using other devices to adjust the environment such that the user receives an optimal usage experience. The controller has algorithms to execute where a sensed change in the way a user is using a device causes the controller to employ other devices to create new, optimal operating parameters for the primary device being used. The system is further unique in that that in prior-art appliances were made as stand-alone devices while in the present system the components are shared between devices in the system so designed to share components in delivery devices distributed over the area to be serviced.

Using the hands free, from any location feature of the platform 220 with microphone 132 and 212, speaker 228 and the from-anywhere-in-the-room viewable display 230, a user can an access virtual assistant such as SIRI from Apple Computer and Google Now from Google Inc via the smart phone, Bluetooth or WiFi home network, voice a query, have search done and have the voice synthesized results automatically broadcast on the speaker or displayed on the wall in view or on the display 230. The choice of the information delivery, voice and/or video is input as a rule, is learned from usage or is automatic; such as if someone is detected sleeping. Where the controller's algorithms 206 will choose to provide the weather forecast on projection screen 230 at low intensity rather than voice over speaker 228.

The control system acts as an artificial intelligence expert system able to make decisions regarding the interaction of machinery, circuits and devices with room occupants in an automatic manner. It is uniquely able to do so by using information from many sources. These include information stored in its memory regarding room geometry and objects therein as well as receiving operational data from devices presently active as well as using sensors to obtain real time data regarding people in the room as well room environment characteristics as well as data from the internet and external sensors. With the plethora of data available it is possible to have the artificial intelligence system solve ambiguous commands.

One example of the unique machine learning capability of controller 206 is the capability to use ambiguous information. In the initial calibration it has been described that an individual "A" is identified by name by using face recognition technology and the identification is stored under a name e.g. A. A calibration is made where the person "A" will also be asked to speak and then have the controller run algorithms that use voice recognition technology known in the art in order to identify them. That data is stored under that individual "A's" name and in the future used for voice identification. The CV system as described earlier can track the identified individual around the room, and now even if the person uses and ambiguous voice command such as "turn on the reading light", the system will disambiguate the command and turn on the correct localized spot-light lamp that services specifically their location. The system 206 running the algorithms a) recalls data for identifying the voice as belonging to individual "A", b) knowing that it is individual "A's" who is now asking for service, accesses the real-time room location of tracked individual "A" and c) knowing the localized spot-lamp that services that location, the controller then drives the correct lamp. Thereby an intelligent agent has been arranged using two separate identification means to take an ambiguous command and by identifying the voice of a person with that individual can now make the connection via lookup of the voice of that individual with the location of the individual and turn on the specific lamp that is going to illuminate for them at their location making the command unambiguous.

The system 206 is able to transform a mass of complex and ambiguous sensory information into coherent action, allowing the controller to perceive and model its environment, synthesize and make decisions from disparate streams of information, and adapt to a changing environment.

In this artificial intelligence system the intelligent agent is an autonomous entity which observes through sensors and acts upon an environment using actuators (i.e. it is an agent) and directs its activity towards achieving goals. The Intelligent agent also learns building on new knowledge to achieve its goals.

The original disclosure's claim set added to the continuation specification:

1. A controller operated device-docking-station for the optimized delivery or modification of a mass or energy to a living space used by people comprised of:
   a. a structure mounted in the room capable of supporting the controller and devices
   b. one or more delivery devices attached to the structure controlled by the controller where said devices deliver any of: energy, mass, sensations and information,
   c. one or more sensor devices that detect information on the room, objects therein, devices therein and/or its occupants, in communication with the controller and providing the controller with said information,
   d. a logical controller with circuitry for data storage, calculations and instruction set processing that is in communication with the attached sensors and delivery devices, where the controller processes algorithms to interpret the sensor information, retrieves stored data and generates control signals to the delivery devices so as to optimally deliver or modify mass, energy and/or information to the people in the living space.

2. The docking station of claim 1 serving as an environmental control system comprised of:
   a. a docking station attached to or located near the ceiling of a room, the docking station adapted to support at least one delivery device that supplies a work or living space and persons within that space with energy, mass, sensations, or information and at least one sensor adapted to measure environmental conditions within the space and the presence, location, physiology and needs of persons within the space;
   b. a knowledge database comprising facts about the needs of specific persons when they are in the working or living space, the facts based on predetermined rules, sensor measured environmental factors and sensor measured information concerning the location and activities of the persons in the working or living space; and
   c. a logical controller comprising an inference engine that uses best practice engineering rules, stored behavioral models and data obtained on the behavior of specific persons to carry out predictions of that person's intentions and that uses artificial intelligence and applies the rules and facts stored in the database to deduce new facts.

3. The docking station according to claim 1, wherein the docking station is adapted to allow modular addition or changing out of delivery devices and sensors.

4. The docking station of claim 1, wherein the delivery device that delivers energy delivers at least one of: visible light, UV radiation, IR radiation, microwave radiation, radio wave radiation, pressure waves, and audible sound.

5. The docking station of claim 1, wherein the delivery device that delivers mass delivers at least one of: heated air, cooled air, moist air, water, and fragrance.

6. The docking station of claim 1, wherein the sensor comprises at least one of: a video or still analog, digital or thermographic camera; a microphone; a gas detector; a pressure detector; a humidity detector; a temperature detector; a flame detector; a bolometer, a velocity detector, an occupancy detector; and a motion detector.

7. The docking station of claim 5, wherein the delivery devices deliver energy, mass, sensations, and information based on information from sensors that read parameters of the persons in the work or living space rather than parameters of the space.

8. The docking station of claim 5 comprising at least one sensor that measures body temperature, pulse, skin color, vasodilation, sweat or other physiological signs to allow the logical controller to determine whether a person feels hot or cold and to activate elements in the persons surround that affect their thermal comfort including a directional delivery device to deliver thermal radiation or a stream of hot or cool air substantially localized to that person.

9. The docking station of claim 1, wherein the delivery devices deliver energy, mass, sensations, and information only to a sub-area of the work or living space at which a person is present.

10. The docking station of claim 1, wherein, if more than one person is in the work or living space, the delivery devices deliver personalized energy, mass, sensations, and information only to each of the sub-areas of the space at which a person is present.

11. The docking station of claim 1, wherein the logical controller comprises software and hardware that enables it to activate delivery devices by interpreting voice commands and gestures of a person based on the context in which the voice commands or gestures are detected by sensors on the docking station.

12. The docking station of claim 10 capable upon receiving an individual's voice command of operating devices that deliver a localized effect at the individual's location adapted to use more than one means for identifying the individual, whereby upon the voice command the logical controller uses the two identifying means to activate the specific device that delivers the effect at their location.

13. The docking station of claim 10 where the logical controller runs probabilistic decision making algorithms and uses: a) stored coordinate data of objects and devices and b) real-time sensor obtained data of location, head facing direction or hand pointing vector to derive a proximity or intersection with a device in order to associate a location with an ambiguous voice or gesture command to operate a specific device.

14. The docking station of claim 10 where the logical controller is situationally aware and supplies a user with energy, mass, or content by using information from the devices under its control to predict the user's intent when making an ambiguous request, query, or action.

15. The docking station according to claim 1, wherein delivery devices and sensors are mounted on pitch and yaw mechanisms allowing them follow the movements of a person through the work or living space and to be aimed at specific sub-areas of the space.

16. The docking station according to claim 1, wherein the docking station comprises at least one mounting chassis having at least one horizontal support bar the mounting chassis having a rotation mechanism allowing it to be rotated around a vertical axis and the support bar having a rotation mechanism adapted to be rotated about its longitudinal axis, thereby allowing attached delivery devices and sensors to be brought to different areas of the room.

17. The docking station according to claim 1 comprising an integral power supply and power and communications circuit that allows the logical controller to direct sharing of components.

18. The docking station of claim 1 adapted to be located in a vehicle.

19. The docking station of claim 1 adapted to make probabilistic decisions based on the occurrence of events generated by people and detected by more than one sensor detecting the same event and outputting data to the controller and to storage buffers; the system comprising a processor running algorithms adapted to process data in real time and data from the storage buffers; wherein the controller uses real-time data from a first sensor to detect a probable event and then calls up stored data from a second sensor, which the processor uses to determine the probability that the event did occur.

20. The docking station of claim 1 adapted to control multiple integrated devices employed for the provision of services to a user under optimized parameters, wherein a sensed change in the user's usage of a device causes the controller to employ other devices to create new optimal operating parameters for the device being used.

The various embodiments have been shown and described with the intention that features on one EMCD 20 or MDS such as platform 200 is interchangeable with platform 220 and 240. While the invention has been disclosed in connection with the preferred embodiments shown and described in detail, various modifications and improvements thereon will become readily apparent to those skilled in the art. While preferred embodiments of the invention have been described in detail, it is particularly understood that the invention in not limited thereto or thereby, and it is evident to those skilled in the art that various changes and modifications may be made therein without departing from the invention. Accordingly, the spirit and scope of the present invention is to be limited only by the following claims.

What is claimed is:

1. A controller operated device docking station for the provision of desired services in a living space via the delivery or modification of matter or energy, comprising:
   a. a structure mounted in the living space arranged to support the operation of more than one devices;
   b. more than one delivery devices coupled to the structure and controlled by the controller, wherein the delivery devices provide one or more desired services;
   c. one or more sensor device configured to detect information about the living space and its occupants, the one or more sensor device configured to communicate the information;
   d. the controller comprising data storage, processing and communications elements, in communication with the one or more sensor devices and the more than one delivery devices wherein the controller is configured to collect information, processes algorithms to interpret the information, determine the one or more desired services and generate control signals to operate the more than one delivery devices so as to provide the one or more desired services.

2. The device docking station of claim 1, wherein the device docking station is expandable, wherein said device docking station adapted to: receive one or more additional devices, change out one or more devices, or facilitate the removal of one or more devices.

3. The device docking station of claim 1, wherein the more than one delivery devices provide services comprising at least one of heated air, cooled air, moving air, sound, vibrating air, moist air, water, fragrance, odors, spray, gas, food, make-up air, air quality filtration, air ionization, visible light, UV radiation, IR radiation, microwave radiation, radio wave radiation, terahertz waves, electromagnetic radiation, pressure waves, sound or inaudible sound.

4. The device docking station of claim 1, wherein the more than one delivery device comprise at least one of an air conditioner, air heater, radiative heater, fan, fragrance generator, ion generator, negative ion generator, air filtration unit, humidifier, air vents that bring heated, cooled or filtered air to the living space, heater, aroma dispenser, air ionizer, water pump, water valve, water sprinkler, fire sprinkler, speaker, acoustic noise cancellation generator, pest removal device, lamp, luminescent device, lighting fixture, LED, electromagnetic radiation device, projector, display screen, holographic image projector, ultrasonic transducer, microwave transducer, sub terahertz emitter, terahertz emitter, or a laser.

5. The device docking station of claim 1, wherein the one or more sensor device is adapted to sense at least one of; environmental conditions, human presence, location of room occupants within the living space, entity location, human physiology, temperature, electromagnetic radiation, humidity, pressure, room geometry, light intensity, light spectrum, surface luminances, spectral characteristics, sound, vibration, odor, physiological data regarding room occupants, activity, eye open or closed information, gesture information, expression information, head position, direction person is facing, or body position of room occupants.

6. The device docking station of claim 1, wherein the one or more sensor device comprises at least one of a camera, video camera, digital camera, thermographic camera, microphone, gas detector, pressure detector, humidity detector, temperature detector, flame detector, bolometer, thermostat, velocity detector, terahertz detector, occupancy detector, motion detector, microphone array, passive infra-red (PIR), sonar, LIDAR, electromagnetic radiation sensor, electro-optical sensor, photodetector, photoresistor, photodiode, array of photodetectors with or without a lens, 3D stereo camera, a LED or laser time of flight camera system, a terahertz, submillimeter radiation and detection system, an array of bolometers with or without a lens, micro-bolometers, thermal camera, thermographic camera, pressure transducer, a thermometer, barometer, a smoke detector, a gas detector, a spectral meter, a seismometer, infra-red sensor, ultrasonic transducer, ultrasonic sensor, humistor, water spill detector, colorimeter, microwave transducer, tomographic motion detector, or spectrometer.

7. The device docking station of claim 1, wherein the controller further comprises software and hardware that enables said controller to operate the more than one delivery devices by interpreting voice commands, expressions and or gestures of a person based not only on the textual meaning, but on the context within which the voice, expression commands or gestures commands are detected by sensors on the docking station, and wherein based on the interpretation, the controller operates a delivery device and/or stores the interpreted command within the context for machine learning of personal preferences or future controller processing.

8. The device docking station of claim 1, wherein the controller comprises a knowledge database of facts about needs of specific persons, the facts based on predetermined rules or learned preferences of the specific persons; and
wherein the controller further comprises an inference engine that uses stored behavioral models or data obtained on the behavior of specific persons to carry out predictions of that person's intentions.

9. The device docking station of claim 1, wherein the more than one delivery devices or the one or more sensor device is mounted on pitch and yaw mechanisms that are moveable from a first position to other positions, allowing the more than one delivery devices or the one or more sensor device to: follow the movements of a person about the living space, to be aimed at a specific entity, or aimed at specific sub-areas of the living space.

10. The device docking station of claim 1, wherein the more than one delivery devices are adapted to deliver one or more desired service, localized to a sub-area of the living space at which a person is present, whereby, if more than one person is in the living space, and each person is in a separate sub-area, the more than one delivery devices provide personalized services to each of the sub-areas of the space in which each person is present.

11. The device docking station of claim 10, further comprising a directional delivery device to deliver a stream of hot or cool air, or thermal radiation, substantially localized to the person's location in the sub area, whereby the historic thermostat controller has been replaced by a more accurate primary data sensing apparatus.

12. The device docking station of claim 10, upon receiving an individual's voice command, operating devices that deliver a localized effect at the individual's location, adapted to use more than one characteristic for identifying the individual, whereby upon the voice command the controller uses the more than one identifying characteristics to activate the specific device that delivers the effect at their location.

13. The device docking station of claim 1, further comprising at least one sensor of the one or more sensors that measures at least one of skin temperature, body temperature, pulse, skin color, vasodilation, sweat or other physiological signs of the person therein, said at least one sensor providing information to the controller to determine whether a person feels hot or cold and to activate elements in the person's surround that affect their thermal comfort.

14. The device docking station of claim 1, where a person makes an ambiguous command, query, or action and wherein the controller runs probabilistic decision-making algorithms and uses: a) stored coordinate data of devices, and b) real-time sensor obtained data comprising at least one of location, head facing direction, or hand pointing vector of the occupant to derive a proximity or intersection with a device coordinate in order to associate it with an ambiguous voice or gesture command so as to obtain the desired service.

15. The device docking station of claim 1, where the controller is situationally aware and supplies a user with energy, matter, or content by using information from the devices under its control to predict the user's intent when making an ambiguous command, query, or action.

16. The device docking station of claim 1, comprising an integral power supply, control signal circuitry and data communications, the controller arranged to accomplish the direct sharing of components among the docking station sensor and delivery devices.

17. The device docking station of claim 1, adapted to be located in a vehicle passenger cabin.

18. The device docking station of claim 1, wherein the controller is configured to make probabilistic decisions and runs recognition algorithms that use data from the one or more sensor devices that sense parameters of the occupants in the living space to determine the occupant's awareness, activity, physiological characteristics, vocal expression, identity, facial expression, positional pose, or locale for use in making decisions.

19. The device docking station of claim 1, wherein the controller is configured to make probabilistic decisions based on the occurrence of events generated by occupants and detected by more than one sensor device detecting the same event, the controller further comprising a processor running algorithms, configured to process data in real time and data from the storage buffers, wherein the controller uses real-time data from a first sensor to detect a probable event and then calls up stored data from a second sensor, which the processor uses to determine the probability that the event did occur.

20. The device docking station of claim 1, adapted to control multiple, integrated devices employed for the provision of services to a user under optimized parameters, wherein a sensed change in the user's usage of a first device causes the controller to operate one or more additional devices to create new operating parameters for the first device being used.

* * * * *